United States Patent
Thomas et al.

(10) Patent No.: US 9,294,799 B2
(45) Date of Patent: Mar. 22, 2016

(54) SYSTEMS AND METHODS FOR PROVIDING STORAGE OF DATA ON SERVERS IN AN ON-DEMAND MEDIA DELIVERY SYSTEM

(71) Applicant: Rovi Guides, Inc., Santa Clara, CA (US)

(72) Inventors: William L. Thomas, Evergreen, CO (US); Michael D. Ellis, Boulder, CO (US); Kevin B. Easterbrook, Gilbert, AZ (US); M. Scott Reichardt, Tulsa, OK (US); Robert A. Knee, Lansdale, PA (US)

(73) Assignee: Rovi Guides, Inc., Santa Clara, CA (US)

( * ) Notice: Subject to any disclaimer, the term of this patent is extended or adjusted under 35 U.S.C. 154(b) by 0 days.

(21) Appl. No.: 14/926,640

(22) Filed: Oct. 29, 2015

(65) Prior Publication Data

US 2016/0057476 A1 Feb. 25, 2016

Related U.S. Application Data

(63) Continuation of application No. 14/559,781, filed on Dec. 3, 2014, which is a continuation of application No. 14/048,818, filed on Oct. 8, 2013, now Pat. No. 8,973,069, which is a continuation of application No.

(Continued)

(51) Int. Cl.
*H04N 7/173* (2011.01)
*H04N 21/41* (2011.01)
(Continued)

(52) U.S. Cl.
CPC ....... *H04N 21/4122* (2013.01); *H04N 21/2541* (2013.01); *H04N 21/25875* (2013.01);
(Continued)

(58) Field of Classification Search
CPC .................................................. H04N 7/17318
USPC ......................................... 725/30, 87, 91, 97
See application file for complete search history.

(56) References Cited

U.S. PATENT DOCUMENTS

| 4,024,401 A | 5/1977 | Bernstein et al. |
| 4,028,733 A | 6/1977 | Ulicki |

(Continued)

FOREIGN PATENT DOCUMENTS

| AU | 731010 B2 | 3/2001 |
| AU | 733993 B2 | 5/2001 |

(Continued)

OTHER PUBLICATIONS

U.S. Appl. No. 09/354,344, filed Jul. 16, 1999, Ellis.

(Continued)

*Primary Examiner* — Hunter B Lonsberry
(74) *Attorney, Agent, or Firm* — Ropes & Gray LLP

(57) ABSTRACT

A system and method may be provided that allows users to store, retrieve, and manipulate on-demand media content and data stored on a remote server network in an on-demand media delivery system. More particularly, the system may allow a user to access his or her on-demand media account from user equipment in different locations as long as the current user equipment can communicate with a remote server that stores user-specific information. The system upon user selection may freeze the delivery of on-demand media at a particular point and allow the user to resume the media at a later time from some other network location in system. Users may upload personal images or files to an on-demand delivery server for later retrieval and display. Users may be permitted to assign access rights to the uploaded files.

28 Claims, 14 Drawing Sheets

Related U.S. Application Data

13/023,842, filed on Feb. 9, 2011, now Pat. No. 8,584,184, which is a continuation of application No. 12/200,593, filed on Aug. 28, 2008, now Pat. No. 7,917,933, which is a continuation of application No. 09/974,646, filed on Oct. 9, 2001, now Pat. No. 7,650,621.

(60) Provisional application No. 60/270,351, filed on Feb. 21, 2001, provisional application No. 60/252,171, filed on Nov. 20, 2000, provisional application No. 60/239,407, filed on Oct. 11, 2000.

(51) Int. Cl.
| | |
|---|---|
| *H04N 21/6587* | (2011.01) |
| *H04N 21/4627* | (2011.01) |
| *H04N 21/254* | (2011.01) |
| *H04N 21/258* | (2011.01) |
| *H04N 21/472* | (2011.01) |

(52) U.S. Cl.
CPC ..... *H04N21/4627* (2013.01); *H04N 21/47202* (2013.01); *H04N 21/47217* (2013.01); *H04N 21/6587* (2013.01)

(56) References Cited

U.S. PATENT DOCUMENTS

| | | | |
|---|---|---|---|
| 4,079,419 A | 3/1978 | Siegle et al. |
| 4,081,753 A | 3/1978 | Miller |
| 4,081,754 A | 3/1978 | Jackson |
| 4,103,524 A | 8/1978 | Mitchell et al. |
| 4,162,513 A | 7/1979 | Beyers, Jr. et al. |
| 4,170,782 A | 10/1979 | Miller |
| 4,193,120 A | 3/1980 | Yello |
| 4,206,483 A | 6/1980 | Nakamura |
| 4,264,924 A | 4/1981 | Freeman |
| 4,264,925 A | 4/1981 | Freeman et al. |
| 4,267,563 A | 5/1981 | Sato et al. |
| 4,271,532 A | 6/1981 | Wine |
| 4,280,148 A | 7/1981 | Saxena |
| 4,287,539 A | 9/1981 | Bixby et al. |
| 4,300,040 A | 11/1981 | Gould et al. |
| 4,305,101 A | 12/1981 | Yarbrough et al. |
| 4,310,924 A | 1/1982 | Miyasaka et al. |
| 4,325,081 A | 4/1982 | Abe et al. |
| 4,331,974 A | 5/1982 | Cogswell et al. |
| 4,334,242 A | 6/1982 | Mangold |
| 4,355,415 A | 10/1982 | George et al. |
| 4,367,559 A | 1/1983 | Tults |
| 4,375,651 A | 3/1983 | Templin et al. |
| 4,381,522 A | 4/1983 | Lambert |
| 4,385,210 A | 5/1983 | Marquiss |
| 4,390,901 A | 6/1983 | Keiser |
| 4,422,105 A | 12/1983 | Rodesch et al. |
| 4,425,579 A | 1/1984 | Merrell |
| 4,429,385 A | 1/1984 | Cichelli et al. |
| 4,435,842 A | 3/1984 | Mayumi et al. |
| 4,449,249 A | 5/1984 | Price |
| 4,475,153 A | 10/1984 | Kihara et al. |
| 4,488,179 A | 12/1984 | Krüger et al. |
| 4,495,654 A | 1/1985 | Deiss |
| 4,510,623 A | 4/1985 | Bonneau et al. |
| 4,519,003 A | 5/1985 | Scholz |
| 4,527,194 A | 7/1985 | Sirazi |
| 4,536,791 A | 8/1985 | Campbell et al. |
| 4,554,584 A | 11/1985 | Elam et al. |
| 4,563,710 A | 1/1986 | Baldwin |
| 4,573,072 A | 2/1986 | Freeman |
| 4,593,414 A | 6/1986 | Koyanagi |
| 4,598,288 A | 7/1986 | Yarbrough et al. |
| 4,602,279 A | 7/1986 | Freeman |
| 4,605,964 A | 8/1986 | Chard |
| 4,605,973 A | 8/1986 | Von Kohorn |
| 4,621,259 A | 11/1986 | Schepers et al. |
| 4,625,080 A | 11/1986 | Scott |
| 4,630,108 A | 12/1986 | Gomersall |
| 4,631,601 A | 12/1986 | Brugliera et al. |
| 4,635,121 A | 1/1987 | Hoffman et al. |
| 4,638,424 A | 1/1987 | Beglin et al. |
| 4,641,203 A | 2/1987 | Miller |
| 4,641,205 A | 2/1987 | Beyers, Jr. |
| 4,645,873 A | 2/1987 | Chomet |
| 4,677,501 A | 6/1987 | Saltzman et al. |
| 4,680,647 A | 7/1987 | Moriyama |
| 4,685,131 A | 8/1987 | Horne |
| 4,689,022 A | 8/1987 | Peers et al. |
| 4,691,351 A | 9/1987 | Hayashi et al. |
| 4,694,490 A | 9/1987 | Harvey et al. |
| 4,704,725 A | 11/1987 | Harvey et al. |
| 4,706,121 A | 11/1987 | Young |
| 4,718,107 A | 1/1988 | Hayes |
| RE32,632 E | 3/1988 | Atkinson |
| 4,745,549 A | 5/1988 | Hashimoto |
| 4,750,036 A | 6/1988 | Martinez |
| 4,750,213 A | 6/1988 | Novak |
| 4,751,578 A | 6/1988 | Reiter et al. |
| 4,754,326 A | 6/1988 | Kram et al. |
| 4,755,883 A | 7/1988 | Uehira |
| 4,761,684 A | 8/1988 | Clark et al. |
| 4,771,375 A | 9/1988 | Beglin et al. |
| 4,775,935 A | 10/1988 | Yourick |
| 4,787,063 A | 11/1988 | Muguet |
| 4,802,022 A | 1/1989 | Harada |
| 4,829,558 A | 5/1989 | Welsh |
| 4,832,373 A | 5/1989 | Swan |
| 4,837,584 A | 6/1989 | Sharkey et al. |
| 4,841,132 A | 6/1989 | Kajitani et al. |
| 4,841,562 A | 6/1989 | Lem |
| 4,843,482 A | 6/1989 | Hegendorfer |
| 4,847,696 A | 7/1989 | Matsumoto et al. |
| 4,847,698 A | 7/1989 | Freeman |
| 4,847,700 A | 7/1989 | Freeman |
| 4,857,999 A | 8/1989 | Welsh |
| 4,866,434 A | 9/1989 | Keenan |
| 4,873,584 A | 10/1989 | Hashimoto |
| 4,879,611 A | 11/1989 | Fukui et al. |
| 4,882,732 A | 11/1989 | Kaminaga |
| 4,885,579 A | 12/1989 | Sandbank |
| 4,890,321 A | 12/1989 | Seth-Smith et al. |
| 4,890,713 A | 1/1990 | Pagano |
| 4,894,789 A | 1/1990 | Yee |
| 4,899,370 A | 2/1990 | Kameo et al. |
| 4,908,707 A | 3/1990 | Kinghorn |
| 4,908,713 A | 3/1990 | Levine |
| 4,920,432 A | 4/1990 | Eggers et al. |
| 4,930,158 A | 5/1990 | Vogel |
| 4,930,160 A | 5/1990 | Vogel |
| 4,937,806 A | 6/1990 | Babson et al. |
| 4,945,563 A | 7/1990 | Horton et al. |
| 4,947,244 A | 8/1990 | Fenwick et al. |
| 4,949,187 A | 8/1990 | Cohen |
| 4,959,719 A | 9/1990 | Strubbe et al. |
| 4,959,720 A | 9/1990 | Duffield et al. |
| 4,963,994 A | 10/1990 | Levine |
| 4,963,995 A | 10/1990 | Lang |
| 4,965,825 A | 10/1990 | Harvey et al. |
| 4,977,455 A | 12/1990 | Young |
| 4,985,887 A | 1/1991 | Mizuhara et al. |
| 4,991,012 A | 2/1991 | Yoshino |
| 4,994,908 A | 2/1991 | Kuban et al. |
| 4,996,642 A | 2/1991 | Hey |
| 5,001,554 A | 3/1991 | Johnson et al. |
| 5,012,409 A | 4/1991 | Fletcher et al. |
| 5,014,125 A | 5/1991 | Pocock et al. |
| 5,016,273 A | 5/1991 | Hoff |
| 5,027,400 A | 6/1991 | Baji et al. |
| 5,036,314 A | 7/1991 | Barillari et al. |
| 5,038,211 A | 8/1991 | Hallenbeck |
| 5,046,092 A | 9/1991 | Walker et al. |
| 5,047,867 A | 9/1991 | Strubbe et al. |
| 5,053,948 A | 10/1991 | DeClute et al. |
| 5,057,932 A | 10/1991 | Lang |
| 5,058,160 A | 10/1991 | Banker et al. |

(56) References Cited

U.S. PATENT DOCUMENTS

| | | |
|---|---|---|
| 5,068,733 A | 11/1991 | Bennett |
| 5,075,771 A | 12/1991 | Hashimoto |
| 5,085,385 A | 2/1992 | Breitenstein |
| 5,089,885 A | 2/1992 | Clark |
| 5,090,049 A | 2/1992 | Chen |
| 5,099,319 A | 3/1992 | Esch et al. |
| 5,105,184 A | 4/1992 | Pirani et al. |
| 5,109,279 A | 4/1992 | Ando |
| 5,109,414 A | 4/1992 | Harvey et al. |
| 5,111,296 A | 5/1992 | Duffield et al. |
| 5,113,259 A | 5/1992 | Romesburg et al. |
| 5,119,188 A | 6/1992 | McCalley et al. |
| 5,119,577 A | 6/1992 | Lilly |
| 5,121,476 A | 6/1992 | Yee |
| 5,123,046 A | 6/1992 | Levine |
| 5,126,851 A | 6/1992 | Yoshimura et al. |
| 5,132,992 A | 7/1992 | Yurt et al. |
| 5,134,649 A | 7/1992 | Gutzmer |
| 5,134,719 A | 7/1992 | Mankovitz |
| 5,151,789 A | 9/1992 | Young |
| 5,152,012 A | 9/1992 | Schwob |
| 5,155,591 A | 10/1992 | Wachob |
| 5,168,353 A | 12/1992 | Walker et al. |
| 5,168,372 A | 12/1992 | Sweetser |
| 5,170,388 A | 12/1992 | Endoh |
| 5,172,413 A | 12/1992 | Bradley et al. |
| 5,179,439 A | 1/1993 | Hashimoto |
| 5,187,589 A | 2/1993 | Kono et al. |
| 5,189,608 A | 2/1993 | Lyons et al. |
| 5,189,630 A | 2/1993 | Barstow et al. |
| 5,191,423 A | 3/1993 | Yoshida |
| 5,195,092 A | 3/1993 | Wilson et al. |
| 5,195,134 A | 3/1993 | Inoue |
| 5,200,822 A | 4/1993 | Bronfin et al. |
| 5,202,915 A | 4/1993 | Nishii |
| 5,210,611 A | 5/1993 | Yee et al. |
| 5,212,553 A | 5/1993 | Maruoka |
| 5,216,228 A | 6/1993 | Hashimoto |
| 5,220,420 A | 6/1993 | Hoarty et al. |
| 5,223,924 A | 6/1993 | Strubbe |
| 5,225,902 A | 7/1993 | McMullan, Jr. |
| 5,227,874 A | 7/1993 | Von Kohorn |
| 5,228,077 A | 7/1993 | Darbee |
| 5,231,493 A | 7/1993 | Apitz |
| 5,231,494 A | 7/1993 | Wachob |
| 5,231,543 A | 7/1993 | Kubota et al. |
| RE34,340 E | 8/1993 | Freeman |
| 5,233,423 A | 8/1993 | Jernigan et al. |
| 5,233,654 A | 8/1993 | Harvey et al. |
| 5,241,428 A | 8/1993 | Goldwasser et al. |
| 5,247,364 A | 9/1993 | Banker et al. |
| 5,247,575 A | 9/1993 | Sprague et al. |
| 5,249,043 A | 9/1993 | Grandmougin et al. |
| 5,251,921 A | 10/1993 | Daniels |
| 5,253,066 A | 10/1993 | Vogel |
| 5,253,275 A | 10/1993 | Yurt et al. |
| 5,260,778 A | 11/1993 | Kauffman et al. |
| 5,262,860 A | 11/1993 | Fitzpatrick et al. |
| 5,280,392 A | 1/1994 | Koo |
| 5,283,560 A | 2/1994 | Bartlett |
| 5,283,639 A | 2/1994 | Esch et al. |
| 5,283,819 A | 2/1994 | Glick et al. |
| 5,285,284 A | 2/1994 | Takashima et al. |
| 5,291,554 A | 3/1994 | Morales |
| 5,293,357 A | 3/1994 | Hallenbeck |
| 5,296,931 A | 3/1994 | Na |
| 5,297,204 A | 3/1994 | Levine |
| 5,299,006 A | 3/1994 | Kim et al. |
| 5,301,028 A | 4/1994 | Banker et al. |
| 5,301,270 A | 4/1994 | Steinberg et al. |
| 5,307,173 A | 4/1994 | Yuen et al. |
| 5,311,423 A | 5/1994 | Clark |
| 5,315,452 A | 5/1994 | Hong |
| 5,317,403 A | 5/1994 | Keenan |
| 5,317,730 A | 5/1994 | Moore et al. |
| 5,319,445 A | 6/1994 | Fitts |
| 5,323,234 A | 6/1994 | Kawasaki |
| 5,323,240 A | 6/1994 | Amano et al. |
| 5,325,183 A | 6/1994 | Rhee |
| 5,325,238 A | 6/1994 | Stebbings et al. |
| 5,325,423 A | 6/1994 | Lewis |
| 5,329,379 A | 7/1994 | Rodriguez et al. |
| 5,335,079 A | 8/1994 | Yuen et al. |
| 5,335,277 A | 8/1994 | Harvey et al. |
| 5,339,393 A | 8/1994 | Duffy et al. |
| 5,339,434 A | 8/1994 | Rusis |
| 5,341,350 A | 8/1994 | Frank et al. |
| 5,345,430 A | 9/1994 | Moe |
| 5,346,326 A | 9/1994 | Bienvenu |
| 5,347,632 A | 9/1994 | Filepp et al. |
| 5,351,075 A | 9/1994 | Herz et al. |
| 5,353,121 A | 10/1994 | Young et al. |
| 5,355,162 A | 10/1994 | Yazolino et al. |
| 5,355,302 A | 10/1994 | Martin et al. |
| 5,357,276 A | 10/1994 | Banker et al. |
| 5,359,367 A | 10/1994 | Stockill |
| 5,371,551 A | 12/1994 | Logan et al. |
| 5,373,288 A | 12/1994 | Blahut |
| 5,374,951 A | 12/1994 | Welsh |
| 5,377,317 A | 12/1994 | Bates et al. |
| 5,382,970 A | 1/1995 | Kiefl |
| 5,382,983 A | 1/1995 | Kwoh et al. |
| 5,386,493 A | 1/1995 | Degen et al. |
| 5,390,027 A | 2/1995 | Henmi et al. |
| 5,392,983 A | 2/1995 | Clarke-Bolling et al. |
| 5,396,546 A | 3/1995 | Remillard |
| 5,398,074 A | 3/1995 | Duffield et al. |
| 5,398,138 A | 3/1995 | Tomita |
| 5,400,402 A | 3/1995 | Garfinkle |
| 5,404,393 A | 4/1995 | Remillard |
| 5,404,567 A | 4/1995 | DePietro et al. |
| 5,410,326 A | 4/1995 | Goldstein |
| 5,410,343 A | 4/1995 | Coddington et al. |
| 5,410,344 A | 4/1995 | Graves et al. |
| 5,410,367 A | 4/1995 | Zahavi et al. |
| 5,412,720 A | 5/1995 | Hoarty |
| 5,414,569 A | 5/1995 | Sekiguchi et al. |
| 5,414,756 A | 5/1995 | Levine |
| 5,416,508 A | 5/1995 | Sakuma et al. |
| 5,418,622 A | 5/1995 | Takeuchi |
| 5,426,699 A | 6/1995 | Wunderlich et al. |
| 5,432,561 A | 7/1995 | Strubbe |
| 5,434,626 A | 7/1995 | Hayashi et al. |
| 5,434,678 A | 7/1995 | Abecassis |
| 5,438,355 A | 8/1995 | Palmer |
| 5,440,678 A | 8/1995 | Eisen et al. |
| 5,442,389 A | 8/1995 | Blahut et al. |
| 5,442,390 A | 8/1995 | Hooper et al. |
| 5,444,499 A | 8/1995 | Saitoh |
| 5,446,488 A | 8/1995 | Vogel |
| 5,446,919 A | 8/1995 | Wilkins |
| 5,450,135 A | 9/1995 | Schick |
| 5,452,012 A | 9/1995 | Saitoh |
| 5,453,779 A | 9/1995 | Dan et al. |
| 5,455,570 A | 10/1995 | Cook et al. |
| 5,457,478 A | 10/1995 | Frank |
| 5,459,522 A | 10/1995 | Pint |
| 5,461,415 A | 10/1995 | Wolf et al. |
| 5,465,113 A | 11/1995 | Gilboy |
| 5,465,385 A | 11/1995 | Ohga et al. |
| 5,467,264 A | 11/1995 | Rauch et al. |
| 5,469,206 A | 11/1995 | Strubbe et al. |
| 5,474,000 A | 12/1995 | Mizuno et al. |
| 5,475,835 A | 12/1995 | Hickey |
| 5,477,262 A | 12/1995 | Banker et al. |
| 5,477,263 A | 12/1995 | O'Callaghan et al. |
| 5,479,266 A | 12/1995 | Young et al. |
| 5,479,268 A | 12/1995 | Young et al. |
| 5,479,302 A | 12/1995 | Haines |
| 5,479,497 A | 12/1995 | Kovarik |
| 5,481,296 A | 1/1996 | Cragun et al. |
| 5,481,312 A | 1/1996 | Cash et al. |
| 5,483,278 A | 1/1996 | Strubbe et al. |
| 5,485,197 A | 1/1996 | Hoarty |

(56) References Cited

U.S. PATENT DOCUMENTS

| | | |
|---|---|---|
| 5,485,219 A | 1/1996 | Woo |
| 5,485,221 A | 1/1996 | Banker et al. |
| 5,485,518 A | 1/1996 | Hunter et al. |
| 5,488,409 A | 1/1996 | Yuen et al. |
| 5,491,820 A | 2/1996 | Belove et al. |
| 5,497,420 A | 3/1996 | Garneau et al. |
| 5,502,504 A | 3/1996 | Marshall et al. |
| 5,506,932 A | 4/1996 | Holmes et al. |
| 5,508,815 A | 4/1996 | Levine |
| 5,512,934 A | 4/1996 | Kochanski |
| 5,515,098 A | 5/1996 | Carles |
| 5,515,106 A | 5/1996 | Chaney et al. |
| 5,515,511 A | 5/1996 | Nguyen et al. |
| 5,517,254 A | 5/1996 | Monta et al. |
| 5,517,256 A | 5/1996 | Hashimoto |
| 5,517,257 A | 5/1996 | Dunn et al. |
| 5,517,321 A | 5/1996 | Yoshida |
| 5,517,605 A | 5/1996 | Wolf |
| 5,521,631 A | 5/1996 | Budow et al. |
| 5,521,712 A | 5/1996 | Oguro |
| 5,523,794 A | 6/1996 | Mankovitz et al. |
| 5,523,796 A | 6/1996 | Marshall et al. |
| 5,524,195 A | 6/1996 | Clanton, III et al. |
| 5,524,271 A | 6/1996 | Hollmann et al. |
| 5,524,272 A | 6/1996 | Podowski et al. |
| 5,526,034 A | 6/1996 | Hoarty et al. |
| 5,526,257 A | 6/1996 | Lerner |
| 5,528,304 A | 6/1996 | Cherrick et al. |
| 5,528,513 A | 6/1996 | Vaitzblit et al. |
| 5,530,754 A | 6/1996 | Garfinkle |
| 5,532,754 A | 7/1996 | Young et al. |
| 5,532,773 A | 7/1996 | Shaw et al. |
| 5,534,911 A | 7/1996 | Levitan |
| 5,537,141 A | 7/1996 | Harper et al. |
| 5,539,449 A | 7/1996 | Blahut et al. |
| 5,539,822 A | 7/1996 | Lett |
| 5,539,880 A | 7/1996 | Lakhani |
| 5,541,638 A | 7/1996 | Story |
| 5,541,662 A | 7/1996 | Adams et al. |
| 5,541,738 A | 7/1996 | Mankovitz |
| 5,543,852 A | 8/1996 | Yuen et al. |
| 5,543,856 A | 8/1996 | Rosser et al. |
| 5,543,929 A | 8/1996 | Mankovitz et al. |
| 5,543,933 A | 8/1996 | Kang et al. |
| 5,544,321 A | 8/1996 | Theimer et al. |
| 5,548,338 A | 8/1996 | Ellis et al. |
| 5,548,345 A | 8/1996 | Brian et al. |
| 5,550,575 A | 8/1996 | West et al. |
| 5,550,576 A | 8/1996 | Klosterman |
| 5,550,578 A | 8/1996 | Hoarty et al. |
| 5,550,825 A | 8/1996 | McMullan, Jr. et al. |
| 5,550,863 A | 8/1996 | Yurt et al. |
| 5,552,833 A | 9/1996 | Henmi et al. |
| 5,553,123 A | 9/1996 | Chan et al. |
| 5,553,221 A | 9/1996 | Reimer et al. |
| 5,557,338 A | 9/1996 | Maze et al. |
| 5,557,422 A | 9/1996 | Nishigaki et al. |
| 5,557,721 A | 9/1996 | Fite et al. |
| 5,557,724 A | 9/1996 | Sampat et al. |
| 5,558,339 A | 9/1996 | Perlman |
| 5,559,548 A | 9/1996 | Davis et al. |
| 5,559,549 A | 9/1996 | Hendricks et al. |
| 5,559,550 A | 9/1996 | Mankovitz |
| 5,561,709 A | 10/1996 | Remillard |
| 5,563,665 A | 10/1996 | Chang |
| 5,565,922 A | 10/1996 | Krause |
| 5,568,272 A | 10/1996 | Levine |
| 5,568,614 A | 10/1996 | Mendelson et al. |
| 5,570,295 A | 10/1996 | Isenberg et al. |
| 5,570,415 A | 10/1996 | Stretton et al. |
| 5,571,282 A | 11/1996 | Earle |
| 5,572,332 A | 11/1996 | Shin |
| 5,572,442 A | 11/1996 | Schulhof et al. |
| 5,574,778 A | 11/1996 | Ely et al. |
| 5,574,962 A | 11/1996 | Fardeau et al. |
| 5,574,965 A | 11/1996 | Welmer |
| 5,576,755 A | 11/1996 | Davis et al. |
| 5,576,951 A | 11/1996 | Lockwood |
| 5,579,239 A | 11/1996 | Freeman et al. |
| 5,581,479 A | 12/1996 | McLaughlin et al. |
| 5,581,614 A | 12/1996 | Ng et al. |
| 5,583,560 A | 12/1996 | Florin et al. |
| 5,583,561 A | 12/1996 | Baker et al. |
| 5,583,563 A | 12/1996 | Wanderscheid et al. |
| 5,583,566 A | 12/1996 | Kanno et al. |
| 5,583,576 A | 12/1996 | Perlman et al. |
| 5,583,653 A | 12/1996 | Timmermans |
| 5,583,763 A | 12/1996 | Atcheson et al. |
| 5,585,838 A | 12/1996 | Lawler et al. |
| 5,585,858 A | 12/1996 | Harper et al. |
| 5,585,865 A | 12/1996 | Amano et al. |
| 5,585,866 A | 12/1996 | Miller et al. |
| 5,586,264 A | 12/1996 | Belknap et al. |
| 5,589,874 A | 12/1996 | Buchin |
| 5,589,892 A | 12/1996 | Knee et al. |
| 5,589,945 A | 12/1996 | Abecassis |
| 5,592,482 A | 1/1997 | Abraham |
| 5,592,551 A | 1/1997 | Lett et al. |
| 5,592,571 A | 1/1997 | Peters |
| 5,594,490 A | 1/1997 | Dawson et al. |
| 5,594,491 A | 1/1997 | Hodge et al. |
| 5,594,509 A | 1/1997 | Florin et al. |
| 5,594,661 A | 1/1997 | Bruner et al. |
| 5,594,779 A | 1/1997 | Goodman |
| 5,595,865 A | 1/1997 | Possanza et al. |
| 5,596,361 A | 1/1997 | Martinez |
| 5,596,373 A | 1/1997 | White et al. |
| 5,596,705 A | 1/1997 | Reimer et al. |
| 5,598,523 A | 1/1997 | Fujita |
| 5,600,364 A | 2/1997 | Hendricks et al. |
| 5,600,365 A | 2/1997 | Kondo et al. |
| 5,600,573 A | 2/1997 | Hendricks et al. |
| 5,602,582 A | 2/1997 | Wanderscheid et al. |
| 5,606,374 A | 2/1997 | Bertram |
| 5,606,642 A | 2/1997 | Stautner et al. |
| 5,606,726 A | 2/1997 | Yoshinobu |
| 5,608,448 A | 3/1997 | Smoral et al. |
| 5,610,653 A | 3/1997 | Abecassis |
| 5,614,940 A | 3/1997 | Cobbley et al. |
| 5,616,876 A | 4/1997 | Cluts |
| 5,617,526 A | 4/1997 | Oran et al. |
| 5,617,565 A | 4/1997 | Augenbraun et al. |
| 5,619,247 A | 4/1997 | Russo |
| 5,619,249 A | 4/1997 | Billock et al. |
| 5,619,274 A | 4/1997 | Roop et al. |
| 5,619,335 A | 4/1997 | Tsinberg et al. |
| 5,619,570 A | 4/1997 | Tsutsui |
| 5,621,456 A | 4/1997 | Florin et al. |
| 5,621,579 A | 4/1997 | Yuen |
| 5,623,613 A | 4/1997 | Rowe et al. |
| 5,625,406 A | 4/1997 | Newberry et al. |
| 5,625,464 A | 4/1997 | Compoint et al. |
| 5,625,678 A | 4/1997 | Blomfield-Brown |
| 5,625,693 A | 4/1997 | Rohatgi et al. |
| 5,629,733 A | 5/1997 | Youman et al. |
| 5,629,867 A | 5/1997 | Goldman |
| 5,629,980 A | 5/1997 | Stefik et al. |
| 5,630,060 A | 5/1997 | Tang et al. |
| 5,630,067 A | 5/1997 | Kindell et al. |
| 5,630,119 A | 5/1997 | Aristides et al. |
| 5,631,995 A | 5/1997 | Weissensteiner et al. |
| 5,632,007 A | 5/1997 | Freeman |
| 5,634,051 A | 5/1997 | Thomson |
| 5,635,978 A | 6/1997 | Alten et al. |
| 5,635,979 A | 6/1997 | Kostreski et al. |
| 5,635,987 A | 6/1997 | Park et al. |
| 5,635,989 A | 6/1997 | Rothmuller |
| 5,636,346 A | 6/1997 | Saxe |
| 5,640,484 A | 6/1997 | Mankovitz |
| 5,646,603 A | 7/1997 | Nagata et al. |
| 5,646,796 A | 7/1997 | Kimura et al. |
| 5,648,813 A | 7/1997 | Tanigawa et al. |
| 5,648,824 A | 7/1997 | Dunn et al. |
| 5,650,826 A | 7/1997 | Eitz |

(56) References Cited

U.S. PATENT DOCUMENTS

| | | |
|---|---|---|
| 5,650,831 A | 7/1997 | Farwell |
| 5,651,129 A | 7/1997 | Yokote et al. |
| 5,652,613 A | 7/1997 | Lazarus et al. |
| 5,652,615 A | 7/1997 | Bryant et al. |
| 5,654,747 A | 8/1997 | Ottesen et al. |
| 5,654,748 A | 8/1997 | Matthews, III |
| 5,654,886 A | 8/1997 | Zereski, Jr. et al. |
| 5,655,214 A | 8/1997 | Mullett et al. |
| 5,657,072 A | 8/1997 | Aristides et al. |
| 5,657,091 A | 8/1997 | Bertram |
| 5,657,414 A | 8/1997 | Lett et al. |
| 5,659,350 A | 8/1997 | Hendricks et al. |
| 5,659,366 A | 8/1997 | Kerman |
| 5,659,367 A | 8/1997 | Yuen |
| 5,659,742 A | 8/1997 | Beattie et al. |
| 5,661,516 A | 8/1997 | Carles |
| 5,661,517 A | 8/1997 | Budow et al. |
| 5,663,757 A | 9/1997 | Morales |
| 5,666,293 A | 9/1997 | Metz et al. |
| 5,666,498 A | 9/1997 | Amro |
| 5,666,645 A | 9/1997 | Thomas et al. |
| 5,671,276 A | 9/1997 | Eyer et al. |
| 5,671,277 A | 9/1997 | Ikenoue et al. |
| 5,671,377 A | 9/1997 | Bleidt et al. |
| 5,671,411 A | 9/1997 | Watts et al. |
| 5,671,607 A | 9/1997 | Clemens et al. |
| 5,675,390 A | 10/1997 | Schindler et al. |
| 5,675,734 A | 10/1997 | Hair |
| 5,675,743 A | 10/1997 | Mavity |
| 5,675,752 A | 10/1997 | Scott et al. |
| 5,677,708 A | 10/1997 | Matthews, III et al. |
| 5,677,981 A | 10/1997 | Kato et al. |
| 5,678,041 A | 10/1997 | Baker et al. |
| 5,682,195 A | 10/1997 | Hendricks et al. |
| 5,682,206 A | 10/1997 | Wehmeyer et al. |
| 5,682,525 A | 10/1997 | Bouve et al. |
| 5,684,511 A | 11/1997 | Westerink et al. |
| 5,684,525 A | 11/1997 | Klosterman |
| 5,686,954 A | 11/1997 | Yoshinobu et al. |
| 5,687,331 A | 11/1997 | Volk et al. |
| 5,689,648 A | 11/1997 | Diaz et al. |
| 5,689,663 A | 11/1997 | Williams |
| 5,689,666 A | 11/1997 | Berquist et al. |
| 5,691,476 A | 11/1997 | Madaras |
| 5,692,213 A | 11/1997 | Goldberg et al. |
| 5,692,214 A | 11/1997 | Levine |
| 5,692,335 A | 12/1997 | Magnuson |
| 5,694,163 A | 12/1997 | Harrison |
| 5,694,176 A | 12/1997 | Bruette et al. |
| 5,694,381 A | 12/1997 | Sako |
| 5,696,695 A | 12/1997 | Ehlers et al. |
| 5,696,765 A | 12/1997 | Safadi |
| 5,696,824 A | 12/1997 | Walsh |
| 5,696,869 A | 12/1997 | Abecassis |
| 5,696,905 A | 12/1997 | Reimer et al. |
| 5,699,052 A | 12/1997 | Miyahara |
| 5,699,107 A | 12/1997 | Lawler et al. |
| 5,699,125 A | 12/1997 | Rzeszewski et al. |
| 5,699,528 A | 12/1997 | Hogan |
| 5,701,383 A | 12/1997 | Russo et al. |
| 5,703,604 A | 12/1997 | McCutchen |
| 5,708,478 A | 1/1998 | Tognazzini |
| 5,708,767 A | 1/1998 | Yeo et al. |
| 5,708,780 A | 1/1998 | Levergood et al. |
| 5,708,845 A | 1/1998 | Wistendahl et al. |
| 5,708,961 A | 1/1998 | Hylton et al. |
| 5,710,601 A | 1/1998 | Marshall et al. |
| 5,710,605 A | 1/1998 | Nelson |
| 5,710,815 A | 1/1998 | Ming et al. |
| 5,710,884 A | 1/1998 | Dedrick |
| 5,715,020 A | 2/1998 | Kuroiwa et al. |
| 5,717,452 A | 2/1998 | Janin et al. |
| 5,717,923 A | 2/1998 | Dedrick |
| 5,721,815 A | 2/1998 | Ottesen et al. |
| 5,721,829 A | 2/1998 | Dunn et al. |
| 5,722,041 A | 2/1998 | Freadman |
| 5,724,091 A | 3/1998 | Freeman et al. |
| 5,724,103 A | 3/1998 | Batchelor |
| 5,724,203 A | 3/1998 | Kwoh et al. |
| 5,724,521 A | 3/1998 | Dedrick |
| 5,724,525 A | 3/1998 | Beyers, II et al. |
| 5,724,546 A | 3/1998 | Tsutsui et al. |
| 5,724,567 A | 3/1998 | Rose et al. |
| 5,726,702 A | 3/1998 | Hamaguchi et al. |
| 5,727,060 A | 3/1998 | Young |
| 5,729,741 A | 3/1998 | Liaguno et al. |
| 5,731,844 A | 3/1998 | Rauch et al. |
| 5,732,216 A | 3/1998 | Logan et al. |
| 5,734,119 A | 3/1998 | France et al. |
| 5,734,431 A | 3/1998 | Dachiku et al. |
| 5,734,720 A | 3/1998 | Salganicoff |
| 5,734,853 A | 3/1998 | Hendricks et al. |
| 5,734,886 A | 3/1998 | Grosse et al. |
| 5,734,893 A | 3/1998 | Li et al. |
| 5,737,028 A | 4/1998 | Bertram et al. |
| 5,737,552 A | 4/1998 | Lavallee et al. |
| 5,740,231 A | 4/1998 | Cohn et al. |
| 5,740,388 A | 4/1998 | Hunt |
| 5,740,549 A | 4/1998 | Reilly et al. |
| 5,742,443 A | 4/1998 | Tsao et al. |
| 5,742,816 A | 4/1998 | Barr et al. |
| 5,742,905 A | 4/1998 | Pepe et al. |
| 5,745,710 A | 4/1998 | Clanton, III et al. |
| 5,748,191 A | 5/1998 | Rozak et al. |
| 5,748,716 A | 5/1998 | Levine |
| 5,748,732 A | 5/1998 | Le Berre et al. |
| 5,749,043 A | 5/1998 | Worthy |
| 5,749,081 A | 5/1998 | Whiteis |
| 5,751,282 A | 5/1998 | Girard et al. |
| 5,751,286 A | 5/1998 | Barber et al. |
| 5,751,672 A | 5/1998 | Yankowski |
| 5,751,883 A | 5/1998 | Ottesen et al. |
| 5,752,159 A | 5/1998 | Faust et al. |
| 5,752,160 A | 5/1998 | Dunn |
| 5,752,246 A | 5/1998 | Rogers et al. |
| 5,754,771 A | 5/1998 | Epperson et al. |
| 5,754,938 A | 5/1998 | Herz et al. |
| 5,754,939 A | 5/1998 | Herz et al. |
| 5,757,415 A | 5/1998 | Asamizuya et al. |
| 5,757,417 A | 5/1998 | Aras et al. |
| 5,758,257 A | 5/1998 | Herz et al. |
| 5,758,258 A | 5/1998 | Shoff et al. |
| 5,758,259 A | 5/1998 | Lawler |
| 5,760,767 A | 6/1998 | Shore et al. |
| 5,760,821 A | 6/1998 | Ellis et al. |
| 5,761,372 A | 6/1998 | Yoshinobu et al. |
| 5,761,417 A | 6/1998 | Henley et al. |
| 5,761,601 A | 6/1998 | Nemirofsky et al. |
| 5,761,606 A | 6/1998 | Wolzien |
| 5,761,607 A | 6/1998 | Gudesen et al. |
| 5,761,662 A | 6/1998 | Dasan |
| 5,764,281 A | 6/1998 | Seo |
| 5,767,896 A | 6/1998 | Nemirofsky |
| 5,768,528 A | 6/1998 | Stumm |
| 5,771,275 A | 6/1998 | Brunner et al. |
| 5,771,354 A | 6/1998 | Crawford |
| 5,774,170 A | 6/1998 | Hite et al. |
| 5,774,357 A | 6/1998 | Hoffberg et al. |
| 5,774,534 A | 6/1998 | Mayer |
| 5,774,539 A | 6/1998 | Maass et al. |
| 5,774,664 A | 6/1998 | Hidary et al. |
| 5,774,666 A | 6/1998 | Portuesi |
| 5,774,859 A | 6/1998 | Houser et al. |
| 5,778,181 A | 7/1998 | Hidary et al. |
| 5,778,182 A | 7/1998 | Cathey et al. |
| 5,778,187 A | 7/1998 | Monteiro et al. |
| 5,778,367 A | 7/1998 | Wesinger, Jr. et al. |
| 5,781,226 A | 7/1998 | Sheehan |
| 5,781,227 A | 7/1998 | Goode et al. |
| 5,781,228 A | 7/1998 | Sposato |
| 5,781,246 A | 7/1998 | Alten et al. |
| 5,781,734 A | 7/1998 | Ohno et al. |
| 5,787,259 A | 7/1998 | Haroun et al. |
| 5,788,507 A | 8/1998 | Redford et al. |

(56) References Cited

U.S. PATENT DOCUMENTS

| | | |
|---|---|---|
| 5,790,176 A | 8/1998 | Craig |
| 5,790,198 A | 8/1998 | Roop et al. |
| 5,790,201 A | 8/1998 | Antos |
| 5,790,202 A | 8/1998 | Kummer et al. |
| 5,790,423 A | 8/1998 | Lau et al. |
| 5,790,426 A | 8/1998 | Robinson |
| 5,790,753 A | 8/1998 | Krishnamoorthy et al. |
| 5,790,835 A | 8/1998 | Case et al. |
| 5,790,935 A | 8/1998 | Payton |
| 5,790,952 A | 8/1998 | Seazholtz et al. |
| 5,793,366 A | 8/1998 | Mano et al. |
| 5,793,409 A | 8/1998 | Tetsumura |
| 5,793,412 A | 8/1998 | Asamizuya |
| 5,793,438 A | 8/1998 | Bedard |
| 5,793,964 A | 8/1998 | Rogers et al. |
| 5,793,971 A | 8/1998 | Fujita et al. |
| 5,793,972 A | 8/1998 | Shane et al. |
| 5,794,217 A | 8/1998 | Allen |
| 5,796,829 A | 8/1998 | Newby et al. |
| 5,796,952 A | 8/1998 | Davis et al. |
| 5,798,785 A | 8/1998 | Hendricks et al. |
| 5,798,921 A | 8/1998 | Johnson et al. |
| 5,801,747 A | 9/1998 | Bedard |
| 5,801,785 A | 9/1998 | Crump et al. |
| 5,801,787 A | 9/1998 | Schein et al. |
| 5,802,284 A | 9/1998 | Karlton et al. |
| 5,805,154 A | 9/1998 | Brown |
| 5,805,155 A | 9/1998 | Allibhoy et al. |
| 5,805,167 A | 9/1998 | van Cruyningen |
| 5,805,204 A | 9/1998 | Thompson et al. |
| 5,805,763 A | 9/1998 | Lawler et al. |
| 5,805,804 A | 9/1998 | Laursen et al. |
| 5,805,806 A | 9/1998 | McArthur |
| 5,806,191 A | 9/1998 | Yokoyama et al. |
| 5,808,608 A | 9/1998 | Young et al. |
| 5,808,628 A | 9/1998 | Hinson et al. |
| 5,808,662 A | 9/1998 | Kinney et al. |
| 5,808,694 A | 9/1998 | Usui et al. |
| 5,809,204 A | 9/1998 | Young et al. |
| 5,809,214 A | 9/1998 | Nureki et al. |
| 5,809,242 A | 9/1998 | Shaw et al. |
| 5,809,246 A | 9/1998 | Goldman |
| 5,809,471 A | 9/1998 | Brodsky |
| 5,812,123 A | 9/1998 | Rowe et al. |
| 5,812,124 A | 9/1998 | Eick et al. |
| 5,812,134 A | 9/1998 | Pooser et al. |
| 5,812,205 A | 9/1998 | Milnes et al. |
| 5,812,763 A | 9/1998 | Teng |
| 5,812,930 A | 9/1998 | Zavrel |
| 5,812,931 A | 9/1998 | Yuen |
| 5,812,937 A | 9/1998 | Takahisa et al. |
| 5,813,009 A | 9/1998 | Johnson et al. |
| 5,815,145 A | 9/1998 | Matthews, III |
| 5,815,146 A | 9/1998 | Youden et al. |
| 5,815,297 A | 9/1998 | Ciciora |
| 5,815,662 A | 9/1998 | Ong |
| 5,815,671 A | 9/1998 | Morrison |
| 5,818,438 A | 10/1998 | Howe et al. |
| 5,818,439 A | 10/1998 | Nagasaka et al. |
| 5,818,441 A | 10/1998 | Throckmorton et al. |
| 5,818,511 A | 10/1998 | Farry et al. |
| 5,818,935 A | 10/1998 | Maa |
| 5,819,019 A | 10/1998 | Nelson |
| 5,819,156 A | 10/1998 | Belmont |
| 5,819,160 A | 10/1998 | Foladare et al. |
| 5,819,284 A | 10/1998 | Farber et al. |
| 5,819,285 A | 10/1998 | Damico et al. |
| 5,822,123 A | 10/1998 | Davis et al. |
| 5,822,530 A | 10/1998 | Brown |
| 5,822,606 A | 10/1998 | Morton |
| 5,825,407 A | 10/1998 | Cowe et al. |
| 5,828,419 A | 10/1998 | Bruette et al. |
| 5,828,420 A | 10/1998 | Marshall et al. |
| 5,828,839 A | 10/1998 | Moncreiff |
| 5,828,945 A | 10/1998 | Klosterman |
| RE35,954 E | 11/1998 | Levine |
| 5,830,068 A | 11/1998 | Brenner et al. |
| 5,831,664 A | 11/1998 | Wharton et al. |
| 5,832,223 A | 11/1998 | Hara et al. |
| 5,832,287 A | 11/1998 | Atalla |
| 5,833,468 A | 11/1998 | Guy et al. |
| 5,835,126 A | 11/1998 | Lewis |
| 5,835,717 A | 11/1998 | Karlton et al. |
| 5,838,314 A | 11/1998 | Neel et al. |
| 5,838,319 A | 11/1998 | Guzak et al. |
| 5,838,383 A | 11/1998 | Chimoto et al. |
| 5,841,979 A | 11/1998 | Schulhof et al. |
| 5,842,010 A | 11/1998 | Jain et al. |
| 5,842,199 A | 11/1998 | Miller et al. |
| 5,844,552 A | 12/1998 | Gaughan et al. |
| 5,844,620 A | 12/1998 | Coleman et al. |
| 5,848,396 A | 12/1998 | Gerace |
| 5,850,218 A | 12/1998 | LaJoie et al. |
| 5,851,149 A | 12/1998 | Xidos et al. |
| 5,852,437 A | 12/1998 | Wugofski et al. |
| 5,861,881 A | 1/1999 | Freeman et al. |
| 5,861,906 A | 1/1999 | Dunn et al. |
| 5,862,292 A | 1/1999 | Kubota et al. |
| 5,864,704 A | 1/1999 | Battle et al. |
| 5,864,823 A | 1/1999 | Levitan |
| 5,867,223 A | 2/1999 | Schindler et al. |
| 5,867,226 A | 2/1999 | Wehmeyer et al. |
| 5,867,227 A | 2/1999 | Yamaguchi |
| 5,867,233 A | 2/1999 | Tanaka et al. |
| 5,867,799 A | 2/1999 | Lang et al. |
| 5,870,543 A | 2/1999 | Ronning |
| 5,870,754 A | 2/1999 | Dimitrova et al. |
| 5,872,588 A | 2/1999 | Aras et al. |
| 5,873,660 A | 2/1999 | Walsh et al. |
| 5,874,985 A | 2/1999 | Matthews, III |
| 5,875,108 A | 2/1999 | Hoffberg et al. |
| 5,877,906 A | 3/1999 | Nagasawa et al. |
| 5,878,222 A | 3/1999 | Harrison |
| 5,880,720 A | 3/1999 | Iwafune et al. |
| 5,880,768 A | 3/1999 | Lemmons et al. |
| 5,881,245 A | 3/1999 | Thompson |
| 5,883,621 A | 3/1999 | Iwamura |
| 5,883,677 A | 3/1999 | Hofmann |
| 5,884,028 A | 3/1999 | Kindell et al. |
| 5,884,056 A | 3/1999 | Steele |
| 5,884,141 A * | 3/1999 | Inoue .................. H04N 5/44 715/719 |
| 5,884,298 A | 3/1999 | Smith, II et al. |
| 5,886,691 A | 3/1999 | Furuya et al. |
| 5,886,707 A | 3/1999 | Berg |
| 5,886,731 A | 3/1999 | Ebisawa |
| 5,886,732 A | 3/1999 | Humpleman |
| 5,886,742 A | 3/1999 | Hibi et al. |
| 5,887,243 A | 3/1999 | Harvey et al. |
| 5,889,950 A | 3/1999 | Kuzma |
| 5,890,138 A | 3/1999 | Godin et al. |
| 5,892,535 A | 4/1999 | Allen et al. |
| 5,892,536 A | 4/1999 | Logan et al. |
| 5,892,767 A | 4/1999 | Bell et al. |
| 5,892,915 A | 4/1999 | Duso et al. |
| 5,894,589 A | 4/1999 | Reber et al. |
| 5,895,474 A | 4/1999 | Maarek et al. |
| 5,896,414 A | 4/1999 | Meyer et al. |
| 5,898,441 A | 4/1999 | Flurry |
| 5,898,456 A | 4/1999 | Wahl |
| 5,899,576 A | 5/1999 | Fukuzawa |
| 5,899,582 A | 5/1999 | DuLac |
| 5,899,920 A | 5/1999 | DeSatnick et al. |
| 5,900,867 A | 5/1999 | Schindler et al. |
| 5,900,904 A | 5/1999 | Okada et al. |
| 5,900,905 A | 5/1999 | Shoff et al. |
| 5,901,366 A | 5/1999 | Nakano et al. |
| 5,903,234 A | 5/1999 | Kimura |
| 5,903,263 A | 5/1999 | Emura |
| 5,903,264 A | 5/1999 | Moeller et al. |
| 5,903,314 A | 5/1999 | Niijima et al. |
| 5,903,454 A | 5/1999 | Hoffberg et al. |
| 5,903,545 A | 5/1999 | Sabourin et al. |
| 5,903,723 A | 5/1999 | Beck et al. |

(56) References Cited

U.S. PATENT DOCUMENTS

| | | |
|---|---|---|
| 5,903,816 A | 5/1999 | Broadwin et al. |
| 5,903,892 A | 5/1999 | Hoffert et al. |
| 5,905,522 A | 5/1999 | Lawler |
| 5,905,847 A | 5/1999 | Kobayashi et al. |
| 5,905,865 A | 5/1999 | Palmer et al. |
| 5,907,322 A | 5/1999 | Kelly et al. |
| 5,907,323 A | 5/1999 | Lawler et al. |
| 5,907,366 A | 5/1999 | Farmer et al. |
| 5,909,212 A | 6/1999 | Nishina et al. |
| 5,909,638 A | 6/1999 | Allen |
| 5,911,046 A | 6/1999 | Amano |
| 5,911,139 A | 6/1999 | Jain et al. |
| 5,912,664 A | 6/1999 | Eick et al. |
| 5,913,039 A | 6/1999 | Nakamura et al. |
| 5,914,712 A | 6/1999 | Sartain et al. |
| 5,914,746 A | 6/1999 | Matthews, III et al. |
| 5,914,941 A | 6/1999 | Janky |
| 5,915,026 A | 6/1999 | Mankovitz |
| 5,915,068 A | 6/1999 | Levine |
| 5,915,090 A | 6/1999 | Joseph et al. |
| 5,915,094 A | 6/1999 | Kouloheris et al. |
| 5,915,250 A | 6/1999 | Jain et al. |
| 5,916,303 A | 6/1999 | Scott |
| 5,917,405 A | 6/1999 | Joao |
| 5,917,481 A | 6/1999 | Rzeszewski et al. |
| 5,917,538 A | 6/1999 | Asamizuya |
| 5,917,830 A | 6/1999 | Chen et al. |
| 5,917,835 A | 6/1999 | Barrett et al. |
| 5,918,014 A | 6/1999 | Robinson |
| 5,918,213 A | 6/1999 | Bernard et al. |
| 5,920,700 A | 7/1999 | Gordon et al. |
| 5,920,702 A | 7/1999 | Bleidt et al. |
| 5,920,800 A | 7/1999 | Schafer |
| 5,920,842 A | 7/1999 | Cooper et al. |
| 5,922,045 A | 7/1999 | Hanson |
| 5,922,048 A | 7/1999 | Emura |
| 5,923,361 A | 7/1999 | Sutton, Jr. |
| 5,923,848 A | 7/1999 | Goodhand et al. |
| 5,926,204 A | 7/1999 | Mayer |
| 5,926,205 A | 7/1999 | Krause et al. |
| 5,926,624 A | 7/1999 | Katz et al. |
| 5,928,327 A | 7/1999 | Wang et al. |
| 5,929,849 A | 7/1999 | Kikinis |
| 5,929,850 A | 7/1999 | Broadwin et al. |
| 5,929,932 A | 7/1999 | Otsuki et al. |
| 5,930,473 A | 7/1999 | Teng et al. |
| 5,930,493 A | 7/1999 | Ottesen et al. |
| 5,931,901 A | 8/1999 | Wolfe et al. |
| 5,931,905 A | 8/1999 | Hashimoto et al. |
| 5,933,603 A | 8/1999 | Vahalia et al. |
| 5,933,835 A | 8/1999 | Adams et al. |
| 5,935,206 A | 8/1999 | Dixon et al. |
| 5,936,569 A | 8/1999 | Ståhle et al. |
| 5,936,673 A | 8/1999 | Agarwal |
| 5,937,160 A | 8/1999 | Davis et al. |
| 5,940,071 A | 8/1999 | Treffers et al. |
| 5,940,073 A | 8/1999 | Klosterman et al. |
| 5,940,387 A | 8/1999 | Humpleman |
| 5,940,572 A | 8/1999 | Balaban et al. |
| 5,943,046 A | 8/1999 | Cave et al. |
| 5,943,047 A | 8/1999 | Suzuki |
| 5,945,987 A | 8/1999 | Dunn |
| 5,945,988 A | 8/1999 | Williams et al. |
| 5,946,386 A | 8/1999 | Rogers et al. |
| 5,947,746 A | 9/1999 | Tsai |
| 5,949,411 A | 9/1999 | Doerr et al. |
| 5,949,954 A | 9/1999 | Young et al. |
| 5,951,642 A | 9/1999 | Onoe et al. |
| 5,953,005 A | 9/1999 | Liu |
| 5,953,485 A | 9/1999 | Abecassis |
| 5,955,988 A | 9/1999 | Blonstein et al. |
| 5,956,025 A | 9/1999 | Goulden et al. |
| 5,956,482 A | 9/1999 | Agraharam et al. |
| 5,956,487 A | 9/1999 | Venkatraman et al. |
| 5,956,716 A | 9/1999 | Kenner et al. |
| 5,957,695 A | 9/1999 | Redford et al. |
| 5,959,592 A | 9/1999 | Petruzzelli |
| 5,959,659 A | 9/1999 | Dokic |
| 5,959,688 A | 9/1999 | Schein et al. |
| 5,960,411 A | 9/1999 | Hartman et al. |
| 5,961,603 A | 10/1999 | Kunkel et al. |
| 5,963,202 A | 10/1999 | Polish |
| 5,963,264 A | 10/1999 | Jackson |
| 5,963,645 A | 10/1999 | Kigawa et al. |
| 5,964,455 A | 10/1999 | Catanzarite et al. |
| 5,966,187 A | 10/1999 | Do |
| 5,969,283 A | 10/1999 | Looney et al. |
| 5,969,714 A | 10/1999 | Butcher |
| 5,969,748 A | 10/1999 | Casement et al. |
| 5,970,473 A | 10/1999 | Gerszberg et al. |
| 5,970,486 A | 10/1999 | Yoshida et al. |
| 5,973,680 A | 10/1999 | Ueda |
| 5,973,683 A | 10/1999 | Cragun et al. |
| 5,973,722 A | 10/1999 | Wakai et al. |
| 5,974,217 A | 10/1999 | Haraguchi |
| 5,974,222 A | 10/1999 | Yuen et al. |
| 5,977,963 A | 11/1999 | Gaughan et al. |
| 5,977,964 A | 11/1999 | Williams et al. |
| 5,978,567 A | 11/1999 | Rebane et al. |
| 5,978,843 A | 11/1999 | Wu et al. |
| 5,982,411 A | 11/1999 | Eyer et al. |
| 5,983,236 A | 11/1999 | Yager et al. |
| 5,986,650 A | 11/1999 | Ellis et al. |
| 5,987,213 A | 11/1999 | Mankovitz et al. |
| 5,987,454 A | 11/1999 | Hobbs |
| 5,987,509 A | 11/1999 | Portuesi |
| 5,987,621 A | 11/1999 | Duso et al. |
| 5,988,078 A | 11/1999 | Levine |
| 5,990,881 A | 11/1999 | Inoue et al. |
| 5,990,884 A | 11/1999 | Douma et al. |
| 5,990,885 A | 11/1999 | Gopinath |
| 5,990,890 A | 11/1999 | Etheredge |
| 5,990,927 A | 11/1999 | Hendricks et al. |
| 5,991,498 A | 11/1999 | Young |
| 5,991,735 A | 11/1999 | Gerace |
| 5,991,799 A | 11/1999 | Yen et al. |
| 5,991,832 A | 11/1999 | Sato et al. |
| 5,995,155 A | 11/1999 | Schindler et al. |
| 5,999,688 A | 12/1999 | Iggulden et al. |
| 5,999,970 A | 12/1999 | Krisbergh et al. |
| 6,002,393 A | 12/1999 | Hite et al. |
| 6,002,394 A | 12/1999 | Schein et al. |
| 6,002,443 A | 12/1999 | Iggulden |
| 6,002,444 A | 12/1999 | Marshall et al. |
| 6,002,450 A | 12/1999 | Darbee et al. |
| 6,002,694 A | 12/1999 | Yoshizawa et al. |
| 6,002,720 A | 12/1999 | Yurt et al. |
| 6,003,030 A | 12/1999 | Kenner et al. |
| 6,005,561 A | 12/1999 | Hawkins et al. |
| 6,005,563 A | 12/1999 | White et al. |
| 6,005,564 A | 12/1999 | Ahmad et al. |
| 6,005,565 A | 12/1999 | Legall et al. |
| 6,005,566 A | 12/1999 | Jones et al. |
| 6,005,597 A | 12/1999 | Barrett et al. |
| 6,005,600 A | 12/1999 | Hill |
| 6,005,631 A | 12/1999 | Anderson et al. |
| 6,006,257 A | 12/1999 | Slezak |
| 6,008,802 A | 12/1999 | Iki et al. |
| 6,008,803 A | 12/1999 | Rowe et al. |
| 6,009,153 A | 12/1999 | Houghton et al. |
| 6,009,465 A | 12/1999 | Decker et al. |
| 6,011,546 A | 1/2000 | Bertram |
| 6,012,086 A | 1/2000 | Lowell |
| 6,012,089 A | 1/2000 | Hasegawa |
| 6,012,091 A | 1/2000 | Boyce |
| 6,014,184 A | 1/2000 | Knee et al. |
| 6,014,381 A | 1/2000 | Troxel et al. |
| 6,014,502 A | 1/2000 | Moraes |
| 6,014,689 A | 1/2000 | Budge et al. |
| 6,014,693 A | 1/2000 | Ito et al. |
| 6,014,694 A | 1/2000 | Aharoni et al. |
| 6,014,706 A | 1/2000 | Cannon et al. |
| 6,016,141 A | 1/2000 | Knudson et al. |
| 6,018,359 A | 1/2000 | Kermode et al. |

(56) References Cited

U.S. PATENT DOCUMENTS

| | | |
|---|---|---|
| 6,018,372 A | 1/2000 | Etheredge |
| 6,018,612 A | 1/2000 | Thomason et al. |
| 6,018,765 A | 1/2000 | Durana et al. |
| 6,018,768 A | 1/2000 | Ullman et al. |
| 6,020,880 A | 2/2000 | Naimpally |
| 6,020,883 A | 2/2000 | Herz et al. |
| 6,020,912 A | 2/2000 | De Lang |
| 6,020,929 A | 2/2000 | Marshall et al. |
| 6,020,930 A | 2/2000 | Legrand |
| 6,022,223 A | 2/2000 | Taniguchi et al. |
| 6,023,267 A | 2/2000 | Chapuis et al. |
| 6,023,725 A | 2/2000 | Ozawa et al. |
| 6,025,837 A | 2/2000 | Matthews, III et al. |
| 6,025,868 A | 2/2000 | Russo |
| 6,025,869 A | 2/2000 | Stas et al. |
| 6,025,886 A | 2/2000 | Koda |
| 6,028,599 A | 2/2000 | Yuen et al. |
| 6,028,600 A | 2/2000 | Rosin et al. |
| 6,028,603 A | 2/2000 | Wang et al. |
| 6,029,045 A | 2/2000 | Picco et al. |
| 6,029,064 A | 2/2000 | Farris et al. |
| 6,029,176 A | 2/2000 | Cannon |
| 6,029,195 A | 2/2000 | Herz |
| 6,031,806 A | 2/2000 | Tomita |
| 6,032,202 A | 2/2000 | Lea et al. |
| 6,035,091 A | 3/2000 | Kazo |
| 6,035,339 A | 3/2000 | Agraharam et al. |
| 6,038,367 A | 3/2000 | Abecassis |
| 6,038,544 A | 3/2000 | Machin et al. |
| 6,038,591 A | 3/2000 | Wolfe et al. |
| 6,038,614 A | 3/2000 | Chan et al. |
| 6,040,829 A | 3/2000 | Croy et al. |
| 6,049,823 A | 4/2000 | Hwang |
| 6,049,824 A | 4/2000 | Simonin |
| 6,049,831 A | 4/2000 | Gardell et al. |
| 6,052,145 A | 4/2000 | Macrae et al. |
| 6,057,872 A | 5/2000 | Candelore |
| 6,057,890 A | 5/2000 | Virden et al. |
| 6,058,238 A | 5/2000 | Ng |
| 6,058,242 A | 5/2000 | Kim |
| 6,061,056 A | 5/2000 | Menard et al. |
| 6,061,082 A | 5/2000 | Park |
| 6,061,097 A | 5/2000 | Satterfield |
| 6,061,779 A | 5/2000 | Garde |
| 6,064,376 A | 5/2000 | Berezowski et al. |
| 6,064,380 A | 5/2000 | Swenson et al. |
| 6,064,980 A | 5/2000 | Jacobi et al. |
| 6,065,047 A | 5/2000 | Carpenter et al. |
| 6,067,561 A | 5/2000 | Dillon |
| 6,067,564 A | 5/2000 | Urakoshi et al. |
| 6,072,460 A | 6/2000 | Marshall et al. |
| 6,072,982 A | 6/2000 | Haddad |
| 6,075,526 A | 6/2000 | Rothmuller |
| 6,075,530 A | 6/2000 | Lucas et al. |
| 6,075,568 A | 6/2000 | Matsuura |
| 6,075,575 A | 6/2000 | Schein et al. |
| 6,078,348 A | 6/2000 | Klosterman et al. |
| 6,078,914 A | 6/2000 | Redfern |
| 6,081,291 A | 6/2000 | Ludwig, Jr. |
| 6,081,750 A | 6/2000 | Hoffberg et al. |
| 6,081,830 A | 6/2000 | Schindler |
| 6,085,236 A | 7/2000 | Lea |
| 6,088,722 A | 7/2000 | Herz et al. |
| 6,088,945 A | 7/2000 | Sanderfoot |
| 6,091,823 A | 7/2000 | Hosomi et al. |
| 6,091,883 A | 7/2000 | Artigalas et al. |
| 6,091,884 A | 7/2000 | Yuen et al. |
| RE36,801 E | 8/2000 | Logan et al. |
| 6,097,441 A | 8/2000 | Allport |
| 6,097,878 A | 8/2000 | Saib |
| 6,098,065 A | 8/2000 | Skillen et al. |
| 6,098,082 A | 8/2000 | Gibbon et al. |
| 6,104,334 A | 8/2000 | Allport |
| 6,104,705 A | 8/2000 | Ismail et al. |
| 6,111,614 A | 8/2000 | Mugura et al. |
| 6,111,677 A | 8/2000 | Shintani et al. |
| 6,112,181 A | 8/2000 | Shear et al. |
| 6,112,186 A | 8/2000 | Bergh et al. |
| 6,115,057 A | 9/2000 | Kwoh et al. |
| 6,118,450 A | 9/2000 | Proehl et al. |
| 6,118,492 A | 9/2000 | Milnes et al. |
| 6,119,098 A | 9/2000 | Guyot et al. |
| 6,119,101 A | 9/2000 | Peckover |
| 6,119,144 A | 9/2000 | Fujita et al. |
| 6,122,011 A | 9/2000 | Dias et al. |
| 6,124,854 A | 9/2000 | Sartain et al. |
| 6,125,230 A | 9/2000 | Yaginuma |
| 6,125,231 A | 9/2000 | Yuen et al. |
| 6,130,726 A | 10/2000 | Darbee et al. |
| 6,133,847 A | 10/2000 | Yang |
| 6,133,909 A | 10/2000 | Schein et al. |
| 6,133,910 A | 10/2000 | Stinebruner |
| 6,133,912 A | 10/2000 | Montero |
| 6,139,177 A | 10/2000 | Venkatraman et al. |
| 6,141,003 A | 10/2000 | Chor et al. |
| 6,141,488 A | 10/2000 | Knudson et al. |
| 6,141,693 A | 10/2000 | Perlman et al. |
| 6,144,401 A | 11/2000 | Casement et al. |
| 6,144,702 A | 11/2000 | Yurt et al. |
| 6,147,715 A | 11/2000 | Yuen et al. |
| 6,151,059 A | 11/2000 | Schein et al. |
| 6,151,643 A | 11/2000 | Cheng et al. |
| 6,154,203 A | 11/2000 | Yuen et al. |
| 6,154,206 A | 11/2000 | Ludtke |
| 6,154,771 A | 11/2000 | Rangan et al. |
| 6,155,001 A | 12/2000 | Marin |
| 6,157,411 A | 12/2000 | Williams et al. |
| 6,157,413 A | 12/2000 | Hanafee et al. |
| 6,160,545 A | 12/2000 | Eyer et al. |
| 6,160,546 A | 12/2000 | Thompson et al. |
| 6,160,570 A | 12/2000 | Sitnik |
| 6,160,796 A | 12/2000 | Zou et al. |
| 6,160,988 A | 12/2000 | Shroyer |
| 6,163,316 A | 12/2000 | Killian |
| 6,163,345 A | 12/2000 | Noguchi et al. |
| 6,166,730 A * | 12/2000 | Goode ............... H04N 7/17336 348/E7.073 |
| 6,166,735 A | 12/2000 | Dom et al. |
| 6,166,778 A | 12/2000 | Yamamoto et al. |
| 6,167,188 A | 12/2000 | Young et al. |
| 6,169,542 B1 | 1/2001 | Hooks et al. |
| 6,169,543 B1 | 1/2001 | Wehmeyer |
| 6,169,725 B1 | 1/2001 | Gibbs et al. |
| 6,169,844 B1 | 1/2001 | Arai |
| 6,170,006 B1 | 1/2001 | Namba |
| 6,172,674 B1 | 1/2001 | Etheredge |
| 6,172,677 B1 | 1/2001 | Stautner et al. |
| 6,172,712 B1 | 1/2001 | Beard |
| 6,177,931 B1 | 1/2001 | Alexander et al. |
| 6,178,446 B1 | 1/2001 | Gerszberg et al. |
| 6,181,335 B1 | 1/2001 | Hendricks et al. |
| 6,181,867 B1 | 1/2001 | Kenner et al. |
| 6,182,094 B1 | 1/2001 | Humpleman et al. |
| 6,184,877 B1 | 2/2001 | Dodson et al. |
| 6,184,878 B1 | 2/2001 | Alonso et al. |
| 6,185,360 B1 | 2/2001 | Inoue et al. |
| 6,185,573 B1 | 2/2001 | Angelucci et al. |
| 6,185,621 B1 | 2/2001 | Romine |
| 6,186,287 B1 | 2/2001 | Heidenreich et al. |
| 6,188,381 B1 | 2/2001 | van der Wal et al. |
| 6,188,397 B1 | 2/2001 | Humpleman |
| 6,192,340 B1 | 2/2001 | Abecassis |
| 6,195,501 B1 | 2/2001 | Perry et al. |
| 6,198,479 B1 | 3/2001 | Humpleman et al. |
| 6,199,076 B1 | 3/2001 | Logan et al. |
| 6,201,536 B1 | 3/2001 | Hendricks et al. |
| 6,202,211 B1 | 3/2001 | Williams, Jr. |
| 6,202,212 B1 | 3/2001 | Sturgeon et al. |
| 6,205,485 B1 | 3/2001 | Kikinis |
| 6,208,335 B1 | 3/2001 | Gordon et al. |
| 6,208,341 B1 | 3/2001 | van Ee et al. |
| 6,208,384 B1 | 3/2001 | Schultheiss |
| 6,208,799 B1 | 3/2001 | Marsh et al. |
| 6,209,103 B1 | 3/2001 | Schreiber et al. |

(56) References Cited

U.S. PATENT DOCUMENTS

| | | |
|---|---|---|
| 6,209,129 B1 | 3/2001 | Carr et al. |
| 6,209,130 B1 | 3/2001 | Rector, Jr. et al. |
| 6,212,327 B1 | 4/2001 | Berstis et al. |
| 6,212,553 B1 | 4/2001 | Lee et al. |
| 6,216,264 B1 | 4/2001 | Maze et al. |
| 6,219,489 B1 | 4/2001 | Ohta et al. |
| 6,219,839 B1 | 4/2001 | Sampsell |
| 6,226,444 B1 | 5/2001 | Goldschmidt Iki et al. |
| 6,226,447 B1 | 5/2001 | Sasaki et al. |
| 6,230,200 B1 | 5/2001 | Forecast et al. |
| 6,230,325 B1 | 5/2001 | Iinuma et al. |
| 6,232,539 B1 | 5/2001 | Looney et al. |
| 6,233,389 B1 | 5/2001 | Barton et al. |
| 6,233,393 B1 | 5/2001 | Yanagihara et al. |
| 6,233,734 B1 | 5/2001 | Macrae et al. |
| 6,236,395 B1 | 5/2001 | Sezan et al. |
| 6,236,801 B1 | 5/2001 | Engle et al. |
| 6,236,978 B1 | 5/2001 | Tuzhilin |
| 6,237,049 B1 | 5/2001 | Ludtke |
| 6,239,794 B1 | 5/2001 | Yuen et al. |
| 6,240,241 B1 | 5/2001 | Yuen |
| 6,240,555 B1 | 5/2001 | Shoff et al. |
| 6,243,419 B1 | 6/2001 | Satou et al. |
| 6,243,707 B1 | 6/2001 | Humpleman et al. |
| 6,243,725 B1 | 6/2001 | Hempleman et al. |
| 6,243,865 B1 | 6/2001 | Wei et al. |
| 6,246,719 B1 | 6/2001 | Agarwal |
| 6,247,176 B1 | 6/2001 | Schein et al. |
| 6,256,071 B1 | 7/2001 | Hiroi |
| 6,256,785 B1 | 7/2001 | Klappert et al. |
| 6,260,088 B1 | 7/2001 | Gove et al. |
| 6,262,721 B1 | 7/2001 | Tsukidate et al. |
| 6,262,722 B1 | 7/2001 | Allison et al. |
| 6,262,772 B1 | 7/2001 | Shen et al. |
| 6,263,501 B1 | 7/2001 | Schein et al. |
| 6,263,503 B1 | 7/2001 | Margulis |
| 6,263,507 B1 | 7/2001 | Ahmad et al. |
| 6,266,657 B1 | 7/2001 | deVries et al. |
| 6,266,814 B1 | 7/2001 | Lemmons et al. |
| 6,268,394 B1 | 7/2001 | Shaikenov et al. |
| 6,268,849 B1 | 7/2001 | Boyer et al. |
| 6,269,394 B1 | 7/2001 | Kenner et al. |
| 6,271,840 B1 | 8/2001 | Finseth et al. |
| 6,275,268 B1 | 8/2001 | Ellis et al. |
| 6,275,532 B1 | 8/2001 | Hibi et al. |
| 6,275,648 B1 | 8/2001 | Knudson et al. |
| 6,275,829 B1 | 8/2001 | Angiulo et al. |
| 6,278,466 B1 | 8/2001 | Chen |
| 6,279,029 B1 | 8/2001 | Sampat et al. |
| 6,279,157 B1 | 8/2001 | Takasu |
| 6,285,685 B1 | 9/2001 | Bum |
| 6,286,005 B1 | 9/2001 | Cannon |
| 6,286,140 B1 | 9/2001 | Ivanyi |
| 6,286,142 B1 | 9/2001 | Ehreth |
| 6,288,716 B1 | 9/2001 | Humpleman et al. |
| 6,289,165 B1 | 9/2001 | Abecassis |
| 6,289,346 B1 | 9/2001 | Milewski et al. |
| 6,292,624 B1 | 9/2001 | Saib et al. |
| 6,298,482 B1 | 10/2001 | Seidman et al. |
| 6,305,018 B1 | 10/2001 | Usui et al. |
| 6,305,019 B1 | 10/2001 | Dyer et al. |
| 6,310,886 B1 | 10/2001 | Barton |
| 6,311,011 B1 | 10/2001 | Kuroda |
| 6,312,336 B1 | 11/2001 | Handelman et al. |
| 6,314,432 B1 | 11/2001 | Potts, Jr. |
| 6,314,575 B1 | 11/2001 | Billock et al. |
| 6,317,881 B1 | 11/2001 | Shah-Nazaroff et al. |
| 6,317,884 B1 | 11/2001 | Eames et al. |
| 6,317,885 B1 | 11/2001 | Fries |
| 6,320,588 B1 | 11/2001 | Palmer et al. |
| 6,321,318 B1 | 11/2001 | Baltz et al. |
| 6,323,911 B1 | 11/2001 | Schein et al. |
| 6,324,338 B1 | 11/2001 | Wood et al. |
| 6,324,538 B1 | 11/2001 | Wesinger, Jr. et al. |
| 6,326,982 B1 | 12/2001 | Wu et al. |
| 6,327,049 B1 | 12/2001 | Ohtsuka |
| 6,327,418 B1 | 12/2001 | Barton |
| 6,330,665 B1 | 12/2001 | Wise et al. |
| 6,331,877 B1 | 12/2001 | Bennington et al. |
| 6,334,022 B1 | 12/2001 | Ohba et al. |
| 6,335,963 B1 | 1/2002 | Bosco |
| 6,336,099 B1 | 1/2002 | Barnett et al. |
| 6,337,715 B1 | 1/2002 | Inagaki et al. |
| 6,341,374 B2 | 1/2002 | Schein et al. |
| 6,344,939 B2 | 2/2002 | Oguro et al. |
| 6,347,400 B1 | 2/2002 | Ohkura et al. |
| 6,348,932 B1 | 2/2002 | Nishikawa et al. |
| 6,349,410 B1 | 2/2002 | Lortz |
| 6,351,765 B1 | 2/2002 | Pietropaolo et al. |
| 6,353,700 B1 | 3/2002 | Zhou |
| 6,356,971 B1 | 3/2002 | Katz et al. |
| 6,357,042 B2 | 3/2002 | Srinivasan et al. |
| 6,357,043 B1 | 3/2002 | Ellis et al. |
| 6,359,636 B1 | 3/2002 | Schindler et al. |
| 6,359,661 B1 | 3/2002 | Nickum |
| 6,363,525 B1 | 3/2002 | Dougherty et al. |
| 6,366,890 B1 | 4/2002 | Usrey |
| 6,367,080 B1 | 4/2002 | Enomoto et al. |
| 6,370,543 B2 | 4/2002 | Hoffert et al. |
| 6,370,688 B1 | 4/2002 | Hejna, Jr. |
| 6,373,528 B1 | 4/2002 | Bennington et al. |
| 6,374,406 B2 | 4/2002 | Hirata |
| 6,377,745 B2 | 4/2002 | Akiba et al. |
| 6,378,130 B1 | 4/2002 | Adams |
| 6,388,714 B1 | 5/2002 | Schein et al. |
| 6,389,593 B1 | 5/2002 | Yamagishi |
| 6,392,710 B1 | 5/2002 | Gonsalves et al. |
| 6,393,430 B1 | 5/2002 | Van Ryzin |
| 6,396,544 B1 | 5/2002 | Schindler et al. |
| 6,396,546 B1 | 5/2002 | Alten et al. |
| 6,397,080 B1 | 5/2002 | Viktorsson et al. |
| 6,397,387 B1 | 5/2002 | Rosin et al. |
| 6,400,407 B1 | 6/2002 | Zigmond et al. |
| 6,401,242 B1 | 6/2002 | Eyer et al. |
| 6,405,370 B1 | 6/2002 | Jarrell |
| 6,405,371 B1 | 6/2002 | Oosterhout et al. |
| 6,408,435 B1 | 6/2002 | Sato |
| 6,408,437 B1 | 6/2002 | Hendricks et al. |
| 6,411,696 B1 | 6/2002 | Iverson et al. |
| 6,412,110 B1 | 6/2002 | Schein et al. |
| 6,418,556 B1 | 7/2002 | Bennington et al. |
| 6,419,137 B1 | 7/2002 | Marshall et al. |
| 6,421,067 B1 | 7/2002 | Kamen et al. |
| 6,425,000 B1 | 7/2002 | Carmello et al. |
| 6,430,357 B1 | 8/2002 | Orr |
| 6,433,835 B1 | 8/2002 | Hartson et al. |
| 6,434,524 B1 | 8/2002 | Weber |
| 6,434,614 B1 | 8/2002 | Blumenau |
| 6,437,836 B1 | 8/2002 | Huang et al. |
| 6,441,832 B1 | 8/2002 | Tao et al. |
| 6,442,332 B1 | 8/2002 | Knudson et al. |
| 6,445,306 B1 | 9/2002 | Trovato et al. |
| 6,445,398 B1 | 9/2002 | Gerba et al. |
| 6,445,872 B1 | 9/2002 | Sano et al. |
| 6,449,608 B1 | 9/2002 | Morita et al. |
| 6,449,767 B1 | 9/2002 | Krapf et al. |
| 6,453,471 B1 | 9/2002 | Klosterman |
| 6,456,621 B1 | 9/2002 | Wada et al. |
| RE37,881 E | 10/2002 | Haines |
| 6,463,206 B1 | 10/2002 | Yuen et al. |
| 6,463,585 B1 | 10/2002 | Hendricks et al. |
| 6,466,080 B2 | 10/2002 | Kawai et al. |
| 6,469,753 B1 | 10/2002 | Klosterman et al. |
| 6,470,497 B1 | 10/2002 | Ellis et al. |
| 6,473,463 B2 | 10/2002 | Agarwal |
| 6,473,559 B1 | 10/2002 | Knudson et al. |
| 6,477,579 B1 | 11/2002 | Kunkel et al. |
| 6,477,705 B1 | 11/2002 | Yuen et al. |
| 6,480,667 B1 | 11/2002 | O'Connor |
| 6,480,889 B1 | 11/2002 | Saito et al. |
| 6,483,986 B1 | 11/2002 | Krapf |
| 6,486,892 B1 | 11/2002 | Stern |
| 6,487,145 B1 | 11/2002 | Berhan |
| 6,487,362 B1 | 11/2002 | Yuen et al. |

(56) References Cited

U.S. PATENT DOCUMENTS

| | | |
|---|---|---|
| 6,493,875 B1 | 12/2002 | Eames et al. |
| 6,496,856 B1 | 12/2002 | Kenner et al. |
| 6,496,981 B1 | 12/2002 | Wistendahl et al. |
| 6,498,895 B2 | 12/2002 | Young et al. |
| 6,499,138 B1 | 12/2002 | Swix et al. |
| 6,505,348 B1 | 1/2003 | Knowles et al. |
| 6,507,953 B1 | 1/2003 | Horlander et al. |
| 6,509,908 B1 | 1/2003 | Croy et al. |
| 6,515,680 B1 | 2/2003 | Hendricks et al. |
| 6,516,323 B1 | 2/2003 | Kamba |
| 6,516,467 B1 | 2/2003 | Schindler et al. |
| 6,526,575 B1 | 2/2003 | McCoy et al. |
| 6,526,577 B1 | 2/2003 | Knudson et al. |
| 6,530,082 B1 | 3/2003 | Del Sesto et al. |
| 6,530,083 B1 | 3/2003 | Liebenow |
| 6,532,589 B1 | 3/2003 | Proehl et al. |
| 6,539,548 B1 | 3/2003 | Hendricks et al. |
| 6,543,053 B1 | 4/2003 | Li et al. |
| 6,545,578 B2 | 4/2003 | Yoshiyama |
| 6,545,722 B1 | 4/2003 | Schultheiss et al. |
| 6,546,399 B1 | 4/2003 | Reed et al. |
| 6,553,178 B2 | 4/2003 | Abecassis |
| 6,557,031 B1 | 4/2003 | Mimura et al. |
| 6,564,005 B1 | 5/2003 | Berstis |
| 6,564,378 B1 | 5/2003 | Satterfield et al. |
| 6,564,379 B1 | 5/2003 | Knudson et al. |
| 6,564,383 B1 | 5/2003 | Combs et al. |
| 6,567,982 B1 | 5/2003 | Howe et al. |
| 6,571,279 B1 | 5/2003 | Herz et al. |
| 6,571,390 B1 | 5/2003 | Dunn et al. |
| 6,573,907 B1 | 6/2003 | Madrane |
| 6,577,735 B1 | 6/2003 | Bharat |
| 6,578,070 B1 | 6/2003 | Weaver et al. |
| 6,588,013 B1 | 7/2003 | Lumley et al. |
| 6,594,699 B1 | 7/2003 | Sahai et al. |
| 6,594,826 B1 | 7/2003 | Rao et al. |
| 6,598,228 B2 | 7/2003 | Hejna, Jr. |
| 6,600,503 B2 | 7/2003 | Stautner et al. |
| 6,601,074 B1 | 7/2003 | Liebenow |
| 6,601,237 B1 | 7/2003 | Ten Kate et al. |
| 6,603,488 B2 | 8/2003 | Humpleman et al. |
| 6,611,654 B1 | 8/2003 | Shteyn |
| 6,611,842 B1 | 8/2003 | Brown |
| 6,611,958 B1 | 8/2003 | Shintani et al. |
| 6,614,987 B1 | 9/2003 | Ismail et al. |
| 6,622,171 B2 | 9/2003 | Gupta et al. |
| 6,622,304 B1 | 9/2003 | Carhart |
| 6,622,306 B1 | 9/2003 | Kamada |
| 6,630,954 B1 | 10/2003 | Okada |
| 6,631,523 B1 | 10/2003 | Matthews, III et al. |
| 6,637,029 B1 | 10/2003 | Maissel et al. |
| 6,647,417 B1 | 11/2003 | Hunter et al. |
| 6,654,933 B1 | 11/2003 | Abbott et al. |
| 6,657,116 B1 | 12/2003 | Gunnerson |
| 6,661,468 B2 | 12/2003 | Alten et al. |
| 6,665,869 B1 | 12/2003 | Ellis et al. |
| 6,668,377 B1 | 12/2003 | Dunn |
| 6,670,971 B1 | 12/2003 | Oral et al. |
| 6,671,882 B1 | 12/2003 | Murphy et al. |
| 6,675,384 B1 | 1/2004 | Block et al. |
| 6,675,385 B1 | 1/2004 | Wang |
| 6,675,386 B1 | 1/2004 | Hendricks et al. |
| 6,678,004 B1 | 1/2004 | Schultheiss et al. |
| 6,678,462 B1 | 1/2004 | Chihara |
| 6,678,737 B1 | 1/2004 | Bucher |
| 6,681,396 B1 | 1/2004 | Bates et al. |
| 6,696,373 B2 | 2/2004 | Kinn et al. |
| 6,698,020 B1 | 2/2004 | Zigmond et al. |
| 6,701,060 B2 | 3/2004 | Yuen et al. |
| 6,701,523 B1 | 3/2004 | Hancock et al. |
| 6,701,527 B2 | 3/2004 | Schein et al. |
| 6,704,028 B2 | 3/2004 | Wugofski |
| 6,704,931 B1 | 3/2004 | Schaffer et al. |
| 6,711,622 B1 | 3/2004 | Fuller et al. |
| 6,718,552 B1 | 4/2004 | Goode |
| 6,721,954 B1 | 4/2004 | Nickum |
| 6,727,914 B1 | 4/2004 | Gutta |
| 6,732,366 B1 | 5/2004 | Russo |
| 6,732,369 B1 | 5/2004 | Schein et al. |
| 6,732,372 B2 | 5/2004 | Tomita et al. |
| 6,738,978 B1 | 5/2004 | Hendricks et al. |
| 6,741,617 B2 | 5/2004 | Rosengren et al. |
| 6,742,183 B1 | 5/2004 | Reynolds et al. |
| 6,744,967 B2 | 6/2004 | Kaminski et al. |
| 6,745,391 B1 | 6/2004 | Macrae et al. |
| 6,746,127 B2 | 6/2004 | Suyama |
| 6,750,881 B1 | 6/2004 | Appelman |
| 6,751,402 B1 | 6/2004 | Elliott et al. |
| 6,751,802 B1 | 6/2004 | Huizer et al. |
| 6,754,904 B1 | 6/2004 | Cooper et al. |
| 6,756,987 B2 | 6/2004 | Goyins et al. |
| 6,756,997 B1 | 6/2004 | Ward, III et al. |
| 6,760,537 B2 | 7/2004 | Mankovitz |
| 6,760,538 B1 | 7/2004 | Bumgardner et al. |
| 6,760,758 B1 | 7/2004 | Lund et al. |
| 6,762,797 B1 | 7/2004 | Pelletier |
| 6,766,100 B1 | 7/2004 | Komar et al. |
| 6,769,127 B1 | 7/2004 | Bonomi et al. |
| 6,771,317 B2 | 8/2004 | Ellis et al. |
| 6,771,886 B1 | 8/2004 | Mendelsohn |
| 6,772,433 B1 | 8/2004 | LaJoie et al. |
| 6,785,720 B1 | 8/2004 | Seong |
| 6,788,882 B1 | 9/2004 | Geer et al. |
| 6,792,197 B1 | 9/2004 | Helmstetter |
| 6,792,618 B1 | 9/2004 | Bendinelli et al. |
| 6,799,174 B2 | 9/2004 | Chipman et al. |
| 6,799,326 B2 | 9/2004 | Boylan, III et al. |
| 6,799,327 B1 | 9/2004 | Reynolds et al. |
| 6,813,775 B1 | 11/2004 | Finseth et al. |
| 6,816,172 B1 | 11/2004 | Iki et al. |
| 6,816,175 B1 | 11/2004 | Hamp et al. |
| 6,816,904 B1 | 11/2004 | Ludwig et al. |
| 6,820,278 B1 | 11/2004 | Ellis |
| 6,822,661 B2 | 11/2004 | Sai et al. |
| 6,826,512 B2 | 11/2004 | Dara-Abrams et al. |
| 6,828,993 B1 | 12/2004 | Hendricks et al. |
| 6,832,385 B2 | 12/2004 | Young et al. |
| 6,837,789 B2 | 1/2005 | Garahi et al. |
| 6,837,791 B1 | 1/2005 | McNutt et al. |
| 6,839,769 B2 | 1/2005 | Needham et al. |
| 6,847,686 B2 | 1/2005 | Morad et al. |
| 6,850,693 B2 | 2/2005 | Young et al. |
| 6,859,799 B1 | 2/2005 | Yuen |
| 6,859,839 B1 | 2/2005 | Zahorjan et al. |
| 6,865,746 B1 | 3/2005 | Herrington et al. |
| 6,868,225 B1 | 3/2005 | Brown et al. |
| 6,868,551 B1 | 3/2005 | Lawler et al. |
| 6,869,799 B1 | 3/2005 | Guan et al. |
| 6,871,146 B1 | 3/2005 | Kelly et al. |
| 6,871,186 B1 | 3/2005 | Tuzhilin et al. |
| 6,882,299 B1 | 4/2005 | Allport |
| 6,882,793 B1 | 4/2005 | Fu et al. |
| 6,898,762 B2 | 5/2005 | Ellis et al. |
| 6,901,603 B2 | 5/2005 | Zeidler et al. |
| 6,920,278 B1 | 7/2005 | Yano et al. |
| 6,920,281 B1 | 7/2005 | Agnibotri et al. |
| 6,925,035 B2 | 8/2005 | Ueki |
| 6,925,246 B1 | 8/2005 | Behl |
| 6,925,567 B1 | 8/2005 | Hirata et al. |
| 6,927,806 B2 | 8/2005 | Chan |
| 6,931,593 B1 | 8/2005 | Grooters |
| 6,934,964 B1 | 8/2005 | Schaffer et al. |
| 6,938,101 B2 | 8/2005 | Hayes et al. |
| 6,950,624 B2 | 9/2005 | Kim et al. |
| 6,956,573 B1 | 10/2005 | Bergen et al. |
| 6,973,474 B2 | 12/2005 | Hatayama |
| 6,973,663 B1 | 12/2005 | Brown et al. |
| 6,973,669 B2 | 12/2005 | Daniels |
| 6,983,478 B1 | 1/2006 | Grauch et al. |
| 6,983,483 B2 | 1/2006 | Maze et al. |
| 6,985,188 B1 | 1/2006 | Hurst, Jr. |
| 6,993,788 B1 | 1/2006 | Lawrence et al. |
| 7,003,792 B1 | 2/2006 | Yuen |
| 7,006,881 B1 | 2/2006 | Hoffberg et al. |

(56) References Cited

U.S. PATENT DOCUMENTS

| | | | |
|---|---|---|---|
| 7,013,339 | B2 | 3/2006 | Schwager et al. |
| 7,013,478 | B1 | 3/2006 | Hendricks et al. |
| 7,017,118 | B1 | 3/2006 | Carroll |
| 7,017,171 | B1 | 3/2006 | Horlander et al. |
| 7,017,179 | B1 | 3/2006 | Asamoto et al. |
| 7,027,716 | B1 | 4/2006 | Boyle et al. |
| 7,028,323 | B2 | 4/2006 | Franken et al. |
| 7,028,326 | B1 | 4/2006 | Westlake et al. |
| 7,035,804 | B2 | 4/2006 | Saindon et al. |
| 7,039,643 | B2 | 5/2006 | Sena et al. |
| 7,039,935 | B2 | 5/2006 | Knudson et al. |
| 7,047,241 | B1 | 5/2006 | Erickson |
| 7,047,377 | B2 | 5/2006 | Elder et al. |
| 7,047,549 | B2 | 5/2006 | Schein et al. |
| 7,047,550 | B1 | 5/2006 | Yasukawa et al. |
| 7,048,239 | B1 | 5/2006 | Siegl |
| 7,050,988 | B2 | 5/2006 | Atcheson et al. |
| 7,051,353 | B2 | 5/2006 | Yamashita et al. |
| 7,058,635 | B1 | 6/2006 | Shah-Nazaroff et al. |
| 7,069,576 | B1 | 6/2006 | Knudson et al. |
| 7,084,780 | B2 | 8/2006 | Nguyen et al. |
| 7,086,077 | B2 | 8/2006 | Giammaressi |
| 7,088,910 | B2 | 8/2006 | Potrebic et al. |
| 7,095,949 | B2 | 8/2006 | Okada |
| 7,096,486 | B1 | 8/2006 | Ukai et al. |
| 7,098,958 | B2 | 8/2006 | Wredenhagen et al. |
| 7,100,192 | B1 | 8/2006 | Igawa et al. |
| 7,103,906 | B1 | 9/2006 | Katz et al. |
| 7,117,518 | B1 | 10/2006 | Takahashi et al. |
| 7,117,519 | B1 | 10/2006 | Anderson et al. |
| 7,120,925 | B2 | 10/2006 | D'Souza et al. |
| 7,124,424 | B2 | 10/2006 | Gordon et al. |
| 7,127,735 | B1 | 10/2006 | Lee et al. |
| 7,134,131 | B1 | 11/2006 | Hendricks et al. |
| 7,143,430 | B1 | 11/2006 | Fingerman et al. |
| 7,143,432 | B1 | 11/2006 | Brooks et al. |
| 7,151,886 | B2 | 12/2006 | Young et al. |
| 7,152,236 | B1 | 12/2006 | Wugofski et al. |
| 7,155,451 | B1 | 12/2006 | Torres |
| 7,159,232 | B1 | 1/2007 | Blackketter et al. |
| 7,159,235 | B2 | 1/2007 | Son et al. |
| 7,162,729 | B2 | 1/2007 | Schein et al. |
| 7,165,098 | B1 | 1/2007 | Boyer et al. |
| 7,168,086 | B1 | 1/2007 | Carpenter et al. |
| 7,171,677 | B1 | 1/2007 | Ochiai |
| 7,178,161 | B1 | 2/2007 | Fristoe et al. |
| 7,181,128 | B1 | 2/2007 | Wada et al. |
| 7,185,355 | B1 | 2/2007 | Ellis et al. |
| 7,187,847 | B2 | 3/2007 | Young et al. |
| 7,188,356 | B1 | 3/2007 | Miura et al. |
| 7,194,755 | B1 | 3/2007 | Nakata et al. |
| 7,200,859 | B1 | 4/2007 | Perlman et al. |
| 7,207,055 | B1 | 4/2007 | Hendricks et al. |
| 7,209,640 | B2 | 4/2007 | Young et al. |
| 7,213,071 | B2 | 5/2007 | DeLima et |
| 7,218,839 | B2 | 5/2007 | Plourde, Jr. et al. |
| 7,224,886 | B2 | 5/2007 | Akamatsu et al. |
| 7,225,336 | B2 | 5/2007 | Zunke |
| 7,229,012 | B1 | 6/2007 | Enright et al. |
| 7,229,354 | B2 | 6/2007 | McNutt et al. |
| 7,231,175 | B2 | 6/2007 | Ellis |
| 7,237,253 | B1 | 6/2007 | Blackketter et al. |
| 7,240,356 | B2 | 7/2007 | Iki et al. |
| 7,242,324 | B2 | 7/2007 | Lai et al. |
| 7,243,139 | B2 | 7/2007 | Ullman et al. |
| 7,243,364 | B2 | 7/2007 | Dunn et al. |
| 7,248,778 | B1 | 7/2007 | Anderson et al. |
| 7,260,461 | B2 | 8/2007 | Rao et al. |
| 7,260,564 | B1 | 8/2007 | Lynn et al. |
| 7,263,709 | B1 | 8/2007 | Krapf |
| 7,266,833 | B2 | 9/2007 | Ward, III et al. |
| 7,269,733 | B1 | 9/2007 | O'Toole, Jr. |
| 7,272,298 | B1 | 9/2007 | Lang et al. |
| 7,277,859 | B2 | 10/2007 | Watanabe et al. |
| 7,284,202 | B1 | 10/2007 | Zenith |
| 7,287,267 | B2 | 10/2007 | Knudson et al. |
| 7,292,774 | B1 | 11/2007 | Masters et al. |
| 7,293,276 | B2 | 11/2007 | Phillips et al. |
| 7,293,279 | B1 | 11/2007 | Asmussen |
| 7,302,697 | B1 | 11/2007 | Wilson et al. |
| 7,305,254 | B2 | 12/2007 | Findikli |
| 7,328,450 | B2 | 2/2008 | Macrae et al. |
| 7,330,693 | B1 | 2/2008 | Goss |
| 7,334,090 | B2 | 2/2008 | Zellner |
| 7,343,614 | B1 | 3/2008 | Hendricks et al. |
| 7,343,616 | B1 | 3/2008 | Takahashi et al. |
| 7,346,920 | B2 | 3/2008 | Lamkin et al. |
| 7,349,976 | B1 | 3/2008 | Glaser et al. |
| 7,356,246 | B1 | 4/2008 | Kobb |
| 7,356,829 | B1 | 4/2008 | Terakado et al. |
| 7,363,645 | B1 | 4/2008 | Hendricks |
| 7,366,199 | B1 | 4/2008 | Vaughan et al. |
| 7,369,749 | B2 | 5/2008 | Ichioka et al. |
| 7,369,750 | B2 | 5/2008 | Cheng et al. |
| 7,372,976 | B2 | 5/2008 | Rhoads et al. |
| 7,392,532 | B2 | 6/2008 | White et al. |
| 7,403,693 | B2 | 7/2008 | Shteyn |
| 7,437,751 | B2 | 10/2008 | Daniels |
| 7,454,515 | B2 | 11/2008 | Lamkin et al. |
| 7,477,832 | B2 | 1/2009 | Young et al. |
| 7,480,721 | B2 | 1/2009 | Shaheen |
| 7,480,929 | B2 | 1/2009 | Klosterman et al. |
| 7,483,964 | B1 | 1/2009 | Jackson et al. |
| 7,493,641 | B2 | 2/2009 | Klosterman et al. |
| 7,503,055 | B2 | 3/2009 | Reynolds et al. |
| 7,505,913 | B2 | 3/2009 | Tobin |
| 7,519,268 | B2 | 4/2009 | Juen et al. |
| 7,529,465 | B2 | 5/2009 | Barton et al. |
| 7,533,400 | B1 | 5/2009 | Hailey et al. |
| 7,536,704 | B2 | 5/2009 | Pierre et al. |
| 7,536,706 | B1 | 5/2009 | Sezan et al. |
| 7,540,010 | B2 | 5/2009 | Hanaya et al. |
| 7,542,320 | B2 | 6/2009 | Kitou |
| 7,543,320 | B2 | 6/2009 | Schein et al. |
| 7,567,747 | B2 | 7/2009 | Hira |
| 7,574,723 | B2 | 8/2009 | Putterman et al. |
| 7,577,336 | B2 | 8/2009 | Srinivasan et al. |
| 7,599,753 | B2 | 10/2009 | Taylor et al. |
| 7,603,685 | B2 | 10/2009 | Knudson et al. |
| 7,614,066 | B2 | 11/2009 | Urdang et al. |
| 7,624,337 | B2 | 11/2009 | Sull et al. |
| 7,624,345 | B2 | 11/2009 | Nishina et al. |
| 7,624,412 | B2 | 11/2009 | McEvilly et al. |
| 7,650,621 | B2 * | 1/2010 | Thomas .............. G06F 3/0481 725/87 |
| 7,665,109 | B2 | 2/2010 | Matthews, III et al. |
| 7,673,315 | B1 | 3/2010 | Wong et al. |
| 7,684,673 | B2 | 3/2010 | Monroe |
| 7,689,510 | B2 | 3/2010 | Lamkin et al. |
| 7,689,995 | B1 | 3/2010 | Francis et al. |
| 7,707,617 | B2 | 4/2010 | Birleson |
| 7,721,307 | B2 | 5/2010 | Hendricks et al. |
| 7,757,254 | B2 | 7/2010 | Shoff et al. |
| 7,761,892 | B2 | 7/2010 | Ellis et al. |
| 7,765,235 | B2 | 7/2010 | Day et al. |
| 7,769,775 | B2 | 8/2010 | Yuen |
| 7,770,196 | B1 | 8/2010 | Hendricks |
| 7,777,816 | B2 | 8/2010 | Chang et al. |
| 7,778,158 | B2 | 8/2010 | Vogel et al. |
| 7,779,445 | B2 | 8/2010 | Ellis |
| 7,784,081 | B2 | 8/2010 | Hassell et al. |
| 7,787,010 | B2 | 8/2010 | DiFrancesco |
| 7,788,393 | B2 | 8/2010 | Pickens et al. |
| 7,793,322 | B2 | 9/2010 | Hassell et al. |
| 7,793,326 | B2 | 9/2010 | McCoskey et al. |
| 7,802,285 | B2 | 9/2010 | Ellis et al. |
| 7,822,760 | B2 | 10/2010 | Yuen |
| 7,823,055 | B2 | 10/2010 | Sull et al. |
| 7,827,585 | B2 | 11/2010 | Hassell et al. |
| 7,840,977 | B2 | 11/2010 | Walker et al. |
| 7,859,571 | B1 | 12/2010 | Brown et al. |
| 7,870,585 | B2 | 1/2011 | Ellis et al. |
| 7,873,760 | B2 | 1/2011 | Versteeg |
| 7,877,766 | B1 | 1/2011 | Wu et al. |

(56) References Cited

U.S. PATENT DOCUMENTS

| | | |
|---|---|---|
| 7,895,625 B1 | 2/2011 | Bryan et al. |
| 7,913,278 B2 | 3/2011 | Ellis et al. |
| 7,917,933 B2 * | 3/2011 | Thomas ............... G06F 3/0481 725/87 |
| 7,925,141 B2 | 4/2011 | Geer et al. |
| 7,929,551 B2 | 4/2011 | Dietrich et al. |
| 7,962,935 B2 | 6/2011 | Kurosaki et al. |
| 7,962,946 B2 | 6/2011 | Creamer et al. |
| 7,971,222 B2 | 6/2011 | Ellis |
| 7,987,174 B2 | 7/2011 | Yuen |
| 7,987,175 B2 | 7/2011 | Yuen |
| 7,992,163 B1 | 8/2011 | Jerding et al. |
| 7,996,864 B2 | 8/2011 | Yuen et al. |
| 8,001,564 B2 | 8/2011 | Hassell et al. |
| 8,006,263 B2 | 8/2011 | Ellis et al. |
| RE42,728 E | 9/2011 | Madrane |
| 8,046,801 B2 | 10/2011 | Ellis et al. |
| 8,051,450 B2 | 11/2011 | Robarts et al. |
| 8,060,905 B1 | 11/2011 | Hendricks et al. |
| 8,069,460 B2 | 11/2011 | Young et al. |
| 8,073,921 B2 | 12/2011 | Thomas et al. |
| 8,078,751 B2 | 12/2011 | Janik et al. |
| 8,082,568 B2 | 12/2011 | Ellis |
| 8,086,575 B2 | 12/2011 | Putterman et al. |
| 8,087,048 B2 | 12/2011 | Hassell et al. |
| 8,091,110 B2 | 1/2012 | Ellis et al. |
| 8,112,776 B2 | 2/2012 | Schein et al. |
| 8,214,869 B2 | 7/2012 | Day |
| 8,265,458 B2 | 9/2012 | Helmstetter |
| 8,286,207 B1 | 10/2012 | Schneidewend et al. |
| 8,295,674 B2 | 10/2012 | Sasaki et al. |
| 8,302,127 B2 | 10/2012 | Klarfeld et al. |
| 8,341,136 B2 | 12/2012 | Yuen |
| 8,341,137 B2 | 12/2012 | Yuen |
| 8,363,679 B2 | 1/2013 | Sorenson et al. |
| 8,370,884 B2 | 2/2013 | Ellis |
| 8,381,249 B2 | 2/2013 | Rasanen et al. |
| 8,397,255 B2 | 3/2013 | Wachtfogel et al. |
| 8,478,750 B2 | 7/2013 | Rao et al. |
| 8,528,019 B1 | 9/2013 | Dimitrova et al. |
| 8,528,032 B2 | 9/2013 | Ellis et al. |
| 8,584,184 B2 * | 11/2013 | Thomas ............... G06F 3/0481 725/87 |
| 8,607,287 B2 | 12/2013 | Walker |
| 8,613,024 B2 | 12/2013 | Bovenschulte et al. |
| 8,627,389 B2 | 1/2014 | Craner |
| 8,707,366 B2 | 4/2014 | Wong et al. |
| 8,719,090 B2 | 5/2014 | Lewis |
| 8,732,757 B2 | 5/2014 | Ward, III et al. |
| 8,832,742 B2 | 9/2014 | Rasanen et al. |
| 8,973,069 B2 * | 3/2015 | Thomas ............... G06F 3/0481 725/87 |
| 2001/0001160 A1 | 5/2001 | Shoff et al. |
| 2001/0004338 A1 | 6/2001 | Yankowski |
| 2001/0007147 A1 | 7/2001 | Goldschmidt Iki et al. |
| 2001/0013122 A1 | 8/2001 | Hirata |
| 2001/0018693 A1 | 8/2001 | Jain et al. |
| 2001/0022815 A1 | 9/2001 | Agarwal |
| 2001/0026287 A1 | 10/2001 | Watanabe |
| 2001/0026533 A1 | 10/2001 | Schwager |
| 2001/0027555 A1 | 10/2001 | Franken et al. |
| 2001/0027562 A1 | 10/2001 | Schein et al. |
| 2001/0028782 A1 | 10/2001 | Ohno et al. |
| 2001/0029610 A1 | 10/2001 | Corvin et al. |
| 2001/0033343 A1 | 10/2001 | Yap et al. |
| 2001/0034237 A1 | 10/2001 | Garahi |
| 2001/0039660 A1 | 11/2001 | Vasilevsky et al. |
| 2001/0042098 A1 | 11/2001 | Gupta et al. |
| 2001/0042107 A1 | 11/2001 | Palm |
| 2001/0042246 A1 | 11/2001 | Yuen et al. |
| 2001/0043700 A1 | 11/2001 | Shima et al. |
| 2001/0043795 A1 | 11/2001 | Wood et al. |
| 2001/0047298 A1 | 11/2001 | Moore et al. |
| 2001/0049820 A1 | 12/2001 | Barton |
| 2002/0005792 A1 | 1/2002 | Satoh |
| 2002/0009283 A1 | 1/2002 | Ichioka et al. |
| 2002/0010652 A1 | 1/2002 | Deguchi |
| 2002/0013941 A1 | 1/2002 | Ward et al. |
| 2002/0013949 A1 | 1/2002 | Hejna, Jr. |
| 2002/0026496 A1 | 2/2002 | Boyer et al. |
| 2002/0026639 A1 | 2/2002 | Haneda |
| 2002/0026644 A1 | 2/2002 | Hatayama |
| 2002/0028026 A1 | 3/2002 | Chen et al. |
| 2002/0032907 A1 | 3/2002 | Daniels |
| 2002/0040475 A1 | 4/2002 | Yap et al. |
| 2002/0042913 A1 | 4/2002 | Ellis et al. |
| 2002/0042914 A1 | 4/2002 | Walker et al. |
| 2002/0043700 A1 | 4/2002 | Sasaki et al. |
| 2002/0046315 A1 | 4/2002 | Miller et al. |
| 2002/0048448 A1 | 4/2002 | Daniels |
| 2002/0056087 A1 | 5/2002 | Berezowski et al. |
| 2002/0056098 A1 | 5/2002 | White |
| 2002/0057892 A1 | 5/2002 | Mano et al. |
| 2002/0057893 A1 | 5/2002 | Wood et al. |
| 2002/0059342 A1 | 5/2002 | Gupta et al. |
| 2002/0059588 A1 | 5/2002 | Huber et al. |
| 2002/0059599 A1 | 5/2002 | Schein et al. |
| 2002/0059602 A1 | 5/2002 | Macrae et al. |
| 2002/0059610 A1 | 5/2002 | Ellis |
| 2002/0059621 A1 | 5/2002 | Thomas et al. |
| 2002/0059626 A1 | 5/2002 | Lemmons |
| 2002/0059642 A1 | 5/2002 | Russ et al. |
| 2002/0069218 A1 | 6/2002 | Sull et al. |
| 2002/0069746 A1 | 6/2002 | Taira et al. |
| 2002/0070982 A1 | 6/2002 | Hill et al. |
| 2002/0073424 A1 | 6/2002 | Ward et al. |
| 2002/0076203 A1 | 6/2002 | Takahashi |
| 2002/0078293 A1 | 6/2002 | Kou et al. |
| 2002/0082901 A1 | 6/2002 | Dunning et al. |
| 2002/0083439 A1 | 6/2002 | Eldering |
| 2002/0083455 A1 | 6/2002 | Sato |
| 2002/0087588 A1 | 7/2002 | McBride et al. |
| 2002/0088011 A1 | 7/2002 | Lamkin et al. |
| 2002/0090203 A1 | 7/2002 | Mankovitz |
| 2002/0092017 A1 | 7/2002 | Klosterman et al. |
| 2002/0095673 A1 | 7/2002 | Leung et al. |
| 2002/0100044 A1 | 7/2002 | Daniels |
| 2002/0100052 A1 | 7/2002 | Daniels |
| 2002/0103920 A1 | 8/2002 | Berkun et al. |
| 2002/0104091 A1 | 8/2002 | Prabhu et al. |
| 2002/0110353 A1 | 8/2002 | Potrebic et al. |
| 2002/0112239 A1 | 8/2002 | Goldman |
| 2002/0112249 A1 | 8/2002 | Hendricks et al. |
| 2002/0113824 A1 | 8/2002 | Myers |
| 2002/0116509 A1 | 8/2002 | DeLaHuerga |
| 2002/0116533 A1 | 8/2002 | Holliman et al. |
| 2002/0116712 A1 | 8/2002 | Schein et al. |
| 2002/0118676 A1 | 8/2002 | Tonnby et al. |
| 2002/0120935 A1 | 8/2002 | Huber et al. |
| 2002/0124249 A1 | 9/2002 | Shintani et al. |
| 2002/0124254 A1 | 9/2002 | Kikinis |
| 2002/0129360 A1 | 9/2002 | Lee |
| 2002/0129368 A1 | 9/2002 | Schlack et al. |
| 2002/0138840 A1 | 9/2002 | Schein et al. |
| 2002/0138843 A1 | 9/2002 | Samaan et al. |
| 2002/0144279 A1 | 10/2002 | Zhou |
| 2002/0147975 A1 | 10/2002 | Seo |
| 2002/0147977 A1 | 10/2002 | Hammett et al. |
| 2002/0154888 A1 | 10/2002 | Allen et al. |
| 2002/0161579 A1 | 10/2002 | Saindon et al. |
| 2002/0166120 A1 | 11/2002 | Boylan et al. |
| 2002/0166123 A1 | 11/2002 | Schrader et al. |
| 2002/0169712 A1 | 11/2002 | Ginzboorg et al. |
| 2002/0170068 A1 | 11/2002 | Rafey et al. |
| 2002/0174424 A1 | 11/2002 | Chang et al. |
| 2002/0174430 A1 | 11/2002 | Ellis et al. |
| 2002/0174433 A1 | 11/2002 | Baumgartner et al. |
| 2002/0174444 A1 | 11/2002 | Gatto et al. |
| 2002/0180803 A1 | 12/2002 | Kaplan et al. |
| 2002/0184457 A1 | 12/2002 | Yuasa et al. |
| 2002/0184626 A1 | 12/2002 | Darbee et al. |
| 2002/0184629 A1 | 12/2002 | Sie et al. |
| 2002/0186958 A1 | 12/2002 | Ikeda et al. |
| 2002/0188735 A1 | 12/2002 | Needham et al. |

(56) References Cited

U.S. PATENT DOCUMENTS

| | | |
|---|---|---|
| 2002/0188944 A1 | 12/2002 | Noble |
| 2002/0191954 A1 | 12/2002 | Beach et al. |
| 2002/0194011 A1 | 12/2002 | Boies et al. |
| 2002/0194585 A1 | 12/2002 | Connelly |
| 2002/0194596 A1 | 12/2002 | Srivastava |
| 2002/0194598 A1 | 12/2002 | Connelly |
| 2002/0194607 A1 | 12/2002 | Connelly |
| 2002/0199185 A1 | 12/2002 | Kaminski et al. |
| 2003/0005432 A1 | 1/2003 | Ellis et al. |
| 2003/0005445 A1 | 1/2003 | Schein et al. |
| 2003/0005446 A1 | 1/2003 | Jaff et al. |
| 2003/0005454 A1 | 1/2003 | Rodriguez et al. |
| 2003/0009766 A1 | 1/2003 | Marolda |
| 2003/0012554 A1 | 1/2003 | Zeidler et al. |
| 2003/0012555 A1 | 1/2003 | Yuen et al. |
| 2003/0028878 A1 | 2/2003 | Schein et al. |
| 2003/0028889 A1 | 2/2003 | McCoskey et al. |
| 2003/0031465 A1 | 2/2003 | Blake |
| 2003/0033601 A1 | 2/2003 | Sakata et al. |
| 2003/0035404 A1 | 2/2003 | Ozluturk et al. |
| 2003/0037068 A1 | 2/2003 | Thomas et al. |
| 2003/0037336 A1 | 2/2003 | Leftwich |
| 2003/0040962 A1 | 2/2003 | Lewis |
| 2003/0044165 A1 | 3/2003 | Wood et al. |
| 2003/0046437 A1 | 3/2003 | Eytchison et al. |
| 2003/0061610 A1 | 3/2003 | Errico |
| 2003/0066084 A1 | 4/2003 | Kaars |
| 2003/0066085 A1 | 4/2003 | Boyer et al. |
| 2003/0066092 A1 | 4/2003 | Wagner et al. |
| 2003/0067554 A1 | 4/2003 | Klarfeld et al. |
| 2003/0068154 A1 | 4/2003 | Zylka |
| 2003/0072556 A1 | 4/2003 | Okujima et al. |
| 2003/0084461 A1 | 5/2003 | Hoang |
| 2003/0088554 A1 | 5/2003 | Ryan et al. |
| 2003/0088613 A1 | 5/2003 | Goldschmidt Iki et al. |
| 2003/0088872 A1 | 5/2003 | Maissel et al. |
| 2003/0088873 A1 | 5/2003 | McCoy et al. |
| 2003/0093329 A1 | 5/2003 | Gutta |
| 2003/0097227 A1 | 5/2003 | Bloch et al. |
| 2003/0098891 A1 | 5/2003 | Molander |
| 2003/0099457 A1 | 5/2003 | Takahashi et al. |
| 2003/0101104 A1 | 5/2003 | Dimitrova et al. |
| 2003/0103088 A1 | 6/2003 | Dresti et al. |
| 2003/0103645 A1 | 6/2003 | Levy et al. |
| 2003/0105813 A1 | 6/2003 | Mizutani |
| 2003/0110499 A1 | 6/2003 | Knudson et al. |
| 2003/0115602 A1 | 6/2003 | Knee et al. |
| 2003/0118323 A1 | 6/2003 | Ismail et al. |
| 2003/0126607 A1 | 7/2003 | Phillips et al. |
| 2003/0131356 A1 | 7/2003 | Proehl et al. |
| 2003/0135860 A1 | 7/2003 | Dureau |
| 2003/0142957 A1 | 7/2003 | Young et al. |
| 2003/0149975 A1 | 8/2003 | Eldering et al. |
| 2003/0149980 A1 | 8/2003 | Hassell et al. |
| 2003/0149988 A1 | 8/2003 | Ellis et al. |
| 2003/0152096 A1 | 8/2003 | Chapman |
| 2003/0154485 A1 | 8/2003 | Johnson et al. |
| 2003/0154486 A1 | 8/2003 | Dunn et al. |
| 2003/0159157 A1 | 8/2003 | Chan |
| 2003/0162096 A1 | 8/2003 | Michot et al. |
| 2003/0163813 A1 | 8/2003 | Klosterman et al. |
| 2003/0163832 A1 | 8/2003 | Tsuria et al. |
| 2003/0164858 A1 | 9/2003 | Klosterman et al. |
| 2003/0165324 A1 | 9/2003 | O'Connor et al. |
| 2003/0167471 A1 | 9/2003 | Roth et al. |
| 2003/0187984 A1 | 10/2003 | Banavar et al. |
| 2003/0188310 A1 | 10/2003 | Klosterman et al. |
| 2003/0188311 A1 | 10/2003 | Yuen et al. |
| 2003/0194260 A1 | 10/2003 | Ward et al. |
| 2003/0196201 A1 | 10/2003 | Schein et al. |
| 2003/0196203 A1 | 10/2003 | Ellis et al. |
| 2003/0198462 A1 | 10/2003 | Bumgardner et al. |
| 2003/0204847 A1 | 10/2003 | Ellis et al. |
| 2003/0206710 A1 | 11/2003 | Ferman et al. |
| 2003/0206719 A1 | 11/2003 | Bumgardner et al. |
| 2003/0208756 A1 | 11/2003 | Macrae et al. |
| 2003/0208758 A1 | 11/2003 | Schein et al. |
| 2003/0208763 A1 | 11/2003 | McElhatten et al. |
| 2003/0208767 A1 | 11/2003 | Williamson et al. |
| 2003/0210898 A1 | 11/2003 | Juen et al. |
| 2003/0214955 A1 | 11/2003 | Kim |
| 2003/0217057 A1 | 11/2003 | Kuroiwa et al. |
| 2003/0226147 A1 | 12/2003 | Richmond et al. |
| 2003/0229900 A1 | 12/2003 | Reisman |
| 2003/0237085 A1 | 12/2003 | Boston et al. |
| 2004/0001690 A1 | 1/2004 | Boston et al. |
| 2004/0003403 A1 | 1/2004 | Marsh |
| 2004/0003413 A1 | 1/2004 | Boston et al. |
| 2004/0008971 A1 | 1/2004 | Young et al. |
| 2004/0008972 A1 | 1/2004 | Haken |
| 2004/0010807 A1 | 1/2004 | Urdang et al. |
| 2004/0019900 A1 | 1/2004 | Knightbridge et al. |
| 2004/0031050 A1 | 2/2004 | Klosterman |
| 2004/0049787 A1 | 3/2004 | Maissel et al. |
| 2004/0049794 A1 | 3/2004 | Shao et al. |
| 2004/0056879 A1 | 3/2004 | Erdelyi |
| 2004/0060063 A1 | 3/2004 | Russ et al. |
| 2004/0070594 A1 | 4/2004 | Burke |
| 2004/0073924 A1 | 4/2004 | Pendakur |
| 2004/0078809 A1 | 4/2004 | Drazin |
| 2004/0078815 A1 | 4/2004 | Lemmons et al. |
| 2004/0078820 A1 | 4/2004 | Nickum |
| 2004/0088731 A1 | 5/2004 | Putterman et al. |
| 2004/0098744 A1 | 5/2004 | Gutta |
| 2004/0101271 A1 | 5/2004 | Boston et al. |
| 2004/0103434 A1 | 5/2004 | Ellis |
| 2004/0103439 A1 | 5/2004 | Macrae et al. |
| 2004/0111742 A1 | 6/2004 | Hendricks et al. |
| 2004/0111745 A1 | 6/2004 | Schein et al. |
| 2004/0111756 A1 | 6/2004 | Stuckman et al. |
| 2004/0117831 A1 | 6/2004 | Ellis et al. |
| 2004/0117845 A1 | 6/2004 | Karaoguz et al. |
| 2004/0125779 A1 | 7/2004 | Kelton et al. |
| 2004/0128514 A1 | 7/2004 | Rhoads |
| 2004/0128685 A1 | 7/2004 | Hassell et al. |
| 2004/0128686 A1 | 7/2004 | Boyer et al. |
| 2004/0128690 A1 | 7/2004 | Zohar Ariely |
| 2004/0133655 A1 | 7/2004 | Yen et al. |
| 2004/0133907 A1 | 7/2004 | Rodriguez et al. |
| 2004/0139233 A1 | 7/2004 | Kellerman et al. |
| 2004/0139465 A1 | 7/2004 | Matthews et al. |
| 2004/0154040 A1 | 8/2004 | Ellis |
| 2004/0156614 A1 | 8/2004 | Bumgardner et al. |
| 2004/0160862 A1 | 8/2004 | Ueki |
| 2004/0163104 A1 | 8/2004 | Schein et al. |
| 2004/0181814 A1 | 9/2004 | Ellis et al. |
| 2004/0184763 A1 | 9/2004 | DiFrancesco |
| 2004/0187150 A1 | 9/2004 | Gonder et al. |
| 2004/0187164 A1 | 9/2004 | Kandasamy et al. |
| 2004/0193648 A1 | 9/2004 | Lai et al. |
| 2004/0194131 A1 | 9/2004 | Ellis et al. |
| 2004/0194138 A1 | 9/2004 | Boylan et al. |
| 2004/0210932 A1 | 10/2004 | Mori et al. |
| 2004/0210935 A1 | 10/2004 | Schein et al. |
| 2004/0220091 A1 | 11/2004 | Adam et al. |
| 2004/0221310 A1 | 11/2004 | Herrington et al. |
| 2004/0226034 A1 | 11/2004 | Kaczowka et al. |
| 2004/0226042 A1 | 11/2004 | Ellis |
| 2004/0237104 A1 | 11/2004 | Cooper et al. |
| 2004/0255326 A1 | 12/2004 | Hicks et al. |
| 2004/0257939 A1 | 12/2004 | Kawamura |
| 2004/0259537 A1 | 12/2004 | Ackley |
| 2004/0261040 A1 | 12/2004 | Radcliffe et al. |
| 2004/0261108 A1 | 12/2004 | Yuen et al. |
| 2004/0264920 A1 | 12/2004 | Helmstetter |
| 2004/0267965 A1 | 12/2004 | Vasudevan et al. |
| 2005/0013462 A1 | 1/2005 | Rhoads |
| 2005/0014531 A1 | 1/2005 | Findikli |
| 2005/0015804 A1 | 1/2005 | LaJoie et al. |
| 2005/0015815 A1 | 1/2005 | Shoff et al. |
| 2005/0028208 A1 | 2/2005 | Ellis et al. |
| 2005/0028218 A1 | 2/2005 | Blake |
| 2005/0033760 A1 | 2/2005 | Fuller et al. |
| 2005/0039208 A1 | 2/2005 | Veeck et al. |

(56) References Cited

U.S. PATENT DOCUMENTS

| | | |
|---|---|---|
| 2005/0044567 A1 | 2/2005 | Young et al. |
| 2005/0046174 A1 | 3/2005 | Botes |
| 2005/0050218 A1 | 3/2005 | Sheldon |
| 2005/0055715 A1 | 3/2005 | Minnick et al. |
| 2005/0066353 A1 | 3/2005 | Fransdonk |
| 2005/0071876 A1 | 3/2005 | van Beek |
| 2005/0080497 A1 | 4/2005 | Rao |
| 2005/0081159 A1 | 4/2005 | Gupta et al. |
| 2005/0089022 A1 | 4/2005 | Muhonen et al. |
| 2005/0097622 A1 | 5/2005 | Zigmond et al. |
| 2005/0102324 A1 | 5/2005 | Spring et al. |
| 2005/0105528 A1 | 5/2005 | Kobayashi |
| 2005/0120003 A1 | 6/2005 | Drury et al. |
| 2005/0120373 A1 | 6/2005 | Thomas et al. |
| 2005/0123001 A1 | 6/2005 | Craven et al. |
| 2005/0129049 A1 | 6/2005 | Srinivasan et al. |
| 2005/0132264 A1 | 6/2005 | Joshi et al. |
| 2005/0138137 A1 | 6/2005 | Encarnacion et al. |
| 2005/0138305 A1 | 6/2005 | Zellner |
| 2005/0138658 A1 | 6/2005 | Bryan |
| 2005/0138660 A1 | 6/2005 | Boyer et al. |
| 2005/0155056 A1 | 7/2005 | Knee et al. |
| 2005/0157217 A1 | 7/2005 | Hendricks |
| 2005/0160283 A1 | 7/2005 | Hirata |
| 2005/0160458 A1 | 7/2005 | Baumgartner |
| 2005/0160461 A1 | 7/2005 | Baumgartner et al. |
| 2005/0177859 A1 | 8/2005 | Valentino et al. |
| 2005/0182759 A1 | 8/2005 | Yuen |
| 2005/0183123 A1 | 8/2005 | Lee et al. |
| 2005/0188415 A1 | 8/2005 | Riley |
| 2005/0193015 A1 | 9/2005 | Logston et al. |
| 2005/0193414 A1 | 9/2005 | Horvitz et al. |
| 2005/0198006 A1 | 9/2005 | Boicey et al. |
| 2005/0198668 A1 | 9/2005 | Yuen et al. |
| 2005/0204388 A1 | 9/2005 | Knudson et al. |
| 2005/0204393 A1 | 9/2005 | Bopardikar et al. |
| 2005/0210526 A1 | 9/2005 | Levy et al. |
| 2005/0213938 A1 | 9/2005 | Ozawa et al. |
| 2005/0227611 A1 | 10/2005 | Ellis |
| 2005/0229214 A1 | 10/2005 | Young et al. |
| 2005/0229215 A1 | 10/2005 | Schein et al. |
| 2005/0234992 A1 | 10/2005 | Haberman |
| 2005/0235320 A1 | 10/2005 | Maze et al. |
| 2005/0235323 A1 | 10/2005 | Ellis et al. |
| 2005/0238168 A1 | 10/2005 | Lee et al. |
| 2005/0240962 A1 | 10/2005 | Cooper et al. |
| 2005/0240968 A1 | 10/2005 | Knudson et al. |
| 2005/0244138 A1 | 11/2005 | O'Connor et al. |
| 2005/0246393 A1 | 11/2005 | Coates et al. |
| 2005/0249130 A1 | 11/2005 | Schutte et al. |
| 2005/0251822 A1 | 11/2005 | Knowles et al. |
| 2005/0251827 A1 | 11/2005 | Ellis et al. |
| 2005/0254524 A1 | 11/2005 | An |
| 2005/0265169 A1 | 12/2005 | Yoshimaru et al. |
| 2005/0265395 A1 | 12/2005 | Kim et al. |
| 2005/0267819 A1 | 12/2005 | Kaplan |
| 2005/0271357 A1 | 12/2005 | Adler et al. |
| 2005/0271363 A1 | 12/2005 | Tanikawa |
| 2005/0271364 A1 | 12/2005 | Collar |
| 2005/0271365 A1 | 12/2005 | Hisatomi |
| 2005/0271366 A1 | 12/2005 | Wiinter et al. |
| 2005/0273819 A1 | 12/2005 | Knudson et al. |
| 2005/0278741 A1 | 12/2005 | Robarts et al. |
| 2005/0283796 A1 | 12/2005 | Flickinger |
| 2005/0283800 A1 | 12/2005 | Ellis et al. |
| 2005/0289618 A1 | 12/2005 | Hardin |
| 2006/0004685 A1 | 1/2006 | Pyhalammi et al. |
| 2006/0010470 A1 | 1/2006 | Kurosaki et al. |
| 2006/0015888 A1 | 1/2006 | Shih |
| 2006/0031883 A1 | 2/2006 | Ellis et al. |
| 2006/0034341 A1 | 2/2006 | Vasudevan et al. |
| 2006/0037044 A1 | 2/2006 | Daniels |
| 2006/0037054 A1 | 2/2006 | McDowell et al. |
| 2006/0041893 A1 | 2/2006 | Castro et al. |
| 2006/0062550 A1 | 3/2006 | Lee |
| 2006/0064728 A1 | 3/2006 | Son et al. |
| 2006/0080707 A1 | 4/2006 | Laksono |
| 2006/0083484 A1 | 4/2006 | Wada et al. |
| 2006/0085825 A1 | 4/2006 | Istvan et al. |
| 2006/0085826 A1 | 4/2006 | Funk et al. |
| 2006/0085835 A1 | 4/2006 | Istvan et al. |
| 2006/0090186 A1 | 4/2006 | Santangelo et al. |
| 2006/0095942 A1 | 5/2006 | van Beek |
| 2006/0111038 A1 | 5/2006 | Tatsumi et al. |
| 2006/0112410 A1 | 5/2006 | Poli et al. |
| 2006/0136965 A1 | 6/2006 | Ellis et al. |
| 2006/0136966 A1 | 6/2006 | Folk |
| 2006/0140584 A1 | 6/2006 | Ellis et al. |
| 2006/0143665 A1 | 6/2006 | Meek et al. |
| 2006/0146787 A1 | 7/2006 | Wijnands et al. |
| 2006/0165379 A1 | 7/2006 | Agnihotri et al. |
| 2006/0168620 A1 | 7/2006 | Schein et al. |
| 2006/0173838 A1 | 8/2006 | Garg et al. |
| 2006/0174270 A1 | 8/2006 | Westberg et al. |
| 2006/0206912 A1 | 9/2006 | Klarfeld et al. |
| 2006/0212904 A1 | 9/2006 | Klarfeld et al. |
| 2006/0215650 A1 | 9/2006 | Wollmershauser et al. |
| 2006/0218601 A1 | 9/2006 | Michel |
| 2006/0238648 A1 | 10/2006 | Wogsberg |
| 2006/0248570 A1 | 11/2006 | Witwer |
| 2006/0253874 A1 | 11/2006 | Stark et al. |
| 2006/0259949 A1 | 11/2006 | Schaefer et al. |
| 2006/0271953 A1 | 11/2006 | Jacoby et al. |
| 2007/0011206 A1 | 1/2007 | Gupta et al. |
| 2007/0011709 A1 | 1/2007 | Katz et al. |
| 2007/0022032 A1 | 1/2007 | Anderson et al. |
| 2007/0022442 A1 | 1/2007 | Gil et al. |
| 2007/0028267 A1 | 2/2007 | Ostojic et al. |
| 2007/0032225 A1 | 2/2007 | Konicek et al. |
| 2007/0055689 A1 | 3/2007 | Rhoads et al. |
| 2007/0055980 A1 | 3/2007 | Megeid et al. |
| 2007/0067800 A1 | 3/2007 | Wachtfogel et al. |
| 2007/0071399 A1 | 3/2007 | Ellis |
| 2007/0074245 A1 | 3/2007 | Nyako et al. |
| 2007/0089160 A1 | 4/2007 | Ando |
| 2007/0094684 A1 | 4/2007 | Schein et al. |
| 2007/0094702 A1 | 4/2007 | Khare et al. |
| 2007/0101377 A1 | 5/2007 | Six et al. |
| 2007/0104456 A1 | 5/2007 | Craner |
| 2007/0107010 A1 | 5/2007 | Jolna et al. |
| 2007/0113246 A1 | 5/2007 | Xiong |
| 2007/0116048 A1 | 5/2007 | Addington |
| 2007/0121678 A1 | 5/2007 | Brooks et al. |
| 2007/0124781 A1 | 5/2007 | Casey et al. |
| 2007/0136751 A1 | 6/2007 | Garbow et al. |
| 2007/0136753 A1 | 6/2007 | Bovenschulte et al. |
| 2007/0147351 A1 | 6/2007 | Dietrich et al. |
| 2007/0157234 A1 | 7/2007 | Walker |
| 2007/0157240 A1 | 7/2007 | Walker |
| 2007/0157241 A1 | 7/2007 | Walker |
| 2007/0157242 A1 | 7/2007 | Cordray et al. |
| 2007/0157260 A1 | 7/2007 | Walker |
| 2007/0157266 A1 | 7/2007 | Ellis et al. |
| 2007/0157281 A1 | 7/2007 | Ellis et al. |
| 2007/0162661 A1 | 7/2007 | Fu et al. |
| 2007/0169149 A1 | 7/2007 | Jennings et al. |
| 2007/0174774 A1 | 7/2007 | Lerman et al. |
| 2007/0180072 A1 | 8/2007 | Siripunkaw et al. |
| 2007/0180465 A1 | 8/2007 | Ou et al. |
| 2007/0198659 A1 | 8/2007 | Lam |
| 2007/0204285 A1 | 8/2007 | Louw |
| 2007/0204308 A1 | 8/2007 | Nicholas et al. |
| 2007/0204311 A1 | 8/2007 | Hasek et al. |
| 2007/0212023 A1 | 9/2007 | Whillock |
| 2007/0220024 A1 | 9/2007 | Putterman et al. |
| 2007/0220580 A1 | 9/2007 | Putterman et al. |
| 2007/0245371 A1 | 10/2007 | Quinard |
| 2007/0255755 A1 | 11/2007 | Zhang et al. |
| 2007/0266401 A1 | 11/2007 | Hallberg |
| 2007/0271582 A1 | 11/2007 | Ellis et al. |
| 2007/0282969 A1 | 12/2007 | Dietrich et al. |
| 2007/0283046 A1 | 12/2007 | Dietrich et al. |
| 2008/0010655 A1 | 1/2008 | Ellis et al. |
| 2008/0013429 A1 | 1/2008 | Chen et al. |

(56) References Cited

U.S. PATENT DOCUMENTS

| | | |
|---|---|---|
| 2008/0034396 A1 | 2/2008 | Lev |
| 2008/0060001 A1 | 3/2008 | Logan et al. |
| 2008/0066016 A1 | 3/2008 | Dowdy et al. |
| 2008/0077957 A1 | 3/2008 | Schein et al. |
| 2008/0086747 A1 | 4/2008 | Rasanen et al. |
| 2008/0092168 A1 | 4/2008 | Logan et al. |
| 2008/0098436 A1 | 4/2008 | White |
| 2008/0115169 A1 | 5/2008 | Ellis et al. |
| 2008/0133378 A1 | 6/2008 | Tobin |
| 2008/0133485 A1 | 6/2008 | Yuen |
| 2008/0141303 A1 | 6/2008 | Walker et al. |
| 2008/0155615 A1 | 6/2008 | Craner et al. |
| 2008/0170622 A1 | 7/2008 | Gordon et al. |
| 2008/0175143 A1 | 7/2008 | Ansley |
| 2008/0177706 A1 | 7/2008 | Yuen |
| 2008/0178221 A1 | 7/2008 | Schein et al. |
| 2008/0184304 A1 | 7/2008 | Ellis et al. |
| 2008/0184305 A1 | 7/2008 | Schein et al. |
| 2008/0184308 A1 | 7/2008 | Herrington et al. |
| 2008/0184312 A1 | 7/2008 | Schein et al. |
| 2008/0184313 A1 | 7/2008 | Knudson et al. |
| 2008/0184315 A1 | 7/2008 | Ellis et al. |
| 2008/0184319 A1 | 7/2008 | Mankovitz |
| 2008/0184322 A1 | 7/2008 | Blake |
| 2008/0189440 A1 | 8/2008 | Goyal et al. |
| 2008/0189742 A1 | 8/2008 | Ellis et al. |
| 2008/0189743 A1 | 8/2008 | Ellis et al. |
| 2008/0189744 A1 | 8/2008 | Schein et al. |
| 2008/0189745 A1 | 8/2008 | Hassell et al. |
| 2008/0216136 A1 | 9/2008 | Pfeffer et al. |
| 2008/0229379 A1 | 9/2008 | Akhter |
| 2008/0232769 A1 | 9/2008 | Jureczki et al. |
| 2008/0235725 A1 | 9/2008 | Hendricks |
| 2008/0263227 A1 | 10/2008 | Roberts et al. |
| 2008/0263600 A1 | 10/2008 | Olague et al. |
| 2008/0288980 A1 | 11/2008 | Schein et al. |
| 2008/0307477 A1 | 12/2008 | Omernick |
| 2008/0320540 A1 | 12/2008 | Brooks et al. |
| 2009/0019492 A1 | 1/2009 | Grasset |
| 2009/0025027 A1 | 1/2009 | Craner |
| 2009/0025052 A1 | 1/2009 | Schlack et al. |
| 2009/0031335 A1 | 1/2009 | Hendricks et al. |
| 2009/0044226 A1 | 2/2009 | Ellis et al. |
| 2009/0060468 A1 | 3/2009 | Carlberg et al. |
| 2009/0060469 A1 | 3/2009 | Olague et al. |
| 2009/0070817 A1 | 3/2009 | Ellis et al. |
| 2009/0074380 A1 | 3/2009 | Boston et al. |
| 2009/0077589 A1 | 3/2009 | Boyer et al. |
| 2009/0094113 A1 | 4/2009 | Berry et al. |
| 2009/0138922 A1 | 5/2009 | Thomas et al. |
| 2009/0241144 A1 | 9/2009 | Lajoie et al. |
| 2009/0271286 A1 | 10/2009 | Tobin |
| 2009/0271818 A1 | 10/2009 | Schlack |
| 2009/0297124 A1 | 12/2009 | Ng |
| 2010/0115413 A1 | 5/2010 | Schein et al. |
| 2010/0115541 A1 | 5/2010 | Schein et al. |
| 2010/0175090 A1 | 7/2010 | Cordray |
| 2010/0186034 A1 | 7/2010 | Walker |
| 2010/0211969 A1 | 8/2010 | Schein et al. |
| 2010/0211975 A1 | 8/2010 | Boyer et al. |
| 2010/0247065 A1 | 9/2010 | Cooper et al. |
| 2010/0312761 A1 | 12/2010 | Yuen |
| 2010/0312795 A1 | 12/2010 | Yuen |
| 2010/0313130 A1 | 12/2010 | Yuen |
| 2010/0313131 A1 | 12/2010 | Yuen |
| 2011/0004897 A1 | 1/2011 | Alexander et al. |
| 2011/0013885 A1 | 1/2011 | Wong et al. |
| 2011/0030027 A1 | 2/2011 | Nishioka et al. |
| 2011/0106901 A1 | 5/2011 | Wu |
| 2011/0131607 A1 | 6/2011 | Thomas et al. |
| 2011/0173660 A1 | 7/2011 | Schein et al. |
| 2011/0185387 A1 | 7/2011 | Schein et al. |
| 2011/0185392 A1 | 7/2011 | Walker |
| 2011/0209170 A1 | 8/2011 | Schein et al. |
| 2011/0258663 A1 | 10/2011 | Lemmons et al. |
| 2011/0265124 A1 | 10/2011 | Goldenberg et al. |
| 2012/0008917 A1 | 1/2012 | Katz et al. |
| 2012/0011226 A1 | 1/2012 | Katz et al. |
| 2012/0079539 A1 | 3/2012 | Schein et al. |
| 2012/0131218 A1 | 5/2012 | Putterman et al. |
| 2012/0192232 A1 | 7/2012 | Ellis |
| 2012/0209843 A1 | 8/2012 | deVries et al. |
| 2012/0239661 A1 | 9/2012 | Giblin |
| 2012/0272270 A1 | 10/2012 | Boyer et al. |
| 2012/0304211 A1 | 11/2012 | Berezowski et al. |
| 2013/0097145 A1 | 4/2013 | Yuen |
| 2013/0304586 A1 | 11/2013 | Angles et al. |
| 2014/0040938 A1 | 2/2014 | Thomas et al. |
| 2014/0105573 A1 | 4/2014 | Hanckmann et al. |

FOREIGN PATENT DOCUMENTS

| | | |
|---|---|---|
| AU | 2008201306 A1 | 4/2008 |
| AU | 2013201327 | 3/2013 |
| CA | 1030505 A1 | 5/1978 |
| CA | 1187197 A1 | 5/1985 |
| CA | 1188811 A1 | 6/1985 |
| CA | 1196082 A1 | 10/1985 |
| CA | 1200911 A1 | 2/1986 |
| CA | 2091160 A1 | 3/1992 |
| CA | 2151458 A1 | 6/1994 |
| CA | 2345161 A1 | 6/1994 |
| CA | 2164608 A1 | 12/1994 |
| CA | 2232003 | 4/1997 |
| CA | 2257971 A1 | 12/1997 |
| CA | 2260993 A1 | 2/1998 |
| CA | 2764753 A1 | 6/1998 |
| CA | 2285645 A1 | 7/1998 |
| CA | 2312326 A1 | 6/1999 |
| CA | 2364020 A1 | 5/2002 |
| CA | 2635571 A1 | 7/2007 |
| CN | 247388 | 10/1994 |
| CN | 1117687 | 2/1996 |
| CN | 1130843 A | 9/1996 |
| CN | 1174477 | 2/1998 |
| CN | 1200221 A | 11/1998 |
| CN | 1355994 A | 6/2002 |
| CN | 1567986 | 1/2005 |
| CN | 101707876 A | 5/2010 |
| DE | 29 18 846 | 11/1980 |
| DE | 31 51 492 | 7/1983 |
| DE | 3246225 A1 | 6/1984 |
| DE | 3337204 | 4/1985 |
| DE | 3 610 600 | 1/1987 |
| DE | 36 21 263 A1 | 1/1988 |
| DE | 3640436 A1 | 6/1988 |
| DE | 3909334 A1 | 9/1990 |
| DE | 4201031 A1 | 7/1993 |
| DE | 4217246 A1 | 12/1993 |
| DE | 4240187 A1 | 6/1994 |
| DE | 4407701 A1 | 9/1995 |
| DE | 44 31 438 A1 | 3/1996 |
| DE | 44 40 174 | 5/1996 |
| DE | 4440419 A1 | 5/1996 |
| DE | 195 02 922 | 8/1996 |
| DE | 19 531 121 A1 | 2/1997 |
| DE | 19615437 C1 | 7/1997 |
| DE | 19 740 079 A1 | 3/1999 |
| DE | 19 931 046 A1 | 1/2001 |
| EP | 0 072 153 A2 | 2/1983 |
| EP | 012262 A2 | 10/1984 |
| EP | 0133985 A2 | 3/1985 |
| EP | 0160545 A2 | 11/1985 |
| EP | 0 239 884 A1 | 10/1987 |
| EP | 0 276 425 A2 | 8/1988 |
| EP | 0339675 | 11/1989 |
| EP | 0396062 A2 | 11/1990 |
| EP | 0401930 A2 | 12/1990 |
| EP | 0408892 A1 | 1/1991 |
| EP | 0420123 A2 | 4/1991 |
| EP | 0424469 | 5/1991 |
| EP | 0439281 A2 | 7/1991 |
| EP | 0439290 A1 | 7/1991 |
| EP | 0444496 | 9/1991 |

(56) References Cited

FOREIGN PATENT DOCUMENTS

| | | |
|---|---|---|
| EP | 0447968 A2 | 9/1991 |
| EP | 0 463 451 A2 | 1/1992 |
| EP | 0472147 | 2/1992 |
| EP | 0472521 A1 | 3/1992 |
| EP | 0 477 754 A2 | 4/1992 |
| EP | 0477756 A2 | 4/1992 |
| EP | 0 492 853 A2 | 7/1992 |
| EP | 0525427 A2 | 2/1993 |
| EP | 0532322 A2 | 3/1993 |
| EP | 0535749 A2 | 4/1993 |
| EP | 0550911 A1 | 7/1993 |
| EP | 0 560 593 | 9/1993 |
| EP | 0 572 090 | 12/1993 |
| EP | 0 575 956 A2 | 12/1993 |
| EP | 0 583 196 A1 | 2/1994 |
| EP | 0584991 | 3/1994 |
| EP | 0605115 A2 | 7/1994 |
| EP | 0617563 A1 | 9/1994 |
| EP | 0 624 040 A2 | 11/1994 |
| EP | 0624039 A2 | 11/1994 |
| EP | 0627857 A1 | 12/1994 |
| EP | 0631437 A2 | 12/1994 |
| EP | 0 644 689 A2 | 3/1995 |
| EP | 0 650 114 A2 | 4/1995 |
| EP | 0 658 048 A1 | 6/1995 |
| EP | 0660221 A1 | 6/1995 |
| EP | 0 662 769 A1 | 7/1995 |
| EP | 0662771 A1 | 7/1995 |
| EP | 0665551 | 8/1995 |
| EP | 0673160 A1 | 9/1995 |
| EP | 0673583 A1 | 9/1995 |
| EP | 0 682 452 A2 | 11/1995 |
| EP | 0696140 A2 | 2/1996 |
| EP | 0 705 036 | 4/1996 |
| EP | 0711073 | 5/1996 |
| EP | 0711076 A2 | 5/1996 |
| EP | 0713334 | 5/1996 |
| EP | 0 723 369 A1 | 7/1996 |
| EP | 0721253 A2 | 7/1996 |
| EP | 0725539 A2 | 8/1996 |
| EP | 0737979 A2 | 10/1996 |
| EP | 0737980 A2 | 10/1996 |
| EP | 0 742669 | 11/1996 |
| EP | 0744853 A2 | 11/1996 |
| EP | 0744866 | 11/1996 |
| EP | 0751648 A2 | 1/1997 |
| EP | 0752767 A2 | 1/1997 |
| EP | 0753964 A1 | 1/1997 |
| EP | 0757873 A1 | 2/1997 |
| EP | 0758833 A2 | 2/1997 |
| EP | 0762657 A2 | 3/1997 |
| EP | 0762751 A2 | 3/1997 |
| EP | 0762756 A2 | 3/1997 |
| EP | 0763938 | 3/1997 |
| EP | 0 774 853 | 5/1997 |
| EP | 0 774 868 A1 | 5/1997 |
| EP | 0772360 | 5/1997 |
| EP | 0773682 A2 | 5/1997 |
| EP | 0774866 A2 | 5/1997 |
| EP | 0775417 A1 | 5/1997 |
| EP | 0782332 A2 | 7/1997 |
| EP | 0784405 | 7/1997 |
| EP | 0 789 488 | 8/1997 |
| EP | 0 793 225 | 9/1997 |
| EP | 0 795 994 | 9/1997 |
| EP | 0797355 | 9/1997 |
| EP | 0801389 A2 | 10/1997 |
| EP | 0801390 A2 | 10/1997 |
| EP | 0 806 111 A1 | 11/1997 |
| EP | 0805594 A2 | 11/1997 |
| EP | 0806721 | 12/1997 |
| EP | 0821856 A1 | 2/1998 |
| EP | 0822713 | 2/1998 |
| EP | 0822718 | 2/1998 |
| EP | 0827340 A2 | 3/1998 |
| EP | 0 836 320 | 4/1998 |
| EP | 0 837599 A2 | 4/1998 |
| EP | 0834798 | 4/1998 |
| EP | 0843468 | 5/1998 |
| EP | 0 848 383 | 6/1998 |
| EP | 0848554 A2 | 6/1998 |
| EP | 0849948 | 6/1998 |
| EP | 0849958 | 6/1998 |
| EP | 0 852361 A2 | 7/1998 |
| EP | 0 854 645 | 7/1998 |
| EP | 0851681 | 7/1998 |
| EP | 0852442 A1 | 7/1998 |
| EP | 0854654 | 7/1998 |
| EP | 0 858 223 A2 | 8/1998 |
| EP | 0 862 833 A1 | 9/1998 |
| EP | 0872834 | 10/1998 |
| EP | 0874524 | 10/1998 |
| EP | 0880856 A1 | 12/1998 |
| EP | 0 892 554 A2 | 1/1999 |
| EP | 0897242 A1 | 2/1999 |
| EP | 0905065 A2 | 3/1999 |
| EP | 0 921 682 A2 | 6/1999 |
| EP | 0924927 | 6/1999 |
| EP | 0932275 | 7/1999 |
| EP | 0935393 A2 | 8/1999 |
| EP | 0 940 983 | 9/1999 |
| EP | 0 945003 B1 | 9/1999 |
| EP | 0940985 | 9/1999 |
| EP | 0944253 A1 | 9/1999 |
| EP | 0944257 A1 | 9/1999 |
| EP | 0963119 A1 | 12/1999 |
| EP | 0969661 | 1/2000 |
| EP | 0969662 A1 | 1/2000 |
| EP | 0986046 A1 | 3/2000 |
| EP | 0988876 A1 | 3/2000 |
| EP | 1014715 A2 | 6/2000 |
| EP | 1 059 749 | 12/2000 |
| EP | 1094665 A1 | 4/2001 |
| EP | 1 099 339 | 5/2001 |
| EP | 1 104 195 A2 | 5/2001 |
| EP | 1095504 A2 | 5/2001 |
| EP | 1099341 A1 | 5/2001 |
| EP | 1107588 A2 | 6/2001 |
| EP | 0 856 847 | 11/2001 |
| EP | 1152605 A1 | 11/2001 |
| EP | 1158793 A2 | 11/2001 |
| EP | 1161088 A2 | 12/2001 |
| EP | 1187467 A2 | 3/2002 |
| EP | 1213919 A2 | 6/2002 |
| EP | 1217787 A2 | 6/2002 |
| EP | 1 237 372 A1 | 9/2002 |
| EP | 1 244 300 A1 | 9/2002 |
| EP | 1 271 952 | 1/2003 |
| EP | 1292137 A1 | 3/2003 |
| EP | 0936811 B1 | 5/2003 |
| EP | 1327209 A2 | 7/2003 |
| EP | 1355489 A2 | 10/2003 |
| EP | 1377049 A1 | 1/2004 |
| EP | 1427148 A1 | 6/2004 |
| EP | 1473934 | 11/2004 |
| EP | 1 515 549 | 3/2005 |
| EP | 1 538 838 | 6/2005 |
| EP | 1581001 A2 | 9/2005 |
| EP | 1613066 A2 | 1/2006 |
| EP | 1667455 A1 | 6/2006 |
| EP | 1 687 951 A1 | 8/2006 |
| EP | 1763234 A2 | 3/2007 |
| EP | 1796393 A1 | 6/2007 |
| EP | 2174484 A1 | 4/2010 |
| FR | 2572235 A1 | 4/1986 |
| FR | 2579397 A2 | 9/1986 |
| FR | 2662895 A1 | 12/1991 |
| FR | 2 678 091 | 12/1992 |
| GB | 1 554 411 | 10/1979 |
| GB | 2034995 A | 6/1980 |
| GB | 2126002 A | 3/1984 |
| GB | 2164194 A | 3/1986 |
| GB | 2185670 A | 7/1987 |
| GB | 2 210 526 | 6/1989 |

(56) References Cited

FOREIGN PATENT DOCUMENTS

| | | |
|---|---|---|
| GB | 2219886 | 12/1989 |
| GB | 2 227 622 | 8/1990 |
| GB | 2 229 595 | 9/1990 |
| GB | 2 256 115 | 11/1992 |
| GB | 2256116 A | 11/1992 |
| GB | 2256546 A | 12/1992 |
| GB | 2265792 | 10/1993 |
| GB | 2275800 | 9/1994 |
| GB | 2 286 754 | 8/1995 |
| GB | 2289782 A | 11/1995 |
| GB | 2294173 A | 4/1996 |
| GB | 2298544 | 9/1996 |
| GB | 2 300 551 A | 11/1996 |
| GB | 2 307 628 A | 5/1997 |
| GB | 2309134 A | 7/1997 |
| GB | 2325537 A | 11/1998 |
| GB | 2 346 251 | 8/2000 |
| GB | 2 375 674 A | 11/2002 |
| JP | 58137334 A | 8/1983 |
| JP | 58196738 A | 11/1983 |
| JP | 58210776 A | 12/1983 |
| JP | 59141878 A | 8/1984 |
| JP | 60061935 A | 4/1985 |
| JP | 60171685 A | 9/1985 |
| JP | 61050470 A | 3/1986 |
| JP | 61074476 A | 4/1986 |
| JP | 62-060370 | 3/1987 |
| JP | -62060372 | 3/1987 |
| JP | 62060378 A | 3/1987 |
| JP | 62060384 A | 3/1987 |
| JP | 63-054884 A | 3/1988 |
| JP | 06392177 | 4/1988 |
| JP | 63141467 A | 6/1988 |
| JP | 63234679 A | 9/1988 |
| JP | 63-289619 A | 11/1988 |
| JP | 64013278 | 1/1989 |
| JP | 1-78328 | 5/1989 |
| JP | 11-32311 A | 5/1989 |
| JP | 11-88280 A | 7/1989 |
| JP | 01209399 A | 8/1989 |
| JP | 1212986 A | 8/1989 |
| JP | 01213853 A | 8/1989 |
| JP | 01307944 A | 12/1989 |
| JP | 02045495 A | 2/1990 |
| JP | 02048879 A | 2/1990 |
| JP | 0281385 | 3/1990 |
| JP | 10-234007 | 9/1990 |
| JP | 03-022770 | 1/1991 |
| JP | 335451 | 2/1991 |
| JP | 03059837 A | 3/1991 |
| JP | 03063990 A | 3/1991 |
| JP | 03215781 A | 9/1991 |
| JP | 03226083 | 10/1991 |
| JP | 03286483 | 12/1991 |
| JP | 04079053 | 3/1992 |
| JP | 04105285 A | 4/1992 |
| JP | 04227380 | 8/1992 |
| JP | 04250760 A | 9/1992 |
| JP | 05101471 | 4/1993 |
| JP | 05-183826 | 7/1993 |
| JP | 05260400 A | 10/1993 |
| JP | 05260554 A | 10/1993 |
| JP | 05284437 A | 10/1993 |
| JP | 05-314186 B2 | 11/1993 |
| JP | 06014129 A | 1/1994 |
| JP | 06021907 | 1/1994 |
| JP | 06038165 | 2/1994 |
| JP | 06046345 A | 2/1994 |
| JP | 60-61935 A | 3/1994 |
| JP | 06069850 A | 3/1994 |
| JP | 06-121262 | 4/1994 |
| JP | 06111413 | 4/1994 |
| JP | 06-124309 | 5/1994 |
| JP | 06133334 | 5/1994 |
| JP | 06504165 | 5/1994 |
| JP | 06-208500 | 7/1994 |
| JP | 06-217271 | 8/1994 |
| JP | 06236592 | 8/1994 |
| JP | 06-261139 A | 9/1994 |
| JP | 06243539 | 9/1994 |
| JP | 06303541 | 10/1994 |
| JP | 06-350546 | 12/1994 |
| JP | 07-021619 | 1/1995 |
| JP | 0723356 | 1/1995 |
| JP | 07020254 | 1/1995 |
| JP | 07-050259 | 2/1995 |
| JP | 07044930 A | 2/1995 |
| JP | 07-076592 | 3/1995 |
| JP | 07-135621 A | 5/1995 |
| JP | 07123326 | 5/1995 |
| JP | 07-162776 | 6/1995 |
| JP | 07147657 A | 6/1995 |
| JP | 07154349 A | 6/1995 |
| JP | 07160732 | 6/1995 |
| JP | 07184131 A | 7/1995 |
| JP | 07193762 A | 7/1995 |
| JP | 07193763 A | 7/1995 |
| JP | 07-212328 | 8/1995 |
| JP | 07212331 A | 8/1995 |
| JP | 07212732 A | 8/1995 |
| JP | 07230666 A | 8/1995 |
| JP | 07231437 A | 8/1995 |
| JP | 07-288759 | 10/1995 |
| JP | 07-298153 | 11/1995 |
| JP | 07-321748 | 12/1995 |
| JP | 07-336318 | 12/1995 |
| JP | 08-018882 A | 1/1996 |
| JP | 08-056352 | 2/1996 |
| JP | 08032528 A | 2/1996 |
| JP | 08032538 | 2/1996 |
| JP | 0877763 | 3/1996 |
| JP | 08-116495 A | 5/1996 |
| JP | 08125497 | 5/1996 |
| JP | 08130517 A | 5/1996 |
| JP | 08180505 | 7/1996 |
| JP | 08506941 | 7/1996 |
| JP | 08-242436 | 9/1996 |
| JP | 08242313 A | 9/1996 |
| JP | 08251122 | 9/1996 |
| JP | 08275077 | 10/1996 |
| JP | 8-314979 A | 11/1996 |
| JP | 08317331 | 11/1996 |
| JP | 08-331546 A | 12/1996 |
| JP | 09-009245 | 1/1997 |
| JP | 09037151 A | 2/1997 |
| JP | 9037168 | 2/1997 |
| JP | 09037172 A | 2/1997 |
| JP | 09 065300 | 3/1997 |
| JP | 09-070020 | 3/1997 |
| JP | 09065300 | 3/1997 |
| JP | 09-102827 A | 4/1997 |
| JP | 09-120686 A | 5/1997 |
| JP | 09-138804 | 5/1997 |
| JP | 09120686 | 5/1997 |
| JP | 9139915 | 5/1997 |
| JP | 09 148994 | 6/1997 |
| JP | 09 162818 | 6/1997 |
| JP | 09-162821 | 6/1997 |
| JP | 09148994 | 6/1997 |
| JP | 09162818 | 6/1997 |
| JP | 09506226 | 6/1997 |
| JP | 09182035 | 7/1997 |
| JP | 09-214873 | 8/1997 |
| JP | 09204286 | 8/1997 |
| JP | 9233387 | 9/1997 |
| JP | 9245467 | 9/1997 |
| JP | 09-261609 A | 10/1997 |
| JP | 09-270965 A | 10/1997 |
| JP | 09259515 A | 10/1997 |
| JP | 09-298677 | 11/1997 |
| JP | 09289630 | 11/1997 |
| JP | 09322213 | 12/1997 |
| JP | 1027076 | 1/1998 |
| JP | 10-40057 | 2/1998 |

(56) References Cited

FOREIGN PATENT DOCUMENTS

| | | |
|---|---|---|
| JP | 10-042235 | 2/1998 |
| JP | 10042242 | 2/1998 |
| JP | 10 065978 | 3/1998 |
| JP | 10-65978 | 3/1998 |
| JP | 10-093933 | 4/1998 |
| JP | 10091534 | 4/1998 |
| JP | 10092161 A | 4/1998 |
| JP | 10093879 | 4/1998 |
| JP | 10093905 | 4/1998 |
| JP | 10093936 | 4/1998 |
| JP | 10108122 | 4/1998 |
| JP | 10112087 | 4/1998 |
| JP | 10-143340 | 5/1998 |
| JP | 10-143349 | 5/1998 |
| JP | 10164487 | 6/1998 |
| JP | 10174037 A | 6/1998 |
| JP | 10191221 | 7/1998 |
| JP | 10-228500 | 8/1998 |
| JP | 10215440 | 8/1998 |
| JP | 10243309 | 9/1998 |
| JP | 10243344 | 9/1998 |
| JP | 10243352 | 9/1998 |
| JP | 10247344 A | 9/1998 |
| JP | 10257400 A | 9/1998 |
| JP | 10-289205 | 10/1998 |
| JP | 10-512420 | 11/1998 |
| JP | 11 032272 | 2/1999 |
| JP | 1169317 | 3/1999 |
| JP | 11-136615 A | 5/1999 |
| JP | 11-136658 | 5/1999 |
| JP | 11 205711 | 7/1999 |
| JP | 11177962 A | 7/1999 |
| JP | 11-266414 A | 9/1999 |
| JP | 11261917 A | 9/1999 |
| JP | 11-313280 A | 11/1999 |
| JP | 11-317937 A | 11/1999 |
| JP | 11-512903 | 11/1999 |
| JP | 11308561 A | 11/1999 |
| JP | 11317937 | 11/1999 |
| JP | 11-353071 A | 12/1999 |
| JP | H11-341040 A | 12/1999 |
| JP | 2000-004272 A | 1/2000 |
| JP | 2000-013708 | 1/2000 |
| JP | 2000-138886 | 5/2000 |
| JP | 2000-224533 | 8/2000 |
| JP | 2000-235546 | 8/2000 |
| JP | 2000216845 A | 8/2000 |
| JP | 2000-261750 A | 9/2000 |
| JP | 2000-287179 A | 10/2000 |
| JP | 2000-306314 | 11/2000 |
| JP | 2000-312333 A | 11/2000 |
| JP | 2000-339931 A | 12/2000 |
| JP | 2001-022282 A | 1/2001 |
| JP | 200186423 | 3/2001 |
| JP | 2001-88372 | 4/2001 |
| JP | 2001103404 A | 4/2001 |
| JP | 2001-165669 | 6/2001 |
| JP | 2001-167522 | 6/2001 |
| JP | 2001167491 A | 6/2001 |
| JP | 2001-204001 A | 7/2001 |
| JP | 2001-213595 | 8/2001 |
| JP | 2001-257950 | 9/2001 |
| JP | 2001527709 A | 12/2001 |
| JP | 2002/010153 A | 1/2002 |
| JP | 2002-063385 A | 2/2002 |
| JP | 03286444 B2 | 5/2002 |
| JP | 2002514794 A | 5/2002 |
| JP | 2002-176610 | 6/2002 |
| JP | 2002/185931 A | 6/2002 |
| JP | 2002/185951 A | 6/2002 |
| JP | 2002/199318 A | 7/2002 |
| JP | 2002-522977 A | 7/2002 |
| JP | 2002-223425 | 8/2002 |
| JP | 2002-279969 | 9/2002 |
| JP | 2002-335463 A | 11/2002 |
| JP | 2002335473 A | 11/2002 |
| JP | 2002-354354 A | 12/2002 |
| JP | 2002369108 A | 12/2002 |
| JP | 2002374506 A | 12/2002 |
| JP | 2003067226 A | 3/2003 |
| JP | 2003076598 A | 3/2003 |
| JP | 2003-162444 A | 6/2003 |
| JP | 2003-518832 A | 6/2003 |
| JP | 2003169087 A | 6/2003 |
| JP | 2003-189267 A | 7/2003 |
| JP | 2003-199004 A | 7/2003 |
| JP | 2003-209893 A | 7/2003 |
| JP | 2003219340 A | 7/2003 |
| JP | 2003219367 A | 7/2003 |
| JP | 2003-304503 A | 10/2003 |
| JP | 2003-339000 A | 11/2003 |
| JP | 2004-07592 | 1/2004 |
| JP | 2004-23326 | 1/2004 |
| JP | 2004-080083 A | 3/2004 |
| JP | 2004-120038 A | 4/2004 |
| JP | 2004-159004 A | 6/2004 |
| JP | 2004159318 A | 6/2004 |
| JP | 2004-193920 A | 7/2004 |
| JP | 2004-343520 A | 12/2004 |
| JP | 2005-094175 A | 4/2005 |
| JP | 2005-117236 A | 4/2005 |
| JP | 2005115790 A | 4/2005 |
| JP | 2006025444 A | 1/2006 |
| JP | 2006066968 A | 3/2006 |
| JP | 2006-088052 A | 4/2006 |
| JP | 200753566 | 3/2007 |
| JP | 2007-531331 A | 11/2007 |
| JP | 04042454 B2 | 2/2008 |
| JP | 04276342 B2 | 6/2009 |
| JP | 2010506299 A | 2/2010 |
| JP | 2010187389 A | 8/2010 |
| JP | 5053378 B2 | 10/2012 |
| JP | 05137104 B2 | 2/2013 |
| KR | 10-19910014931 | 8/1991 |
| KR | 19920015347 | 8/1992 |
| KR | 1019970064188 | 9/1997 |
| KR | 1019970078662 | 12/1997 |
| KR | 1998025758 | 7/1998 |
| KR | 1020087015347 | 9/1999 |
| KR | 19990086454 | 12/1999 |
| KR | 1019990044886 | 5/2000 |
| KR | 1020000054561 | 9/2000 |
| KR | 2000-0059522 A | 10/2000 |
| KR | 1020000030530 | 12/2001 |
| KR | 1020000036488 | 1/2002 |
| KR | 1020000050028 | 3/2002 |
| KR | 1020030029410 | 4/2003 |
| KR | 2005-0108181 A | 11/2005 |
| KR | 2005-0113493 A | 12/2005 |
| KR | 102014009557 | 8/2014 |
| WO | WO-8302078 A1 | 6/1983 |
| WO | WO-8601359 A1 | 2/1986 |
| WO | WO-8601962 A1 | 3/1986 |
| WO | WO-8703766 A1 | 6/1987 |
| WO | WO-8801465 A1 | 2/1988 |
| WO | WO-8804507 A1 | 6/1988 |
| WO | WO-8902682 A1 | 3/1989 |
| WO | WO-8903085 A1 | 4/1989 |
| WO | WO-8911199 A1 | 11/1989 |
| WO | WO-8912370 A1 | 12/1989 |
| WO | WO-9000847 A1 | 1/1990 |
| WO | WO-9001243 A1 | 2/1990 |
| WO | WO-9007844 A1 | 7/1990 |
| WO | WO-9015507 A1 | 12/1990 |
| WO | WO-9100670 A1 | 1/1991 |
| WO | WO-9107050 A1 | 5/1991 |
| WO | WO-9108629 A1 | 6/1991 |
| WO | WO-9118476 A1 | 11/1991 |
| WO | WO-9204801 A1 | 3/1992 |
| WO | WO-9217027 A1 | 10/1992 |
| WO | WO-9222983 A2 | 12/1992 |
| WO | WO-9304473 A2 | 3/1993 |
| WO | WO-9305452 A1 | 3/1993 |
| WO | WO-9308542 A1 | 4/1993 |

(56) References Cited

FOREIGN PATENT DOCUMENTS

| | | |
|---|---|---|
| WO | WO-9310606 A1 | 5/1993 |
| WO | WO-9311638 A1 | 6/1993 |
| WO | WO-9311639 A1 | 6/1993 |
| WO | WO-9311640 A1 | 6/1993 |
| WO | WO-93/23957 A1 | 11/1993 |
| WO | WO-9322877 A2 | 11/1993 |
| WO | WO-94/14284 A1 | 6/1994 |
| WO | WO-9413107 A1 | 6/1994 |
| WO | WO-9413284 A1 | 6/1994 |
| WO | WO-9414281 A1 | 6/1994 |
| WO | WO-9414282 A1 | 6/1994 |
| WO | WO-9414283 A1 | 6/1994 |
| WO | WO-9416441 A1 | 7/1994 |
| WO | WO-9421085 A1 | 9/1994 |
| WO | WO-9423383 A1 | 10/1994 |
| WO | WO-9429811 A1 | 12/1994 |
| WO | WO-9501056 A1 | 1/1995 |
| WO | WO-9501058 A1 | 1/1995 |
| WO | WO-9501059 A1 | 1/1995 |
| WO | WO-9502945 A1 | 1/1995 |
| WO | WO-9504431 A2 | 2/1995 |
| WO | WO-9506389 A1 | 3/1995 |
| WO | WO-9507003 A1 | 3/1995 |
| WO | WO-9510910 A2 | 4/1995 |
| WO | WO-9510916 A1 | 4/1995 |
| WO | WO-9511567 A1 | 4/1995 |
| WO | WO-9515649 A1 | 6/1995 |
| WO | WO-9515657 A1 | 6/1995 |
| WO | WO-9515658 A1 | 6/1995 |
| WO | WO-9516568 A1 | 6/1995 |
| WO | WO-9518449 A2 | 7/1995 |
| WO | WO-9519092 A1 | 7/1995 |
| WO | WO-9526095 A2 | 9/1995 |
| WO | WO-9526608 A1 | 10/1995 |
| WO | WO-9528055 A1 | 10/1995 |
| WO | WO-9528799 A1 | 10/1995 |
| WO | WO-9530961 A1 | 11/1995 |
| WO | WO-9531069 A1 | 11/1995 |
| WO | WO-9532583 A1 | 11/1995 |
| WO | WO-9532584 A1 | 11/1995 |
| WO | WO-9532585 A1 | 11/1995 |
| WO | WO-9532587 A1 | 11/1995 |
| WO | WO-9533338 A1 | 12/1995 |
| WO | WO-9607270 A1 | 3/1996 |
| WO | WO-9608109 A1 | 3/1996 |
| WO | WO-9608113 A1 | 3/1996 |
| WO | WO-9609721 | 3/1996 |
| WO | WO-9613013 A1 | 5/1996 |
| WO | WO-9613124 A1 | 5/1996 |
| WO | WO-9613932 A1 | 5/1996 |
| WO | WO-9613935 A1 | 5/1996 |
| WO | WO-9617467 A2 | 6/1996 |
| WO | WO-9617473 A1 | 6/1996 |
| WO | WO-9620555 A1 | 7/1996 |
| WO | WO-9621990 A2 | 7/1996 |
| WO | WO-96/26605 A1 | 8/1996 |
| WO | WO-9625821 A1 | 8/1996 |
| WO | WO-9627270 A1 | 9/1996 |
| WO | WO-9627982 A1 | 9/1996 |
| WO | WO-9627989 A1 | 9/1996 |
| WO | WO-9631980 A1 | 10/1996 |
| WO | WO-9632583 A1 | 10/1996 |
| WO | WO-9633572 A1 | 10/1996 |
| WO | WO-9633579 A1 | 10/1996 |
| WO | WO-9634467 A1 | 10/1996 |
| WO | WO-9634486 A1 | 10/1996 |
| WO | WO-9634491 A1 | 10/1996 |
| WO | WO-96/36172 A2 | 11/1996 |
| WO | WO-96/37075 A1 | 11/1996 |
| WO | WO-9637983 A1 | 11/1996 |
| WO | WO-9637996 A1 | 11/1996 |
| WO | WO-96/41285 A1 | 12/1996 |
| WO | WO-9638799 A1 | 12/1996 |
| WO | WO-9638962 A1 | 12/1996 |
| WO | WO-9641418 A1 | 12/1996 |
| WO | WO-9641470 A1 | 12/1996 |
| WO | WO-9641471 A1 | 12/1996 |
| WO | WO-9641472 A1 | 12/1996 |
| WO | WO-9641477 | 12/1996 |
| WO | WO-9641478 A1 | 12/1996 |
| WO | WO-9702568 A1 | 1/1997 |
| WO | WO-9702702 A2 | 1/1997 |
| WO | WO-9704595 A1 | 2/1997 |
| WO | WO-9705616 A1 | 2/1997 |
| WO | WO-9707656 A2 | 3/1997 |
| WO | WO-97/12342 A1 | 4/1997 |
| WO | WO-9712314 A1 | 4/1997 |
| WO | WO-9712486 A1 | 4/1997 |
| WO | WO-9713368 A1 | 4/1997 |
| WO | WO-97/17774 A1 | 5/1997 |
| WO | WO-9718670 A1 | 5/1997 |
| WO | WO-9718675 A1 | 5/1997 |
| WO | WO-9719555 A1 | 5/1997 |
| WO | WO-9719565 A2 | 5/1997 |
| WO | WO-9721291 A2 | 6/1997 |
| WO | WO-9722207 A1 | 6/1997 |
| WO | WO-9723997 A1 | 7/1997 |
| WO | WO-9726612 A1 | 7/1997 |
| WO | WO-9728499 A1 | 8/1997 |
| WO | WO-9730546 A1 | 8/1997 |
| WO | WO-9731479 A1 | 8/1997 |
| WO | WO-9731480 A1 | 8/1997 |
| WO | WO-9732434 A1 | 9/1997 |
| WO | WO-9733434 A1 | 9/1997 |
| WO | WO-9734413 A1 | 9/1997 |
| WO | WO-9734414 A1 | 9/1997 |
| WO | WO-9735428 A1 | 9/1997 |
| WO | WO-9736422 A1 | 10/1997 |
| WO | WO-9737500 A1 | 10/1997 |
| WO | WO-9740623 A1 | 10/1997 |
| WO | WO-9741673 A2 | 11/1997 |
| WO | WO-9742763 A1 | 11/1997 |
| WO | WO-97/46950 A1 | 12/1997 |
| WO | WO-97/48230 A1 | 12/1997 |
| WO | WO-9745786 A1 | 12/1997 |
| WO | WO-9746008 A1 | 12/1997 |
| WO | WO-9746016 A1 | 12/1997 |
| WO | WO-9746943 A1 | 12/1997 |
| WO | WO-9747106 A1 | 12/1997 |
| WO | WO-9747124 A1 | 12/1997 |
| WO | WO-9747143 A2 | 12/1997 |
| WO | WO-9748228 A1 | 12/1997 |
| WO | WO-9749057 A1 | 12/1997 |
| WO | WO-9749237 A1 | 12/1997 |
| WO | WO-9749241 A1 | 12/1997 |
| WO | WO-9749242 A1 | 12/1997 |
| WO | WO-9750250 A1 | 12/1997 |
| WO | WO-9750251 A1 | 12/1997 |
| WO | WO-9801995 A1 | 1/1998 |
| WO | WO-98/06219 A1 | 2/1998 |
| WO | WO-9806098 A1 | 2/1998 |
| WO | WO-9807277 A1 | 2/1998 |
| WO | WO-9810589 A1 | 3/1998 |
| WO | WO-9810598 A1 | 3/1998 |
| WO | WO-9812872 A1 | 3/1998 |
| WO | WO-9814009 A1 | 4/1998 |
| WO | WO-9816056 A2 | 4/1998 |
| WO | WO-9816062 A1 | 4/1998 |
| WO | WO-9817033 A1 | 4/1998 |
| WO | WO-9817063 A1 | 4/1998 |
| WO | WO-9817064 A1 | 4/1998 |
| WO | WO-9818260 A1 | 4/1998 |
| WO | WO-9819459 A1 | 5/1998 |
| WO | WO-9820675 A1 | 5/1998 |
| WO | WO-9821664 A1 | 5/1998 |
| WO | WO-9821877 A2 | 5/1998 |
| WO | WO-9826528 A2 | 6/1998 |
| WO | WO-9826569 A2 | 6/1998 |
| WO | WO-9826584 A1 | 6/1998 |
| WO | WO-9826594 A1 | 6/1998 |
| WO | WO-9826596 A1 | 6/1998 |
| WO | WO-9827723 A1 | 6/1998 |
| WO | WO-9828906 A2 | 7/1998 |
| WO | WO-9831115 A2 | 7/1998 |

(56) References Cited

FOREIGN PATENT DOCUMENTS

| | | |
|---|---|---|
| WO | WO-9831116 A2 | 7/1998 |
| WO | WO-9831148 A1 | 7/1998 |
| WO | WO-9834405 A1 | 8/1998 |
| WO | WO-9837694 A1 | 8/1998 |
| WO | WO-9838831 A1 | 9/1998 |
| WO | WO-9839893 A2 | 9/1998 |
| WO | WO-9841020 A1 | 9/1998 |
| WO | WO-98/47084 A1 | 10/1998 |
| WO | WO-9843183 A1 | 10/1998 |
| WO | WO-9843416 A1 | 10/1998 |
| WO | WO-9847279 A2 | 10/1998 |
| WO | WO-9847283 A1 | 10/1998 |
| WO | WO-9847287 A1 | 10/1998 |
| WO | WO-9847289 A1 | 10/1998 |
| WO | WO-9847290 A1 | 10/1998 |
| WO | WO-9848566 A2 | 10/1998 |
| WO | WO-9851076 A1 | 11/1998 |
| WO | WO-9853611 A1 | 11/1998 |
| WO | WO-9856172 A1 | 12/1998 |
| WO | WO-9856173 A1 | 12/1998 |
| WO | WO-9856176 A1 | 12/1998 |
| WO | WO-9859478 A1 | 12/1998 |
| WO | WO-9901984 A1 | 1/1999 |
| WO | WO-9903267 A1 | 1/1999 |
| WO | WO-9904561 A1 | 1/1999 |
| WO | WO-9904570 A1 | 1/1999 |
| WO | WO-9907142 A1 | 2/1999 |
| WO | WO-9911060 A1 | 3/1999 |
| WO | WO-9912320 A1 | 3/1999 |
| WO | WO-9912346 A2 | 3/1999 |
| WO | WO-9914945 | 3/1999 |
| WO | WO-9914947 | 3/1999 |
| WO | WO-9918722 | 4/1999 |
| WO | WO-9927681 A2 | 6/1999 |
| WO | WO-9928897 A1 | 6/1999 |
| WO | WO-9929109 A1 | 6/1999 |
| WO | WO-9930491 A1 | 6/1999 |
| WO | WO-9931480 A1 | 6/1999 |
| WO | WO-9933265 A1 | 7/1999 |
| WO | WO-9935584 A2 | 7/1999 |
| WO | WO-9935753 | 7/1999 |
| WO | WO-9935827 A1 | 7/1999 |
| WO | WO-9935845 A1 | 7/1999 |
| WO | WO-9937045 A1 | 7/1999 |
| WO | WO-9938092 A1 | 7/1999 |
| WO | WO-9939466 A1 | 8/1999 |
| WO | WO-99/45700 A1 | 9/1999 |
| WO | WO-9945701 A1 | 9/1999 |
| WO | WO-9945702 A1 | 9/1999 |
| WO | WO-99/52279 A1 | 10/1999 |
| WO | WO-9952285 A1 | 10/1999 |
| WO | WO-9956466 A1 | 11/1999 |
| WO | WO-9956473 A1 | 11/1999 |
| WO | WO-9957837 A2 | 11/1999 |
| WO | WO-9957839 A2 | 11/1999 |
| WO | WO-9960493 A1 | 11/1999 |
| WO | WO-9960783 A1 | 11/1999 |
| WO | WO-9960789 A1 | 11/1999 |
| WO | WO-9960790 A1 | 11/1999 |
| WO | WO-9964969 | 12/1999 |
| WO | WO-9965237 A1 | 12/1999 |
| WO | WO-9965244 A1 | 12/1999 |
| WO | WO-9966725 A1 | 12/1999 |
| WO | WO-00/04708 A1 | 1/2000 |
| WO | WO-0001149 A1 | 1/2000 |
| WO | WO-0002385 A1 | 1/2000 |
| WO | WO-0004706 A2 | 1/2000 |
| WO | WO-0004707 A1 | 1/2000 |
| WO | WO-0004709 A1 | 1/2000 |
| WO | WO-00/05889 A1 | 2/2000 |
| WO | WO-00/07368 | 2/2000 |
| WO | WO-00/08850 | 2/2000 |
| WO | WO-00/08851 | 2/2000 |
| WO | WO-00/08852 | 2/2000 |
| WO | WO-0005885 A1 | 2/2000 |
| WO | WO-00/11865 A1 | 3/2000 |
| WO | WO-00/13415 A2 | 3/2000 |
| WO | WO-0011869 A1 | 3/2000 |
| WO | WO-0013416 A1 | 3/2000 |
| WO | WO-0016336 A1 | 3/2000 |
| WO | WO-0016548 A1 | 3/2000 |
| WO | WO-0017738 | 3/2000 |
| WO | WO-00/27122 A1 | 5/2000 |
| WO | WO-00/28734 A1 | 5/2000 |
| WO | WO-00/28739 | 5/2000 |
| WO | WO-0028379 A1 | 5/2000 |
| WO | WO-0030345 A1 | 5/2000 |
| WO | WO-00/33160 A2 | 6/2000 |
| WO | WO-00/33224 A1 | 6/2000 |
| WO | WO-00/33573 A1 | 6/2000 |
| WO | WO-0033208 A2 | 6/2000 |
| WO | WO-0033560 A2 | 6/2000 |
| WO | WO-0033565 A2 | 6/2000 |
| WO | WO-0033578 A1 | 6/2000 |
| WO | WO-0034891 A2 | 6/2000 |
| WO | WO-0035193 A1 | 6/2000 |
| WO | WO-0040012 A1 | 7/2000 |
| WO | WO-0040014 A1 | 7/2000 |
| WO | WO-0040026 A1 | 7/2000 |
| WO | WO-0044146 A1 | 7/2000 |
| WO | WO-00/49801 A1 | 8/2000 |
| WO | WO-0051310 A1 | 8/2000 |
| WO | WO-00/58833 A1 | 10/2000 |
| WO | WO-00/59214 | 10/2000 |
| WO | WO-00/59223 A1 | 10/2000 |
| WO | WO-00/59233 | 10/2000 |
| WO | WO-00/62298 | 10/2000 |
| WO | WO-00/62299 | 10/2000 |
| WO | WO-00/62533 | 10/2000 |
| WO | WO-0058214 A1 | 10/2000 |
| WO | WO-0058967 A1 | 10/2000 |
| WO | WO-0059230 | 10/2000 |
| WO | WO-00/67475 | 11/2000 |
| WO | WO-00/74383 | 12/2000 |
| WO | WO-0079798 A1 | 12/2000 |
| WO | WO-01/06784 A2 | 1/2001 |
| WO | WO-0101677 A1 | 1/2001 |
| WO | WO-0101689 A1 | 1/2001 |
| WO | WO-0103088 A1 | 1/2001 |
| WO | WO-01/10126 | 2/2001 |
| WO | WO-0110128 A1 | 2/2001 |
| WO | WO-0111865 A1 | 2/2001 |
| WO | WO-01/15438 A1 | 3/2001 |
| WO | WO-01/22729 | 3/2001 |
| WO | WO-0135662 A1 | 5/2001 |
| WO | WO-0137549 A2 | 5/2001 |
| WO | WO-01/46843 | 6/2001 |
| WO | WO-01/47238 | 6/2001 |
| WO | WO-01/47249 | 6/2001 |
| WO | WO-01/47257 | 6/2001 |
| WO | WO-01/47273 | 6/2001 |
| WO | WO-01/47279 | 6/2001 |
| WO | WO-0147248 A2 | 6/2001 |
| WO | WO-0150743 A1 | 7/2001 |
| WO | WO-0167772 | 9/2001 |
| WO | WO-0169929 A1 | 9/2001 |
| WO | WO-01/76239 | 10/2001 |
| WO | WO-01/76248 | 10/2001 |
| WO | WO-0176704 A2 | 10/2001 |
| WO | WO-01/89213 A1 | 11/2001 |
| WO | WO-0182600 A2 | 11/2001 |
| WO | WO-0193588 A2 | 12/2001 |
| WO | WO-0198920 A1 | 12/2001 |
| WO | WO-02/31731 A2 | 4/2002 |
| WO | WO-0267579 A1 | 8/2002 |
| WO | WO-0269636 A1 | 9/2002 |
| WO | WO-02/78317 | 10/2002 |
| WO | WO-02/84992 A2 | 10/2002 |
| WO | WO-03005712 A1 | 1/2003 |
| WO | WO-03032634 A2 | 4/2003 |
| WO | WO-03041410 A1 | 5/2003 |
| WO | WO-03043321 A1 | 5/2003 |
| WO | WO-03043326 A1 | 5/2003 |
| WO | WO-03046727 A1 | 6/2003 |

(56) References Cited

FOREIGN PATENT DOCUMENTS

| | | |
|---|---|---|
| WO | WO-03047235 A2 | 6/2003 |
| WO | WO-03060157 A2 | 7/2003 |
| WO | WO-03098932 A1 | 11/2003 |
| WO | WO-2004002156 A1 | 12/2003 |
| WO | WO-2004019602 A2 | 3/2004 |
| WO | WO-2004032511 A1 | 4/2004 |
| WO | WO-2004040906 A2 | 5/2004 |
| WO | WO-2004/054264 A1 | 6/2004 |
| WO | WO-2004/061699 | 7/2004 |
| WO | WO-2004091217 A1 | 10/2004 |
| WO | WO-2004100526 A2 | 11/2004 |
| WO | WO-2005002214 A1 | 1/2005 |
| WO | WO-2005003921 A2 | 1/2005 |
| WO | WO-2005/027512 A1 | 3/2005 |
| WO | WO-2005022764 A1 | 3/2005 |
| WO | WO-2005/046174 A1 | 5/2005 |
| WO | WO-2005084031 | 9/2005 |
| WO | WO-2005091626 A1 | 9/2005 |
| WO | WO-2005101188 A2 | 10/2005 |
| WO | WO-2006/060157 A2 | 6/2006 |
| WO | WO-2006113404 | 10/2006 |
| WO | WO-2007078503 A2 | 7/2007 |
| WO | WO-2007078739 A2 | 7/2007 |
| WO | WO-2007096815 A1 | 8/2007 |
| WO | WO-2007106464 A2 | 9/2007 |
| WO | WO-2008045305 A2 | 4/2008 |
| WO | WO-2009009106 A1 | 1/2009 |
| WO | WO-2009014593 A2 | 1/2009 |

OTHER PUBLICATIONS

Abbott et al.; "Video Formats and Resolutions", Nuclear Plan Journal, 1994, pp. 1-11.
Apers et al., "Content-based retrieval in Multimedia databases based on feature models"—Advanced Multimedia Content, Springer Berlin/Heidelberg vol. 1554, Jan. 1999 (pp. 119-130).
Bryhni et al. "On-demand Regional Television over the Internet." ACM Multimedia '96 Boston MA USA 1996 ACM (pp. 99-107).
Chiueh—"Content-based Image Indexing"—Proc. Of the 20th International Conference on Very Large Database 1994 (pp. 582-593).
Harmandas V. et al., "Image retrieval by hypertext links"—Proceedings of the 20th Annual International ACM-SIGIR Conference on Research and Development in Information Retrieval Jul. 27, 1997 (pp. 296-303).
Harrison, "A review of multimedia technology and dissemination systems," Electronic Publishing, 7:3:117-146 (1994).
Hjelsvold et al., "Modelling and Querying Video Data." Proc. Of the 20th VLDB Conference, Santiago, Chile, 1994 (pp. 686-694).
International Business Machines Corporation, Research Disclosure, "Use of close captioning for indexing and retrieval of video"—Mason Publications, Hampshire, Great Britain, vol. 413, No. 125, Sep. 1998.
Orphanoudakis et al., "12Cnet: Content-based similarity search in geographically distributed repositories of medical images," Image and Graphics, Citeseer, 1996 (pp. 1-23).
Smith et al., "An image and video search engine for the world-wide web"—Proceedings of SPIE, vol. 3022, Feb. 13, 1997.
Smith et al., "Searching for images and videos on the world-wide web," CU/CTR Technical Report #459-96-25 Columbia University, 1996. Accessed at http://www.ee.columbia.edu/dvmm/publications/96/smith96e.pdf on Feb. 17, 2011.
Smith et al., "Visually Searching the Web for Content", Columbia University; IEEE; Jul.-Sep. 1997 (pp. 12-20).
von Mayrhauser, "Identification of dynamic comprehension processes during large scale maintenance", IEEE Transactions on Software Engineering, 22(6):424-437 (1996).
Yang et al., "Automatic Indexing of News Video for the Content-based Retrieval," SPIE vol. 3422, pp. 176-186. From SPIE Conference on Input/Output and Imaging Technologies, Taipei, Taiwan, Jul. 1998.

Yura et al.; "Dsign and Implementation of the browser for the Multimedia Multi-User Dungeon of the Digigal Museum", Computer Human Interaction, 1998 Proceedings, 3rd Asia Pacific, Jul. 15-17, 1998, pp. 1-6 or 44-49.
Maltins, "Movie and Video Guide—for Palm Powered Handhelds", New York, Net Book, 1992, Landware.com, pp. 1-14.
"Windows 98 Feature Combines TV, Terminal and the Internet", New York Times, Aug. 18, 1998.
"Addressable Converters: A New Development at CableData," Via Cable, vol. 1, No. 12 (Dec. 1981).
"Digital Video Broadcasting (DVB); DVB specification for data broadcasting", European Telecommunications Standards Institute, Draft EN 301 192 V1.2.1 (Jan. 1999).
"Electronic Programme Guide (EPG); Protocol for a TV Guide using electronic data transmission" by European Telecommunication Standards Institute, May 1997, Valbonne, France, publication No. ETS 300 707.
"Rewind, reply and unwind with new high-tech TV devices," by Lawrence J. Magid, LA Times (This document was printed from the internet on Jun. 6, 1999 and bears a date of May 19, 1999).
"Don Imus: The Thinking Man's Shock Jock", Broadcasting Cable, Jun. 13, 1994, pp. 49-52.
"TV Listing Star on the Computer", Central Penn Business Journal/HighBeam Research, pp. 1-4, Mar. 15, 1996.
Abarca, C. et al., Telecommunications Information Networking Architecture Consortium "TINA-C Deliverable" Service Architecture, Version 5.0, Jun. 16, 1997 (168 pgs.).
Arango et al., "The Touring Machine System," Communications of the ACM, Jan. 1993, vol. 36, No. 1, pp. 68-77.
Bestler, C. et al., "Flexible Data Structures and Interface Rituals for Rapid Development of OSD Applications", published NCTA Technical Papers, pp. 223-236, 1993.
Brugliera, V. "Digital On-Screen Display—A New Technology for the Consumer Interface," Symposium Record Cable Sessions, 18th International Television Symposium and Technical Exhibition, Montreux, Switzerland Jun. 10-15, 1993, pp. 571-586 (Jun. 11, 1993).
CableData brochure, "A New Approach to Addressability" (undated).
Chang, Y., et al., "An Open-Systems Approach to Video on Demand," IEEE Communications Magazine, vol. 32, No. 5 pp. 68-80 (May 1994).
Chawathe, Y., et al., "A Proxy Architecture for Reliable Multicast in Heterogeneous Environments", ACM Multimedia '98, Bristol, UK, pp. 151-159, 1998.
DAVIC 1.3.1 Specification Part 1, Published in 1998 by Digital Audio-Visual Counsel (86 pages).
Davis, B., "Violence on Television", TV Guide on Screen to the US House of Representatives Committee of Energy and Commerce Subcommittee on Telecommunications and Finance, pp. 93-163, Jun. 25, 1993.
December, J., "Understanding the Potential of Java and the Web", Presenting Java, published Sep. 20, 1995.
Dias, D. "A Scalable and Highly Available Web Server", IEEE, Proceedings of COMPCON '96, p. 85-92, 1996.
Dimitrova, et al. "Personalizing Video Recorders ing Multimedia Processing and Integration." ACM 2001.
Federighi, C. et al. "A Distributed Hierarchical Storage Manager for a Video-on-Demand System", Storage and Retrieval for Image and Video Databases II, IS&T/SPIE, Symp. on Elec. Imaging Sci. & Tech., San Jose, CA, pp. 1-13, Feb. 1994.
Fortino et al., A Cooperative Playback System for On-Demand Multimedia Sessions over Internet, 2000 IEEE, pp. 41-44.
Fox, A., et al., Adapting to Network and Client Variation Using Infrastructural Proxies: Lessons and Perspectives, Personal Communications IEEE, pp. 10-19 (Aug. 1998) (15 pages).
Gondow, et al., "The Architecture of Communication Migration and Media State Management for Distributed Applications on Wearable Networks," Information Processing Society of Japan (National Conference Lecture Collected Paper), Tokyo, Japan, Oct. 3, 2000, pp. 1-2.
Haas et al., Proceedings of ICIP 2002 Personalized News Through Content Augmentation and Profiling:, Rochester, NY, Sep. 2002.

(56) References Cited

OTHER PUBLICATIONS

Han et al., "Dynamic Adaptation in an Image Transcoding Proxy for Mobile Web Browsing," IEEE Personal Communications, Dec. 1998, pp. 8-17.
Hong, et al. "A Networking Architecture for Mobility Services Using Mobile Agent Approach" Proceedings of the TINA '97—Global Convergence of Telecommunications and Distributed Object Computing 0-8186-8335-x/97, 1997 IEEE, (11 pgs).
IBM Corporation "IBM Content Manager VideoCharger, New dimensions for enterprise content, DB2 Data Management Software" pp. 1-4, Mar. 2002.
IBM Corporation "IBM Content Manager VideoCharger, Version 8, New dimensions for enterprise content, DB2 Data Management Software, pp. 1-4," May 2002, Visit IBM Web site at ibm.com/software/data/videocharger.
IBM Corporation "IBM VideoCharger for AIX Version 2.0" Streaming the power of video to your desktop, pp. 1-5 Visit the IBM VideoCharger Website at: www.software.ibm.com/data/videocharger/.
Inouye et al., "System Support for Mobile Multimedia Applications", Proc. Of the 7th Intl. Workshop on Network and Operating System Support for Digital Audio and Video, 1997, pp. 143-154.
International Search Report of the International Searching Authority for Related Foreign Application PCT/US2006/049398.
Jaidev, "XSLT—A Wired and Wireless Case Study," http://csharpcomputing.com/XMLTutorial/Lesson15.htm.
Knutsson, B. et al., "Transparent Proxy Signalling", Journal of Communications and Networks, vol. 3, No. 2, p. 164-174, Jun. 2001.
Li, et al., "Distributed Multimedia Systems," Proceedings of the IEEE, vol. 85, No. 7, pp. 1063-1108 (Jul. 1997).
Miller, M. D. "A Scenario for the Deployment of Interactive Multimedia Cable Television Systems in the United States in the 1990's," Proceedings of the IEEE, vol. 82, No. 4, pp. 585 589 (Apr. 1994).
Office Action dated Feb. 25, 2010 for EU Patent Application 06848226.4.
Office Action dated Mar. 29, 2010 for U.S. Appl. No. 10/288,505.
Office Action dated Sep. 21, 2009 for U.S. Appl. No. 10/288,505.
Pham et al, "Exploiting Location-Based Composite Devices to Support and Facilitate Situated Ubiquitous Computing," Handheld and Ubiquitous Computing, Lecture Notes in Computer Science, 1927:143-156 (2000).
Randerson, J., "Let Software Catch the Game for You," New Scientist, Jul. 3, 2004.
Realplayer 8 Plus USer Manual, Rev. 1, Real Networks, Inc. p. 32 (2000).
Rowe, L., et al., A Continuous Media Player, Proc. 3rd Int. Workshop on Network and OS Support for Digital Audio and Video (Nov. 1992).
Rudnick, U.S. Appl. No. 09/283,681, filed Apr. 1, 1999, entitled Interactive Television Program Guide System Having Graphic Arrangements of Program Event Regions.
Sandsta et al., "Design and Implementation of the Elvira Video Server," Norwegian Computer Science Conference Nik'96 (Norsk Informatikkonferanse), 1996, pp. 259-270.
Schroeder, T. et al. "Scalable Web Server Clustering Technologies", University of Nebraska—Lincoln CSE Journal Articles, Department of Computer Science and Engineering, pp. 38-45, Jun. 1, 2000.
Smith et al., "Transcoding Internet Content for Heterogeneous Client Devices", Proc. IEEE Int. Conf. on Circuits and Syst. (ISCAS), May 1998, pp. 599-602.
Smith, John R., "Digital Video Libraries and the Internet", IEEE Communications Magazine, 1999, vol. 37, pp. 92-97.
Snoeren et al., "An End-to-End Approach to Host Mobility" 6th ACM-IEEE International Conference on Mobile Computing and Networking (MOBICOM 2000), Boston, MA, USA, Aug. 2000, pp. 1-12.
Thesis of Bo Zou "Mobile IDS Protocol: A badge-activated application level handoff of a multimedia streaming to support user mobility" (Aug. 2000) available at the website of the Multimedia Operating System and Networking Group of the University of Illinois.
Uniden UST-4800 Integrated Receiver/Descrambler, Operating Guide, copyright 1990, Uniden America Corporation, 24 pages.
Uniden UST-4800 Super Integrated Receiver/Descrambler, Preliminary Reference Manual, 80 pages, Nov. 12, 1991.
Verma, D., "Content Distribution Networks—An Engineering Approach", p. 24-49, 2002.
Wedlund, Elin and Henning Schulzrinne, Mobility Support using SIP, § 4, ACM.
Wedlund, E. et al. "Mobility Support using SIP", ACM/IEEE International Conference on Wireless and Mobile Multimedia, pp. 76-82, Aug. 20, 1999.
Zahariadis et al., "Interactive Multimedia Services to Residential Users," IEEE Communications Magazine, 1997, vol. 35, pp. 61-68.
Introducing VideoShare.com; Consumers and Small Businesses Can Now Create and Add Video to All Web-Based Communications. Business Wire, Mar. 8, 2000. Complete text, (Abstract). Gale Group PROMT [online]. USA. [Recovered on Mar. 23, 2015]. Recovered from: Proust LLC.
"2720R Satellite Receiver User's Guide," General Instrument, 1991, pp. 58-61.
"A Wonderworld of Services," The Sunday Times, Innovation section, p. 4, Jan. 7, 1996, 1 page.
"Articles from PR Newswire", Published Jun. 5, 1997, 19 pages.
"Columbia House CD-ROM Direct: Detail Page," accessed from the internet at http://web.archive.org/web/19961221160255/http://www.columbiahouse.com/cd/cgis . . . , copyright 1996, printed on Sep. 19, 2013, 1 page.
"Columbia House CD-ROM Direct: Download Demos!," accessed from the internet at http://web.archive.org/web/19961221095819/http://www.columbiahouse.com/cd/cgis . . . , copyright 1996, printed on Sep. 19, 2013, 3 pages.
"Columbia House CD-ROM Direct: Member Center," accessed from the internet at http://web.archive.org/web/19961221085905/http://www.columbiahouse.com/repl/cd/ . . . , copyright 1996, printed on Sep. 19, 2013, 2 pages.
"Columbia House CD-ROM Direct: Member Center," copyright 1996, 1 page.
"Columbia House CD-ROM Direct: The Connection," accessed from the internet at http://web.archive.org/web/19961221100721/http://www.columbiahouse.com/repl/cd/ . . . , copyright 1996, printed on Sep. 20, 2013, 1 page.
"Columbia House CD-ROM Direct: The Connection," accessed from the internet at http://web.archive.org/web/19961223152924/http://www.columbiahouse.com/repl/cd/ . . . , copyright 1996, printed on Sep. 20, 2013, 1 page.
"Columbia House Laser Disc Club: FAQ Answers," accessed from the internet at http://web.archive.org/web/19961223165516/http://www.columbiahouse.com/repl/lc/t . . . , copyright 1996, printed on Sep. 20, 2013, 5 pages.
"Columbia House Laser Disc Club: Join the Club," accessed from the internet at http://web.archive.org/web/19961221094037/http://www.columbiahouse.com/repl/lc/t . . . , copyright 1996, printed on Sep. 20, 2013, 2 pages.
"Columbia House Music Club: Join The Club," accessed from the internet at http://web.archive.org/web/19961221091101/http://www.columbiahouse.com/repl/mc . . . , copyright 1996, printed on Sep. 20, 2013, 2 pages.
"Columbia House Music Club: Search," accessed from the internet at http://web.archive.org/web/19961221114653/http://www.columbiahouse.com/repl/mc . . . , copyright 1996, printed on Sep. 19, 2013, 1 page.
"Columbia House Music Club: Shopping Cart," accessed from the internet at http://web.archive.org/web/19961221120941/http://www.columbiahouse.com/mc/cgis . . . , copyright 1996, printed on Sep. 19, 2013, 1 page.
"Columbia House Video Club: Essential Collection," accessed from the internet at http://web.archive.org/web/19961221113908/http://www.columbiahouse.com/vc/cgis/j . . . , copyright 1996, printed on Sep. 20, 2013, 1 page.
"Comdex—Mitsubishi Previews 40-Inch DiamondWeb TV," Newsbytes, Nov. 19, 1996, Abstract, 2 pages.

(56) References Cited

OTHER PUBLICATIONS

"Computer Network: Current Status and Outlook on Leading Science and Technology," Bureau of Science & Technology (Japan), vol. 1, Dec. 1986, 326 pages (Concise Explanation included in IDS letter.).
"Cool Websites: [2 Star Edition]," Houston Chronicle, Houston, Texas, Jul. 11, 1996, p. 3, Abstract.
"Creation-Modification of the Audio Signal Processor Setup for a PC Audio Editor," IBM Technical Disclosure Bulletin, vol. 30, No. 10, Mar. 1988, pp. 367-376.
"D2B-Home Bus Fur Audio and Video," Selektor, Apr. 1990, pp. 10, 12. (English langauge translation attached) 8 total pages.
"DAVIC 1.0 Specifications", Part 1, "Description of DAVIC Functionalities," Revision 3.2, Digital Audio-Visual Council, Jul. 10, 1995, 61 pages.
"Description of Digital Audio-Visual Functionalities (Technical Report)," Digital Audio-Visual Council (DAVIC), 1.3.1 Part 1,:1998, 86 pages.
"Does NBC Get It," Aug. 14, 1995, retrieved from the internet at http://www.open4success.org/db/bin19/019687.html, retrieved on Dec. 11, 2013, 1 page.
"Don Imus: The Thinking Man's Shock Jock", Broadcasting Cable, Jun. 13, 1994, 6 pages.
"'Duck Tales,'(1987)[TV Series 1987-1990]," Internet Movie Database (IMDB) [Retrieved on Apr. 7, 2007], 5 pages.
"Electronic Program Guide via Internet," Research Disclosure, Kenneth Mason Publications, Hampshire, GB, vol. 385, No. 2, May 1, 1996, ISSN: 0374-4353, 1 page.
"Enhanced Content Specification," "ATVEF," from the internet at http:--www.atvef.com-library-spec.html, printed Aug. 22, 2001, the document bears a Copyright date of 1998, 1999, 2000, 41 pages.
"European Telecommunications Standards: Digital Broadcasting Systems for Television Sound and Data Services; Specification for Service Information (SI) in Digital Video Broadcasting (DVB) Systems," European Telecommunications Standards Institute, Dec. 1994, ETS 300 468, 64 pages.
"Facsimile Transmission," NHK Research Monthly Report, Dec. 1987 (Unknown author), 78 pages. (Concise Explanation included in IDS letter.).
"GameSpot: Allied General—Download It Now!!!!," accessed from the internet at http://web.archive.org/web/19970206133452/http://www.gamespot.com/strategy/allie . . . , copyright 1997, printed on Sep. 19, 2013, 1 page.
"GameSpot: Allied General at a Glance," accessed from the internet at http://web.archive.org/web/19970205153530/http://www.gamespot.com/strategy/allie . . . , copyright 1996, printed on Sep. 19, 2013, 1 page.
"GameSpot's Downloads for Allied General," accessed from the internet at http://web.archive.org/web/19970205060703/http://www.gamespot.com/strategy/allie . . . , copyright 1997, printed on Sep. 19, 2013, 1 page.
"Gateway Destination: The PC for the Office and the Family Room," PC Magazine, First Looks section, pp. 39-41, Jun. 11, 1996.
"General Instrument Features the Latest Interactive, Revenue-Generating Applications on its Advanced Analog CFT-2200 Platform at the National Cable Television Association's Show," PR Newswire—NY May 4, 1998, 2 pages.
"Getting Started" Installation Guide, "Using StarSight 1" Manual, and Remote Control "Quick Reference Guide." Undated, 93 pages.
"Hobbes' Internet Timeline 10.2," by Robert H'obbes' Zakon, from the internet at http://www.zakon.org/robert/internet/timeline/, printed from the internet on Sep. 13, 2012, 29 pages.
"Information Technology—Generic Coding of Moving Pictures and Associated Audio Information—Part 6: Extensions for DSM-CC," International Standard First Addition, Sep. 1, 1998 (626 pages).
"Interactive Computer Conference Server," IBM Technical Bulletin, vol. 34, No. 7A, Dec. 1991, pp. 375-377.
"Interactivity for the Passive," published in Dec. 6, 1993 issue of Forbes, 5 pages.
"Interface Device for Conventional TVs to Improve Functionality", IBM Technical Disclosure Bulletin, vol. 36, No. 7, Jul. 1993, 2 pages.
"Internet User Forecast by Country," Computer Industry Almanac—Press Release, from the internet at http://www.c-i-a.com/internetusersexec.html, printed from the internet on Sep. 13, 2012, 3 pages.
"IS-60.3 Physical Layer and Medium Specifications. Part 3-CS Physical Layer & Medium Specification," CX Specification, Revised Mar. 19, 1992, Table of Contents and pp. 1-41 (45 pages).
"iTunes v4-1.pdf", Oct. 2003, version 4.1, 6 pages.
"List-Mania," published in May 1992 issue of Video Review, 5 pages.
"MSI Datacasting Systems," Tv Communications Journal, 2 pages, Jan. 1973.
"Open TV Launches OpenStreamer™ Technology for Broadcasters to Deliver First Ever Real-Time Digital Interactive Television," from the internet at http:--www.opentv.com-news-openstreamer_press_final.htm, printed on Jun. 28, 1999, the document bears a copyright date of 1999, 2 pages.
"Prevue Channel Sep. 1, 1995 (part 1)," PrevueGuide, from the internet at http://www.youtube.com/watch?v=0Vu178nH6RY, retrieved on Nov. 26, 2013, 1 page.
"Prevue Networks and OpenTV(R) Agree to Work Together on Deploying Interactive Program Guides Worldwide," from the internet at http:--www.opentv.com-news-prevuefinal.htm, printed on Jun. 28, 1999, 2 pages.
"Prevue Online Debuts Local Listings for 250 Systems; System-Specific Listings Include Multimedia Features—Free Build Acceleration," PR Newswire, Jun. 5, 1997, 2 pages.
"Prevue Online", Dec. 28, 1996, extract from web.archive.org, printed on Nov. 18, 2014, http://www.prevue.com, 1 page.
"Probe XL Brochure, Auto Tote Systems Inc.," (Newark, Delaware) (1993) 57 pgs.
"Step Up to the Superhighway," The Sunday Times, Innovation section, p. 6, Jan. 7, 1996.
"Student.Net TV Search & Remind," from the internet at http://web.archive.org/web/19970124213237/http://www.student.net/tv/ and http://web.archive.org/web/19970124214926/www.student.net/tv/serch.cgi?searchTerm=Fri . . . , printed on May 12, 2005, 5 pages.
"Switched Digital Video & Cable's Looming Bandwidth Crisis: Executive Summary," Heavy Reading, vol. 5, No. 16, Dec. 2007, 4 pages. [http://www.heavyreading.com/details.asp?sku_id=2014&skuitem_itemid=1063&promo_*j*  *code=&aff*_code=&next_url=%2Fdefault.asp%3F].
"Technological Examination & Basic Investigative Research Report on Image Databases," Japan Mechanical Engineering Organization Int'l Society for the Advancement of Image Software, Japan, Mar. 1988, 127 pages (Concise Explanation included in IDS letter.).
"Technology: Turn on, tune in and print out—An experimental interactive television service is set to alter our viewing habits," Financial Times (London), Oct. 14, 1993, p. 11.
"The Columbia House Video Club: Download Software," accessed from the internet at http://web.archive.org/web/19961223163101/http://www.columbiahouse.com/repl/vc . . . , copyright 1996, printed on Sep. 19, 2013, 1 page.
"The History Behind Broadcatch—SmarTV (1989)," Broadcatch Technologies, from the internet at http://www.broadcatch.com/smartv.html, Jul. 1989, pp. 1-6, printed from the internet on Aug. 31, 2005.
"The New Media and Broadcast Policy: An Investigation & Research Conference Report on Broadcasting Diversification," Radio Regulatory Bureau, Japan Ministry of Posts & Telecommunications, Mar. 1982, 114 pages (Concise Explanation included in IDS letter.).
"Today's Stop: What's On Tonite," Oct. 3, 1995, retrieved from the internet at http://internettourbus.com/arch/1995/TB100395.TXT, retrieved on Dec. 9, 2013, 3 pages.
"TV Listings Functional Spec.," Time Video Information Services, Inc., undated, 11 pages.
"Welcome to Columbia House Online," accessed from the internet at http://web.archive.org/web/19961221085121/http://www.columbiahouse.com/, copyright 1996, printed on Sep. 19, 2013, 1 page.

(56) References Cited

OTHER PUBLICATIONS

"What's New @ Prevue Online—Real™ Video," May 2, 1997, extract from web.archive.org, printed on Nov. 18, 2014, http://www.prevue.com/scripts/whatsnew.asp, 5 pages.
"What's On Tonite!," Jan. 28, 1995, retrieved from the internet at http://www.library.georgetown.edu/newjour/publication/whats-tonite-tm, retrieved on Dec. 11, 2013, 9 pages.
"Yearling's Free Personalised TV Guide," from the internet at http://www.yearling.com/, Dec. 30, 1996, 15 pages.
A Financial Times Survey: Viewdata (Advertisement), Financial Times, May 9, 1979.
ACM Multimedia 93 Proceedings, A Digital On-Demand Video Service Suporting Content-Based Queries, Little et al. pp. 427-436, Jul. 1993.
Advanced Analog Systems—Addressable Terminals General Instrument Corp. of Horsham, Pennsylvania (URL:http//www.gi.com/BUSAREA/ANALOG/TERMINAL/WATCH/watch.html) Printed from the Internet on Mar. 4, 1999, 1 page.
Advertisement for "TV Decisions," Cable Vision, Aug. 4, 1986, 3 pages.
Aho, Debra, "New Delphi Ads Push Envelope: Starting Visuals From Upstart Agency Go Too Far for One Paper's Tastes," Advertising Age 0.0, May 30, 1994, p. 16, Abstract (2 pages).
Alexander, Michael "Visualizing cleared-off desktops," *Computerworld*, May 6, 1991, p. 20.
Andrews, "A Chip That Allows Parents to Censor TV Sex and Violence," The New York Times, Sunday, Jul. 18, 1993, 2 pages.
Antonoff, M., "Stay Tuned for Smart TV," *Popular Science*, Nov. 1990, pp. 62-65.
Intel Intercast's Website from Archieve. Org, "How Does It Work?", <http://web.archive.org/web/19990429214537/www.intercast.com/intercast/howitwks.htm>, Acessed on Jul. 8, 2008, 2 pages.
Intel Intercast's Website from Archieve. Org, "What Is It?", <http://web.archive.org/web/19990422195517/www.intercast.com/intercast/whatisit.htm>, Acessed on Jul. 8, 2008, 1 page.
Armstrong, "Channel-Surfing's next wave: Henry Yuen's interactive TV guide takes on TCI and Viacom," BusinessWeek, Jul. 31, 1995, 3 pages.
Arnold, "Britain to get wired city—via telephone," Electronics, Mar. 4, 1976, at 76.
Automating in a digital world, servers lead the way into the new realm of DTV, Broadcasting and Cable, published Nov. 24, 1997, 5 pages.
Bach U et al, "Multimediales-TV-Gereat," Radio Fernsehen Electronik, De, Veb, Verlag, Technik, Berlin, vol. 45, No. 9, Aug. 1, 1996, pp. 28, 30-31, XP 000636538, ISSN: 1436-1574 (Translation, pp. 1-5).
Bach U et alk "Multimedia-Terminal ALS Endgeraet," Funkschau, De, Franzis-Verlag K.G. Munchen, vol. 68, No. 6, Mar. 1, 1996, pp. 70-75, XP 000556486, ISSN: 0016-2841 (English Translation, pp. 1-7).
Bach, U. et al., "Multimedia TV Set, Part 1" Radio-Fernsehen Elektronik (RFE), 9-96, pp. 28, 30, 31. (English language translation attached).
Bach, U. et al., "Multimedia TV Set, Part 2 and Conclusion," Radio-Fernsehen Elektronik (RFE), 10-96, pp. 38-40. (English language translation attached.).
Bacon, "Concurrent Systems," 2nd Ed, Addison Wesley Longman Ltd., 59 pages, 1998.
Baer, R.H, "Innovative Add-On TV Products," IEEE Transactions on Consumer Electronics, vol. CE-25, Nov. 1979, pp. 765-771.
Bell Atlantic Buys Cable TV Company for $22bn, Financial Times (London), Oct. 14, 1993 p. 65.
Benson, U., "VPV Videotext Programs Videorecorder," *IEEE Paper*, Jun. 1988, pp. 788-792.
Berniker, "TV Guide going online", Broadcasting & Cable, pp. 49-52 (Jun. 13, 1994).
Berniker, M., "DEC Develops Server/Set-Top Alliance: Company Wants to Insure Compatibility for Next Generation of TV Sets," Dec. 5, 1994, 1 page.
Blahut et al., "Interactive Television," Proceedings of the IEEE, Jul. 1995, 17 pages.
Bolle, et al., "Video Query: Research Directions," IMB Journal of Research and Development 42, 2: ProQuest p. 233, Mar 1998.
Bowen et al., The Datacycle Architecture, Communications of the ACM, vol. 35, No. 12 pp. 71-81, Dec. 1992.
Boyd-Merritt, "Television wires two-way video," Electronic Engineering Times, Apr. 25, 1994, 3 pages.
Brochure, "A New Approach to Addressability," CableData, undated, 9 pages.
Brochure, "Westar and Videotoken Network Present the CableComputer," Revised Aug. 15, 1985, 41 pages.
Brochure, Time Inc., "Now, Through the Advances of the Computer Age, You Can Get the Information You Want, When You Want It. Instantly and Conveniently, on Your Home TV Screen," Time Teletext, Time Video Information Services, Inc., undated, (pp. V 79167-V 79175).
Brochure, VTN "Videotoken Network, New Dimension Television," Dec. 1985, 10 pages.
Brown, "The Next Step: Searchable Television," Broadcasting & Cable, 128, 22: ProQuest, p. 30, May 25, 1998.
Cable Computer User's Guide, Rev. 1, Dec. 1985, 4 pages.
Cable Data, "What's a software company doing manufacturing addressable converters?" (2011), 10 pages.
Cable Television Equipment, Jerrold Communications Publication, dated 1992 and 1993, pp. 82.1 to 8-6 and 8-14.1 to 8-14.3.
CableData, Roseville Consumer Presentation, Mar. 1986, 12 pages.
Came, E.B., "The Wired Household," *IEEE Spectrum*, vol. 16 No. 10, Oct. 1979, pp. 61-66.
Case 4: 11-cv-06591-PJH, Complaint for Declaratory Relief (plaintiff), dated Dec. 21, 2011, 16 pages.
Chan, Patrick P., "Learning Considerations in User Interface Design: The Room Model," Publication of the Software Portability Laboratory, University of Waterloo, Ontario, Canada, Jul. 1984, 52 pages.
Chen et al., "Real Time video and Audio in the World Wide Web," Proc. 4th World Wide Web Conference, 1995, 15 pages.
Christodoulakis, Steven and Graham, Stephen "Browsing Within Time-Driven Multimedia Documents," *publication of the Institute for Computer Research, University of Waterloo*, Waterloo, Ontario, Canada Jul. 1988 pp. 219-227.
Cleland, Kim, "Look Out MSN, Here Comes MCI," Advertising Age, vol. 66, No. 32, Aug. 14, 1995, 2 pages.
CNN Tech: Sonicblue revives ReplayTV, articles cnn.com, Sep. 10, 2001, retrieved from the internet http://articles.cnn.com/2001-09-10/tech/replay.tv.idg_1_replayty-sonicblue-digital-video?_s=PM:TECH, 2 pages.
Compton et al., "Internet CNN Newsroom: a digital video news magazine and library," Proc. Of the Intl. Conf. On Multimedia Computing and Systems. Washington, May 15-18 1995; [Proceedings of the International Conference on Multimedia Computing and Systems], Los Alamitos, IEEE Comp. Soc. Press, US, May 15, 1995, pp. 296-301, XP010154611.
Office Action and Replies from U.S. Appl. No. 10/927,814 (now U.S. Pat. No. 8,046,801), filed Aug. 26, 2004 (issued Oct. 25, 2011).
Office Action and Replies from U.S. Appl. No. 11/246,392, filed Oct. 7, 2005.
Office Action and Replies from U.S. Appl. No. 12/780,196, filed May 14, 2010.
Office Actions and Corresponding Replies in relation to U.S. Appl. No. 10/251,670.
Office Actions and Corresponding Replies in relation to U.S. Appl. No. 10/718,187.
Office Actions and Corresponding Replies in relation to U.S. Appl. No. 11/600,944.
Office Actions and Replies filed in U.S. Appl. No. 09/332,244.
Office Actions and Replies filed in U.S. Appl. No. 11/894,741.
Office Actions and Replies filed in U.S. Appl. No. 08/031,246.
Office Actions and Replies filed in U.S. Appl. No. 10/383,281.
Office Actions and Replies filed in U.S. Appl. No. 10/734,505.
Office Actions and Replies filed in U.S. Appl. No. 10/877,950.
Office Actions and Replies filed in U.S. Appl. No. 10/927,582.
Office Actions and Replies filed in U.S. Appl. No. 11/147,802.
Office Actions and Replies filed in U.S. Appl. No. 11/246,392.

(56) References Cited

OTHER PUBLICATIONS

Office Actions and Replies filed in U.S. Appl. No. 11/894,724.
Office Actions and Replies filed in U.S. Appl. No. 12/780,196.
Office Actions and Replies filed in U.S. Appl. No. 12/814,030.
Office Actions and Replies filed in U.S. Appl. No. 13/082,854 filed Apr. 8, 2011.
Office Actions and Replies from U.S. Appl. No. 13/275,565, filed Oct. 18, 2011.
Office Actions and Replies from U.S. Appl. 12/759,303 filed Apr. 13, 2010.
Office Actions and Replies from U.S. Appl. No. 12/773,423 filed May 4, 2010.
Office Actions and/or Replies from U.S. Appl. No. 10/877,950, filed Jun. 25, 2004.
Office Actions and/or Replies from U.S. Appl. No. 10/927,582, filed Aug. 26, 2004.
Office Actions and/or Replies from U.S. Appl. No. 11/894,741, filed Aug. 20,2007.
Office Actions and/or Replies from U.S. Appl. No. 13/233,655, filed Sep. 15, 2011.
Amendment dated Oct. 19, 2009 filed in JP 2003-341287 (English Translation Only).
Appeal Brief dated Oct. 19, 2009 filed in JP 2003-341287 (English Translation Only).
Office Action dated Apr. 8, 2010 issued in U.S. Appl. No. 11/147,802.
Preliminary Amendment dated Apr. 8, 2011 for U.S. Appl. No. 13/082,857.
Results listing from web.archive.org showing the archive date of Oct. 9, 1997 as the archived date of document, 1 page.
Costello, "VideoGuide vs. StarSight—Going Screen-to-Screen," Dealerscope Consumer Electronics Marketplace 38.1, Copyright North American Publishing Company, Jan. 1996, 4 pages.
Cox, J. et al, "Extended Services in a Digital Compression System," Proceedings from Eleven Technical Sessions: 42nd Annual Convention and Exposition of the National Cable Television Association, Jun. 1993, pp. 185-191.
Daily, Mack, "Addressable Decoder with Downloadable Operation," Proceedings from the Eleven Technical Sessions, 42nd Annual Convention and Exposition of the NCTA, Jun. 6-9, 1993, pp. 82-89.
Damouny, N.G., "Teletext Decoders-Keeping Up With the Latest Advances," IEEE Transactions on Consumer Electronics, vol. CE-30, No. 3, Aug. 1984, pp. 429-435.
Dan et al., "Evolution and Challenges in Multimedia," IBM Journal of Research and Development, 42, 2: ProQuest p. 177, Mar 1998.
Day, "The Great PC/TV Debate," OEM Magazine, Jul. 1, 1996, 6 pages.
Declaration of Rosetta Rogers Under 37 CFR 1.131 in U. S. U.S. Appl. No. 09/393,955, Mar. 9, 2001, 13 pages.
Declaration Under 37 C.F.R. § 1.132 of Richard E. Glassberg, signed Oct. 20, 2006, filed Oct. 24, 2006, from U.S. Appl. No. 10/346,266, 5 pages.
Declarations under 37 CFR 1.131, with supporting exhibits filed in U.S. Appl. No. 09/676,545, now U.S. Pat. No. 7,103,906.
Defense and Counterclaim of the First and Second Defendants, No. HC11 C 04556, between Starsight Telecast and United Video Properties (Claimants) and Virgin Media, Virgin Media Payments, and TiVo Defendants (pp. 10-11) (Mar. 14, 2012).
Derwent Abstracts, RD 385002 A, "Electronic Program Guide System via Internet Uses Television Programs Displayed on Internet Pages and Associates it With Program Label and On-Screen Icons to Remotely Program and Control TV Receiver w.r.t. Selected Program," published May 10, 1996 (2 pages).
Dialing the printed page, ITT in Europe Profile, 11/Spring 1977, 2 pages.
Dickson, G., "KPTV Gets on the Sony Digital Train," Broadcasting & Cable, 2 pages, Jan. 8, 1996.
Dinwiddie et al., "Combined-User Interface for Computers, Television, Video Recorders, and Telephone, Etc.," IP.com Prior Art Database Bulletin, Aug. 1, 1990, 3 pages.

DIRECTV Digital Satellite Receiver—Operating Instructions, Sony Electronics Inc., 60 pages (2001).
DIRECTV Plus2 System, Thompson Consumer Electronics, Inc., 2 pages (1999).
DIRECTV Receiver—Owner's Manual, DIRECTV, Inc., 119 pages (2002).
DIRECTV Receiver with TiVo Installation Guide, Philips, TiVo Inc., 68 pages (2000).
DIRECTV Receiver with TiVo Viewer's Guide, Tivo Inc., Sony Corp., 152 pages (1999, 2000).
DiRosa, S., "BIGSURF Netguide," Jul. 1995, vol. 3.1 (Sections 18, 21, and 28—renumbered as pp. 1-27).
DishPro Satellite System—User's Guide, Dish Network, 144 pages (Sep. 1, 2001).
Documents related to the preparation and filing of U.S. Appl. No. 09/676,545.
Dr. Dobb's, "Implementing a Web Shopping Cart," from the internet at https://www.drdobbs.com/article/print?articleId=184409959 &siteSect . . . , Sep. 1, 1996, printed from the internet on Sep. 13, 2012, 15 pages.
EPO Opposition Against EP1213919 by Virgin Media Limited dated Dec. 16, 2010, 16 pages.
EPO Opposition Statement of Grounds of Appeal for EP1099341 dated Feb. 28, 2011, 18 pages.
EPO Opposition Submission for European patent EP-B-1099341 dated Mar. 19, 2010, 18 pages.
European Search Opinion dated Dec. 19, 2005, EP Patent Application No. 05077272.2, 7 pages.
European Search Report (Partial) dated Apr. 3, 2012 in EP Application No. 10168916, 4 pages.
European Search Report dated Mar. 3, 2011 in EP Application No. 08103136.
European Search Report dated Nov. 19, 2002 from European Application No. 989446111.7, 3 pages.
Extended European Search Report dated Aug. 9, 2012 in EP Application No. 10168916 , 3 pages.
Extended European Search Report dated Nov. 10, 2008 in EP Application No. 08005467.9, 7 pages.
Extended European Search Report dated Nov. 11, 2008 in EP Application No. 08103136.1, 7 pages.
Extended European Search Report dated Nov. 12, 2008 in EP Application No. 08005468.7, 8 pages.
Extended European Search Report dated Nov. 7, 2008 in EP Application No. 07075470.0, 7 pages.
Fall 2001 TiVo Service Update with Dual Tuner!, TiVo Inc., 9 pages (2001).
Federal Register, vol. 58, No. 62, Apr. 2, 1993, 11 pages.
File History for EPB1940157, Jun. 14, 1996, 43 pages.
File History for EPB1940158, Jun. 14, 1996, 49 pages.
File History Opposition EP08103136, Jun. 14, 1996, 51 pages.
File History Opposition EP0900499, May 29, 1996, 225 pages.
File History Opposition EP1940159, Jun. 14, 1996, 51 pages.
File History Opposition EPB1763234, May 20, 1994, 705 pages.
File History Opposition for EP0976243B, Apr. 16, 1997, 136 pages.
Final Office Action dated Aug. 31, 2009 for U.S. Appl. No. 11/894,621.
Final Office Action in U.S. Appl. No. 09/356,161 dated Jun. 17, 2005.
Final Office Action in U.S. Appl. No. 11/179,410 dated Apr. 27, 2009.
Final Office Action in U.S. Appl. No. 11/894,618 dated Aug. 3, 2009.
FTP file listing of doc/resource-guide/front-matter at ftp.cs.toronto.edu (undated), 1 page.
Gavron, Jacquelyn, Moran, Joseph, How to Use Microsoft Windows NT 4 Workstation, 1996, entire document, pp. 1-5.
Gemstar Buys VideoGuide Stake, Consumer Electronics, Feb. 26, 1996, 2 pages.
Gemstar Development Corporation, VCR plus +, 1990, 4 pages.
General Cable Television Industry and Regulation Information Fact Sheet, pp. 1-29, Jun. 2000.
Goff, Leslie, "Subs Find Lots of Program Guides Online," Multichannel News, vol. 17, No. 19, May 6, 1996, p. 38, Abstract, 3 pages.
Goldberg, "A 35 inch Zenith TV premieres Star Sight's onscreen guide," Video, 1 page (Apr. 1995).

(56) References Cited

OTHER PUBLICATIONS

Growing US interest in the impact of viewdata, Computing Weekly, Jul. 20, 1978, 1 page.
Hallenbeck et al., "Personal Home TV Programming Guide," Digest of Technical Papers of the International Conference on Consumer Electronics, Jun. 6-8, 1990, pp. 310-311.
Hallenbeck Witness Statement Exhibits PDH1 through PDH35 dated Sep. 30, 2012, 492 pages.
Harada, Mamoru et al., "Internet de telebi housou ga hajimaru," ("Television Broadcasting Starts with the Internet"), Nikkei Electronics, Japan, Nikkei BP, No. 653, Jan. 15, 1996, pp. 67-75 (Concise Explanation included in IDS letter.).
Healey, J., "Smart TV Recorders Get Another Player", San Jose Mercury News (California), Sep. 11, 1998, 2 pages.
Hedger, J., "Telesoftware: Home Computing Via Broadcast Teletext," IEEE Transactions on Consumer Electronics, vol. CE-25, No. 3, Jul. 1979, pp. 279-287.
Hirtz Gentlemen: et al:, "Open TV: Betriebssystem Fuer Interaktives Fernsehen," Fernseh Und Kinotechnik, de vde Verlag Gmbh, Berlin, vol. 50, No. 3, 1 Mar. 1996, pp. 84-89, XP 000581417, ISSN: 0015-0142 (Translation, pp. 1-9).
Hitachi Consumer Electronics Co., Ltd., Certification of market introduction in 1993 of Hitachi Projection TV Model 55EX7K, 1993, 1 page.
Hitachi Projection Color TV Operating Guide, for Models 55EX7K, 50EX6K, 50ES1 B-K, and 46EX3B-4K, undated, 1993, 38 pages.
Hitachi Service Manual, No. 0021, Projection Color Television, Models 55EX7K, 50EX6K, 50ES1 B-K, 46EX3B-4K, and 46EX3BS-4KS, Aug. 1993, 1 page (Concise Explanation included in IDS letter.).
Hoarty, W. Leo, "Multimedia on Cable Television Systems," Symposium Record Table TV Sessions, 18th International Television Symposium and Technical Exhibition, Montreux, Switzerland, Jun. 10, 1993, pp. 555-567.
Hobbes Internet Timeline, Mar. 22, 2007, 17 pages.
Hofmann, J., "The Consumer Electronic Bus: An Integrated Multi-Media LAN for the Home," International Journal of Digital and Analog Communication Systems, vol. 4, No. 2, 1991, pp. 77-86.
Hofmann, et al., "Videotext Programmiert Videorecorder," Rundfunktechnische Mitteilungen, Nov.-Dec. 1982, pp. 254-57 (translation abstract attached) (14 pgs).
Holland, "NAPLPS standard defines graphics and text communications," EDN, Jan. 10, 1985, at 179.
Honey, is there anything good on the remote tonight? advertisement from Multichannel News, Broadband Week Section, p. 168, Nov. 30, 1998.
How Evolve Works, from the Internet at http://www.evolveproducts.com/network.html, printed on Dec. 28, 1998, 1 page.
Hua et al. "An adaptive hybrid technique for video multicast," Proceedings of the International Converence on Computer Communications and Networks, Lafayette, USA, Oct. 12, 1998, pp. 227-234, XP010587052.
IBM Technical Disclosure Bulletin, vol. 33, No. 3B, published Aug. 1990, 3 pages.
IEEE 1990 International Conference on Consumer Electronics Digest of Technical Papers, Table of Contents, Jun. 6-8, 1990, 14 pages.
Iizuka, Honbashi, Kuwana, Building Internet Tv Guide Service 1 and 2, the 53rd National Conference Proceedings, Japan, Information Processing Society of Japan, Sep. 6, 1996 p. 3-227 to 230.
Ikejiri, Minoru et al., "Maruchimedia wo riido suru apurikeishon kaihatu," ("Application Development for Leading Multimedia"), Journal of NTT Technologies, Japan, The Telecommunications Association of Japan, vol. 7, No. 9, Sep. 1, 1995, pp. 48-55. (Concise Explanation included in IDS letter.).
Imke, S., Interactive Video Management and Production, Educational Technology Publications, May 1991, http://www.amazon.com/Interactive-Video-Management-ProductionSteven/dp/0877782334/ref=sr_1_1?ie=UTF884d=1416426739&sr=8-1&keywords=interactive+video+management+and+production&pebp=1416426742553, 2 pages.
Indiana Gazette, Published Feb. 16, 1991, Showing Uniden is on the Market with Included Price, 2 pages.
Instructional Manual, "Sonic the Hedgehog," Sega of America, 1992, 11 pages.
International Preliminary Examination Report, International Application No. PCT/US97/18664, Dec. 7, 1998, 10 pages.
International Search Report and Written Opinion in International Application No. PCT/US2008/009669 dated Jan. 30, 2009, 12 pages.
International Search Report for International Application No. PCT/US2006/047423 dated Jun. 21, 2007, 3 pages.
Irven, "Multi-Media Information Services: A Laboratory Study," IEEE Communications Magazine, vol. 26, No. 6, Jun. 1988, pp. 27-33 and 36-44.
Ishii, Hiroshi et al, "Clearface: Translucent Multiuser Interface for TeamWorkStation," ECSCW, Sep. 1991, pp. 6-10.
Ishii, Hiroshi et al, "Toward an Open Shared Workspace: Computer and Video Fusion Approach of Team Workstation," Communications of the ACM, Dec. 1991, vol. 34 No. 12, pp. 37-50.
ITC Investigation of Certain Products Containing Interactive Program Guide and Parental Control Technology, Investigation No. 337-TA-845, "Complainants' Opposition to Respondents' Contingent Petition for Review of Final Initial Determination" Jul. 2, 2013 (51 pages).
ITC Investigation of Certain Products Containing Interactive Program Guide and Parental Control Technology, Investigation No. 337-TA-845, "Final Initial Determination" Jun. 7, 2013 (375 pages) Parts 1 and 2.
ITC Investigation of Certain Products Containing Interactive Program Guide and Parental Control Technology, Investigation No. 337-TA-845, "Open Session Transcript" Mar. 5, 2013 (642 pages) Parts 1 and 2.
ITC Investigation of Certain Products Containing Interactive Program Guide and Parental Control Technology, Investigation No. 337-TA-845, "Order Denying Summary Determination Motions" Mar. 4, 2013, 6 pages.
ITC Investigation of Certain Products Containing Interactive Program Guide and Parental Control Technology, Investigation No. 337-TA-845, "Respondents Netflix, Inc. and Roku, Inc.s Contingent Petition for Review" Jun. 24, 2013, 53 pages.
ITC Investigation of Certain Products Containing Interactive Program Guide and Parental Control Technology, Investigation No. 337-TA-845, "Respondents' Notice of Prior Art" Oct. 12, 2012 (39 pages).
ITC Inv. No. 337-TA-845: Complainants' Opp to MSD of Invalidity of USP '776, '762, and '709 (redacted) and Complainants' Statement of Facts filed Jan. 14, 2013, 269 pages.
ITC Inv. No. 337-TA-845: Complainant's Post-Hearing Brief (redacted) filed Mar. 22, 2013, 50 pages.
ITC Inv. No. 337-TA-845: Complainant's Post-Hearing Reply Brief (redacted) filed Mar. 29, 2013, 24 pages.
ITC Inv. No. 337-TA-845: Complainants' Pre-Hearing Statement (redacted) filed Feb. 8, 2013, 96 pages.
ITC Inv. No. 337-TA-845: Corrected Respondents' PHS (Parts 1 and 2) (redacted) filed Feb. 25, 2013, 87 pages.
ITC Inv. No. 337-TA-845: Expert Report of Peter D. Hallenbeck filed Dec. 13, 2012, 182 pages.
ITC Inv. No. 337-TA-845: Joint Submission Re Claim Constructions and Accused Products (redacted) filed Oct. 2, 2012, 151 pages.
ITC Inv. No. 337-TA-845: Motion for Leave to File Reply ISO MSD re '776, '762, and '709 filed Jan. 18, 2013, 11 pages.
ITC Inv. No. 337-TA-845: Netflix Motion for Summary Determination of Invalidity of '776 filed Jan. 3, 2013, 230 pages.
ITC Inv. No. 337-TA-845: Order No. 40 Denying Summary Determination Motion filed Apr. 5, 2013, 6 pages.
ITC Inv. No. 337-TA-845: Public Final Initial Determination on Violation filed Jul. 2, 2013, 371 pages.
ITC Inv. No. 337-TA-845: Respondents' Post-Hearing Reply Brief (redacted) filed Mar. 29, 2013, 24 pages.
ITC Inv. No. 337-TA-845: Respondents' Post-Hearing Statement (redacted) filed Mar. 22, 2013, 50 pages.

(56) References Cited

OTHER PUBLICATIONS

ITC Inv. No. 337-TA-845: *Rovi v. Netflix Complaint and Claim Charts* filed Apr. 30, 2012, 129 pages.
ITC Inv. No. 337-TA-845: Rovi's 4th Supp. Response to Netflix's First Set of Interrogatories (Nos. 1, 3, 4, 5, 6, 8, and 1 0) with Attachments A & B (redacted) filed Oct. 9, 2012, 11 pages.
ITC Inv. No. 337-TA-845: Rovi's Rebuttal Expert Report of R. Griffin (redacted) filed Jan. 9, 2013, 94 pages.
ITC Inv. No. 337-TA-845: Rovi's Responses to Vizio's Second Set of Interrogatories (Nos. 64-150) (CBI) (redacted) filed Nov. 23, 2012, 39 pages.
ITC Inv. No. 337-TA-845: Rovi's Supplemental Response to Netflix's Contention Interrogatories with attachments (redacted) filed Dec. 13, 2013, 57 pages.
ITC Inv. No. 337-TA-845: Third Supp. Responses to Vizio's First Set of Interrogatories (Nos. 1-12, 25-36, 62-63) (redacted) filed Oct. 9, 2012, 6 pages.
Jaidev, "XSLT—A Wired and Wireless Case Study," http://csharpcomputing.com/XMLTutorial/Lesson15.htm, 6 pages, printred Oct. 14, 2005.
James, A., "Oracle—Broadcasting the Written Word," Wireless World, Jul. 1973, vol. 79, No. 1453, pp. 314-316.
JiniTM Architecture Overview, by Jim Waldo, from the Internet at http://Java.sun.com/products/jini/whitepapers/architectureoverview.pdf/ printed on Jan. 25, 1999. The document bears a copyright date of 1998, 18 pages.
Judice, C.N., "Move Over Cable, Here Comes Video Via Voice Lines," Network World, Sep. 1986, p. 26.
JVC Service Manual, 27" Color Monitor-Receiver, Model AV-2771S (U.S.), Jul. 1991, 89 pages.
Kai et al., Development of a Simulation System for Integrated Services Television, Report from Information Processing Society of Japan, Japan, Sep. 13, 1996, vol. 96, No. 90 p. 13-20.
Karon, P., "Replay to Bow, Instant VCR", Daily Variety, Sep. 8, 1998, 2 pages.
Karstad, K., "Microprocessor Control for Color-TV Receivers," IEEE Transactions on Consumer Electronics, vol. CE-26, May 1980, pp. 149-155.
Karunanithi et al., "A Feature-Based Neural Network Movie Selection Approach," Proc. Intl. Workshop on Applications of Neural Networks to Telecommunications, Stockholm, Sweden, May 22-24, 1995, pp. 162-169.
Katsuhiro Ochiai (Random TV: Next-generation TV program watching system with random access media), Information Processing Society of Japan, 56th National Conference Proceedings (3) (1998, first part) Mar. 17, 1998 3-302 to 303 (English translation attached).
Kembery, Network based video storage for retrieval over the ISDN, International Conference on Storage and Recording Systems, Apr. 5-7, 1994, pp. 124-28.
Khoo et al., "An Expert System Approach to Online Catalog Subject Searching," Information Processing & Management: An International Journal, vol. 30, No. 2, 1994, pp. 223-238.
Komarinski, Mark, Anonymous FTP page 1, May 1, 1995 Linux Journal, entire document.
Komarinski, Mark, Anonymous FTP page 2, May 1, 1995 Linux Journal, entire document.
Kornhaas, W., "Von der Textprogrammierung uber TOP zum Archivsystem," Radio Fernsehen Elektronik, vol. 40, No. 8, Aug. 30, 1991, pp. 465-468, XP 000240875 Veb Verlag Technik. Berlin, DE ISSN: 1436-1574 (Concise Explanation included in IDS letter.).
Large, "Throw away the books—Viewdata's coming," Guardian, Jan. 10, 1978. 1 page.
Larsson, L. C., Creating a Serials Database in Access: A Primer for Resource Center Managers, Jun. 23, 1998, accessed Dec. 23, 2011 at http://faculty.washington.edu/larsson/conf/aiha98/primer/reports.htm., 22 pages.
Leftwich, Jim & Schein, Steve, StarSight Interactive Television Program Guide, Phase III, Functional/Interactional Architecture Specification Document, Orbit Interaction, Palo Alto, California, Apr. 19, 1995, 36 pages.
Leftwich, Jim, Lai, Willy & Schein, Steve, StarSight Interactive Television Program Guide, Phase IV, Functional/Interactional Architecture Specification Document, Orbit Interaction, Palo Alto, California, published before Apr. 19, 1995, 88 pages.
Li, W. et al., Vision: A Digital Library, Proceedings of the ACM Conference on Digital Libraries, Mar. 20-23, 1996, pp. 19-27.
Listing of computer code for operating system within the Cable Computer in 1985 (Plaintiffs Exhibit 298), undated, 97 pages.
Listing of computer code for Video HTU Program (Plaintiff's Exhibit 299), Jul. 26, 1986, 1 page.
Lists> What's on Tonite TV Listings Internet Article, [Online], Jan. 28, 1995, XP002378869 Retrieved from the Internet: URL: www.scout.wisc.edu/Projects/PastProjects/Nh/95-Jan. 31, 0018.html> [retrieved on Apr. 28, 2006] *the whole document*.
Lloyd, "Impact of Technology," Financial Times, Jul. 1978, 2 pages.
Loen et al., "Subscriber Terminal Units for Video Dial Tone Systems," IEEE Network, Sep./Oct. 1995, pp. 48-57.
Louth Automation website (www.louth.com) dated Aug. 1997, 6 pages.
Lowenstein, R.L. and Aller, H.E., "The Inevitable March of Videotex," *Technology Review*, vol. 88, Oct. 1985, 8 pages.
Lynch's timeline of net related terms and concepts, Mar. 22, 2007, 8 pages.
Manual for Internet Explorer 4- Chapter 9—Browser Features and Functionality, Jan. 10, 2008, 34 pages.
McKenzie, G.A., "Oracle—An Information Broadcasting Service Using Data Transmission in the Vertical Interval," Journal of the SMPTE, Jan. 1974, vol. 83 No. 1, pp. 6-10.
McMurray, "Overview of Dedicated Hosting," Cloud Computing Talk, 1 page, Apr. 24, 1997; retrieved from http://noveltieshere.com/overview-of-dedicated-hosting, Sep. 16, 2014, 1 page.
Melton, "The Uniden Super 4800," OnSat magazine, Jun. 10-Jun. 16, 1990, pp. 2-4.
Merrell, R.G., "Tac Timer," 1986 NCTA Technical Papers, pp. 203-206.
Money, "Teletext and Viewdata," Butterworth & Co. Ltd., London, 1979, 159 pages.
Mosley, "NAPLPS chip sets, though scarce, satisfy limited US videotex demand," EDN, Mar. 21, 1985, at 57.
Motorola, Inc.; Integrated Datacasting Solutions for Digital Television XP-002204351; Jun. 1999, 13 pages.
*Netflix, Inc.* v. *Rovi Corporation et al.*, Netflix's Joint Claim Construction and Prehearing Statement Pursuant to Patent Local Rule 4-3, dated Dec. 19, 2014, 23 pages.
*Netflix, Inc.* v. *Rovi Corporation et al.*, Redacted Version of Motion for Summary Judgment of Invalidity Under 35 U.S.C. § 101, dated Dec. 15, 2014, 30 pages.
*Netflix, Inc.* v. *Rovi Corporation et al.*, Rovi's Opening Claim Construction Brief Pursuant to Patent Local Rule 4-5, dated Jan. 30, 2015, 30 pages.
*Netflix, Inc.* v. *Rovi Corporation et al.*, Rovi's Opposition to Netflix's Motion for Summary Judgment of Invalidity Under 35 U.S.C. § 101, dated Jan. 30, 2015, 33 pages.
Network World, "NetWare users get audited," 11(17), 2 pages (Apr. 25, 1994).
Neue, Digitale Strategien Bericht Von Den 5. Dermastaedter Fernsehtagen, FKT Fernseh Und Kinotechnik, vo. 49, No. 3, Mar. 1, 1995, pp. 135-139, XP000507348, Fachverlag Schiele & Schon Gmbh., Berlin, DE ISSN: 140-9947 (Concise Explanation included in IDS letter.).
Neumann, Andreas, "WDR Online Aufbau Und Perspektiven Automatisierter Online-Dienste Im WDR," Rundfunktechnische Mitteilungen, vol. 41, pp. 56-66, Jun., 1997.
Nguyen, Jim & Ran, Oz, "Evolving Switched Broadcast Beyond First Generation Deployments," BigBandNet.com, SCTE Cable-Tec Expo Conference Presentation, 2006. [http://www.bigbandnet.com/index.php/tech_whitepaper_evolve.html], 12 pages.
Nichols, P., On-screen guide to TV schedules can program a VCR, Too, Times Topics, New York Times Company, 3 pages, Jun. 26, 1995.
Non-final Office Action dated Oct. 30, 2008 for U.S. Appl. No. 11/894,621.

(56) References Cited

OTHER PUBLICATIONS

Non-Final Office Action in U.S. Appl. No. 09/356,161 dated Oct. 7, 2004.
Non-Final Office Action in U.S. Appl. No. 11/179,410 dated Jul. 23, 2008.
Non-Final Office Action in U.S. Appl. No. 11/894,618 dated Oct. 1, 2008.
Norton Backup, Version 1.0, User's Guide and reference, published in 1990 (chapters 3 and 4), 18 pages.
O'Brien, Jr., T.E., "Physical and Media Specifications of the CXBus," IEEE Transactions on Consumer Electronics, vol. 37, No. 3, Aug. 1991, pp. 357-366.
Ohyama et al., Teletext System, National Technical Report, vol. 27, No. 4, Aug. 1981 (includes English Translation), 91 pages.
Opposition against EP99935637 by Fast TV Server AG (Aug. 3, 2005), 35 pages.
Opposition against EP99935637 by Velocity 303 Limited (Aug. 3, 2005), 18 pages.
Overview of Pro-Bell/Chyron's MAPP software published on or after Jan. 1999, 45 pages.
Owen, "How dial-a-fact is coming closer to home," The Times, Sep. 30, 1977, 2 pages.
Paryzek, Chip & Adams, Michael, "Raising the Bar on SDV," CedMagazine.com, Oct. 1, 2006. [http://www.cedmagazine.com/raising-the-bar-on-sdv.aspx], 5 pages.
Patentee's Response to the EESR, filed on Aug. 1, 2006 in European Patent Application No. 05077272.2, 10 pages.
Peddicord, Ross, "New on TV: You Bet Your Horse," The Sun, Baltimore Maryland Dec. 15, 1994, 1 pg.
Periodical RFE, vol. 9'95, p. 100: Trend and Technology Open TV for Interactive Television; 4 pages.
Personal Entertainment Guide-Users Guide, Version 1.0, Copyright 1991 by Lookahead Communications Inc., 82 pages.
Pohlman, House Calls, Video Magazine, vol. 20:6 (Oct. 1996), 2 pages.
Poole, "Demand for Viewdata grows," Sunday Times, Feb. 10, 1977, 3 pages.
Postel, J., Reynolds, J., Request for Comments: 959 File Transfer Protocol, Oct. 1985, entire document (70 pages).
Prevue Guide Brochure, Spring 1984, 2 pages.
Prevue Guide Brochure, Spring 1994, 22 pages.
Printout from Google News Archives, Mar. 22, 2007.
Proceedings of Patent Infringement Action for European Patent Application No. 05077272.2, Jun. 12, 2009, 668 pages.
Prodigy Launches Interactive TV Listing, Apr. 22, 1994, Public Broadcasting Report, 1 page.
PTV Recorder Setup Guide, Philips Electronics, TiVO Inc.(2000), 68 pages.
Public Access Awareness Association, Cable Communications Act of 1984, 14 pages.
Qayyum, "Using IVDSs and VBI for Interactive Television," IEEE, Jun. 10, 1996, 11 pages.
Rajapakshe et al., "Video on demand," (last modified Jun. 1995) <http://wwwdse.doc.ic.ac.uk/~nd/suprise_95/Journal/vol4/shr/report.html>, 14 pages.
Ramachandran, "Space-Time Memory: a parallel programming abstraction for interactive multimedia applications, SIGPLAN Notices", vol. 34:8 (Aug. 1999), pp. 183-92.
Rath et al., "Set-Top Box Control Software: A Key Component in Digital Video," Philips Journal of Research, vol. 50, No. 1/2 1996, at 185.
Rayers, D.J., *"Telesoftware by Teletext," 1984 IEEE Conference Papers*, vol. 240, p. 323.
Raz, Yaron, & Ronald, David, "What's Ahead for Switched Digital Video," CedMagazine.com, Dec. 1, 2006. [http://www.cedmagazine.com/Article-What-is-ahead-switched-digital-video.aspx], 2pages.
RCA Satellite Receiver User's Guide, Thomson Multimedia Inc. (2001), 80 pages.

Reaching your subscribers is a complex and costly process-until now, from the Internet at http://www.evolveproducts.com/info.html, printed on Dec. 28, 1998, 1 page.
Re-Exam Documents for 90/013,279, filed Jun. 13, 2014, U.S. Pat. No. 7,543,320, 88 pages.
Re-Exam Documents for 90/013,283, filed Jul. 2, 2014, U.S. Pat. No. 7,162,729, 94 pages.
Replay TV 5000 series manual, 2002, entire document (86 pages).
Reply to Non-final Office Action dated Apr. 30, 2009 for U.S. Appl. No. 11/894,621.
Reply to Non-Final Office Action in U.S. Appl. No. 09/356,161 dated Mar. 7, 2005.
Reply to Non-Final Office Action in U.S. Appl. No. 11/179,410 dated Jan. 23, 2009.
Reply to Non-Final Office Action in U.S. Appl. No. 11/894,618 dated Apr. 6, 2009.
Request for Continued Examination and Reply to Final Office Action in U.S. Appl. No. 11/894,618 dated Feb. 3, 2010.
Research Disclosure, No. 329, Sep. 1991, Havant GB, p. 657, XP226205, "Installation of consumer apparatus".
RFC 765—File Transfer Protocol Specification, Jun. 1980, 70 pages.
Rogers, C., "Telcos vs. Cable TV: The Global View With Markets Converging and Regulatory Barriers Falling, Service Carriers Are Ready to Rumble," Data Communications, vol. 24, No. 13, pp. 75, 76, 78, and 80, Sep. 21, 1995, 8 pages.
Rohde, "Bank Breaks the Database Rules," Network World, An International Data Group Publication, vol. 11, No. 17, 2 pages, Apr. 25, 1994.
Roizen, Joseph "Teletext in the USA," *Society of Motion Picture and Television Engineers Journal*, Jul. 1981, pp. 602-610.
Rosch, "New data and information system set for commercial market trial," Telephony, Mar. 20, 1978, at 96.
*Rovi et al.* v. *Hulu, LLC*, Central District of California Case No. 12-cv-04756, "Defendant Hulu's Memorandum of Points and Authorities in Support of Hulu's Motion for Summary Judgment That the '906 Patent is Invalid" Dec. 3, 2012, 32 pages.
*Rovi et al.* v. *Hulu, LLC*, Central District of California Case No. 12-cv-04756, "Defendant Hulu's Reply Memorandum in Support of Hulu's Motion for Summary Judgment That the '906 Patent is Invalid" Dec. 26, 2012, 32 pages.
*Rovi et al.* v. *Hulu, LLC*, Central District of California Case No. 12-cv-04756, "Order Denying Hulu's Motion for Summary Judgment That the '906 Patent is Invalid," Feb. 5, 2013 (43 pages).
*Rovi et al.* v. *Hulu, LLC*, Central District of California Case No. 12-cv-04756, "Plaintiffs' Opposition to Hulu's Motion for Summary Judgment that the '906 Patent is Invalid" Dec. 17, 2012 (19 pages).
*Rovi et al.* v. *Hulu, LLC*, Central District of California Case No. 12-cv-04756, "Plaintiffs' Statement of Genuine Issues in Support of Plaintiffs Opposition to Defendant Hulu LLC's Motion for Summary Judgment that the '906 Patent is Invalid" Dec. 17, 2012 (36 pages).
*Rovi et al.* v. *Hulu, LLC*, Central District of California Case No. 12-cv-04756, "Reporters Transcript of Motion Hearing Jan. 7, 2013" Jan. 16, 2013 (95 pages).
*Rovi* v. *Virgin Media*, Approved Judgement, Mar. 26, 2014, 82 pages.
Rovira, Luis et al., "Switched Digital Video," Cable360.net, Feb. 1, 2006. [http://www.cable360.net/technology/emergingtech/14909.html], 4 pages.
Ruffler et al., "InfoRadio on Demand, WebTV and digiTaz—Telecommerce Case Studies," 3rd International Workshop on Community Networking, May 23-24, 1996, 8 pages.
Rumbaugh, "Controlling Propagation of Operations using Attributes on Relations," 3rd Annual Conference on Object-Oriented Programming Systems, Languages, and Applications (OOPSLA 88), San Diego, CA, pp. 285-296, Sep. 25-30, 1988.
Ryan, "Interactive TV Takes a Corporate Twist," Electronic Engineering Times, Jul. 10, 1995, 3 pages.
Ryan, K., "Free Interactive TV Guide," Google Newsgroup, Alleged Date Sep. 29, 1995, 1 page.
Saito, Takeshi, et al., "Homenetwork Architecture Considering Digital Home Appliance," Technical Committee meeting of the Institute of Electronics, Information and Communication Engineers (IEICE), Japan, Nov. 6, 1997, vol. 97, No. 368, p. 57-64. (English translation attached).

(56) References Cited

OTHER PUBLICATIONS

Sandringham, St. John "Dress rehearsal for the Prestel show," New Scientist, Jun. 1, 1978, at 586.
Sanyo Technical Report, No. 44, vol. 22, No. 1, Feb. 1990, 10 pages.
Savage, "Internet's 'What's on Tonite!' Tells You Just That and More," The News, InfoWatch, May 29, 1995, 1 page.
Schauer: Internet Article, [Online] Sep. 28, 1995, XP002378870, Retrieved from the Internet: URL: www.vision2020.moscow.com/Archives/1995/9509/0058.htlm> [retrieved on Apr. 28, 2006] *the whole document* (1 page).
Schepp, Brad et al., "The Complete Guide to CompuServe," Chapter 7, "IQuest and General Information Gathering," pp. 211-258, (McGraw-Hill Osborne Media, Har/Dis edition 1990).
Schlender, B.R., "Couch Potatoes! Now It's Smart TV," *Fortune*, Nov. 20, 1989, pp. 111-116.
Schmidt "Supporting Ubiquitous Computing with Stateless Consoles and Computation Caches" Aug. 2000 (140 pages).
Schmuckler, Eric, "A marriage that's made in cyberspace ( elevision networks pursue links with online information services)," May 16, 1994, Mediaweek, v4, n20, p22 3), 5 pages.
Scully, "Turner backs violence guidelines," HighBeam Research, Broadcasting & Cable (1993), 2 pages.
Sealfon, Peggy, "High Tech TV," Photographic, Dec. 1984, 2 pages.
Selected pages from the "BBC Online—Schedules" web page. This web page is located at http://www.bbc.co.uk/schedules/ (as printed from the Internet on Oct. 19, 1999 and being dated as early as May 24, 1997), 6 pages.
Sharpless et al., "An advanced home terminal for interactive data communication," Conf. Rec. Int. Conf. Commun. ICC '77, IEEE, Jun. 12-15, 1977, at 19.6-47.
Sheth, A., C. Bertram and K. Shah (1999). "VideoAnywhere: A system for Searching and Managing Distrbuted Video Assets." Sigmod Record 28(1): 104-109, 6 pages.
Sistla et al., "Temporal Triggers in Active Databases," IEEE Transactions on Knowledge and Data Engineering, vol. 7, No. 3, Jun. 1995, 16 pages.
Sony Digital Satellite Receiver Operating Instructions, SATA1, 92 pages (1995).
Sony Digital Satellite System DirecTV, USSB (May 1995), 6 pages.
Start Here, Sony, TiVo and DIRECTV (undated), 8 pages.
Startup puts MPEG-2 encoder in fast forward, EE Times, Jun. 29, 1998, 3 pages.
Statement in an Examination Report dated Aug. 2, 1999 for a counterpart foreign application filed in New Zealand in which the foreign Examiner alleges that he has used "the Internet to access television listings for BBC World television as far back as mid 1996 . . . ", 2 pages.
Stickland, "Its a common noun," The Economist, Jun. 5, 1978, 1 page.
Sun's Next Steps in Digital Set-Tops, article in Cablevision, p. 56, Nov. 16, 1998, 1 page.
Sunada, K. et al, "Teletext Color Television Receiver Model C-29M950, C26M940," NEG Home Electronics, NEG Giho, 1987, 16 pages.
SuperGuide/Uniden 4800, "A Quick Guide to Programming the Uniden 4800—Dealer Set-Up Manual," undated, 8 pages.
SuperGuide/Uniden 4800, "A User's Guide to SuperGuide's ™ Features," undated, 12 pages.
Supplementary European Search Report, Feb. 25, 2000, Application No. EP 97 91 0985, 2 pages.
Sussman, A. "GTE Tunes in to Home TV Shopping," PC Week, Jun. 28, 1988, p. C15. (IDS Feb. 6, 2014.
Tech Notes: Product Updates from M-A-COM Cable Home Group, "Videocipher Owner's Manual Update," Issue No. 6, Feb. 1986, 19 pages.
Teletext presents the alternative view, Financial Times, Oct. 24, 1977, 2 pages.
The Evolve EZ Guide. The Remote Control, from the Internet at http://www.evolveproducts.com/display2.html, printed on Dec. 28, 1998, 1 page.

The InfoBeat television program guide website of InfoBeat, Inc. This website is located at www.infobeat.com (as printed from the Internet on Dec. 8, 1997), 46 pages.
The television program guide website of Gist Communications, Inc. of New York, New York. This website is located at www.gist.com (as printed from the Internet on Aug. 14, 1997), 133 pages.
The television program guide website of TV Guide Entertainment Network. This website is located at www.tvguide.com (as printed from the Internet on Aug. 14-18, 1997), 139 pages.
Thibadeau, "The Question of Standard for Digital Interactive Television," Research Paper, (Nov. 1993), 19 pages.
Thomas, "Electronic Program Guide Applications—The Basics of System Design," NCTA Technical Papers, 1994, pp. 15-20.
Tolenkin, D., "Determining Navigation Needs," Telemedia Week, Dec. 5, 1994, 1 page.
*Transcript of the Deposition of John Roop*, Oct. 1996, pp. 186-187.
Trial testimony of Michael Axford, *Prevue Interactive, Inc. and United Video Satellite Group, Inc.* v. *Starsight Telecast, Inc.*, May 9, 1998, pp. 186-187, 295-315, and 352-357.
TV Guide Magazine dated Feb. 4-10, 1989 (excerpts), 4 pages.
TV Guide movie database Internet web pages printed on Aug. 12, 1999 (9 pages).
TV Guide on Screen Prior Use Transcript of Proceedings, "Violence on Television," House of Representatives, Committee on Energy and Commerce, Subcommittee on Telecommunications and Finance, Jun. 25, 1993, 36 pages.
TV Guide Online Set for Fall, Entertainment Marketing Letter, Aug. 1994, 1 page.
U.S. Appl. No. 10/927,814, various Office Actions issued by the United States Patent Office and applicants' responses; as well as Request for Interference, Examiner Interview Summary and Applicant Summary of Interview with Examiner.
U.S. Appl. No. 11/179,410, Office Action issued by the United States Patent Office and applicants' response.
U.S. Appl. No. 11/894,741, Office Action dated Jun. 23, 2009 and Examiner Interview Summary dated Jun. 24, 2009.
U.S. Appl. No. 08/922,212, various Office Actions issued by the United States Patent Office and applicants' responses along with a Notice of Abandonment.
U.S. Appl. No. 10/241,112, various Office Actions issued by the United States Patent Office and applicants' responses along with Notice of Appeal.
U.S. Appl. No. 10/927,582, various Office Actions issued by the United States Patent Office and applicants' responses; as well as Request for Interference.
U.S. Appl. No. 11/246,392, various Office Actions issued by the United States Patent Office and applicants' response.
U.S. Appl. No. 11/894,741, various Office Actions issued by the United States Patent Office and applicants' response.
Ueda, Hirotada et al, "Impact: An Interactive Natural-Motion-Picture Dedicated Multi-Media Authoring System," Communications of the ACM, Mar. 1991, pp. 343-350.
Using StarSight 2, published before Apr. 19, 1995, 29 pages.
UBVSG Offers System-Specific Web Site Development for OPS, press release of United Video Satellite Group, Apr. 12, 1996, 2 pages.
UVSG Teams With Microsoft on Internet Information Server, press release of United Video Satellite Group, Feb. 22, 1996, 2 pages.
Various publications of Insight Telecast, 1992 and 1993, 10 pages.
Veith, R.H., "Television's Teletext," Elsevier Science Publishing Co., Inc, 1983, pp. 13-20,41-51.
Venditto, G., Prodigy for Dummies, IDG Books, pp. 57-63, 213 (1995).
Verknuepfung von TV mit INternet, Funkschau, De, Franzis—Verlag K.G. Munchen, vol. 68, No. 18 Aug. 16, 1996, pp. 70-71, XP 000631189, ISSN: 0016-2841 (Translation, pp. 1-3).
VideoGuide, Videoguide User's Manual, 1995, pp. 1-28.
Viewdata and its potential impact in the USA: Final Report/vol. One, The UK Experience, Link and Butler Cox & Partners Limited, Oct. 1978, 129 pages.
Viewdata moves in US but GEC may lose out, Computing Weekly, Jan. 25, 1978, 1 page.
Viewdata Service Terminal Specification, British Post Office, Issue 5, Aug. 1978, 57 pages.

(56) References Cited

OTHER PUBLICATIONS

VPS weiterentwickelt: Service Uber Videotext, Funkschau Recorder-Programmierung, Nov. 1986, pp. 40-43 with English translation.
Web TV and Its Consumer Electronics Licenses debut First Internet Television Network and Set Top Box, Jul. 10, 1996 <http://www.ohlfs.com/keith/self/webtv/home/HTML/home.license.html>, 6 pages.
Whale, "Identification of Program Similarity in Large Populations," The Computer Journal, vol. 33, No. 2, 1990, pp. 140-146.
What is Jini?, from the Internet at http://java.sun.com/products/jini/whitepapers/whatsjini.pdf, printed on Jan. 25, 1999, 4 pages.
Whitehorn, "Viewdata and you," Observer, Jul. 30, 1978, 1 page.
Why Jini Now?, from the internet at http://java.sun.com/products/jini/whitepapers/whyjininow.pdf, printed on Jan. 25, 1999. The document bears a copyright date of 1998, 16 pages.
Wikipedia article on CompuServe, Mar. 22, 2007, 7 pages.
Wikipedia article, "Geschichte des Internets," from the internet at http://de.wikipedia.org/wiki/Geschichte_des_Internets, page last modified on Apr. 28, 2012, printed from the internet on May 18, 2012. (Concise explanation included in IDS letter.), 17 pages.
Wikipedia article, "Internet Explorer," from the internet at http://de.wikipedia.org/wiki/Internet_Explorer, page last modified on Sep. 9, 2012, printed from the internet on Sep. 13, 2012. (Concise explanation included in IDS letter.), 14 pages.
Wikipedia article, "MSN TV," from the internet at http://en.wikipedia.org/wiki/MSN_TV, page last modified on May 15, 2012, printed from the internet on Sep. 13, 2012, 10 pages.
Wikipedia article, "NCSA Mosaic," from the internet at http://de.wikipedia.org/wiki/NCSA_Mosaic, page last modified on Sep. 3, 2012, printed from the internet on Sep. 13, 2012. (Concise explanation included in IDS letter.), 2 pages.
Wikipedia article, "TVGN," from the internet at http://en.wikipedia.org/wiki/TVGN, page last modified on Nov. 17, 2014, printed from the internet on Nov. 18, 2014, 12 pages.
Wikipedia—Teletext Excerpt (retrieved Jul. 1, 2013), 18 pages.
Willcox, "WebTV Hardware Suppliers Set Complete Related Roster," Twice, Sep. 29, 1997, 2 pages.
Williams, David M., and Perry, Burt, "Rich Online Services as the Archetype for Interactive TV," Cable '94, Proceedings from Twelve Technical Sessions, 43rd Annual Convention and Exposition of the National Cable Television Association, May 22-25, 1994, New Orleans, LA., Technical Paper Compiled by Katherine Rutkowski, National Cable, XP008161201, pp. 21-35.
Wilson, Programme delivery control for simplified home video recording, IEEE Transactions on Consumer Electronics, vol. 37:4 (Nov. 1991), pp. 737-745.
Wittig, H. et al., "Intelligent Media Agents in Interactive Television Systems," Proceedings of the International Conference on Multimedia Computing and Systems, Los Alamitos, CA, US, May 15, 1995-May 18, 1995, pp. 182-189, XP00603484 p. 183, left hand col., paragraph 2, p. 184, right-hand col., paragraph 2 figure 4.
Wolfe, Alexander, "Beyond the SIPC," Electronic Engineering Times, No. 910, Jul. 15, 1996, p. 41, Abstract, 2 pages.
Wolfe, Alexander, "Microsoft Poses PC Specs.," Electronic Engineering Times, Jul. 8, 1996, Abstract, 2 pages.
Yarrow, "The Media Business; Pay-Per-View Television is Ready for Takeoff," The New York Times, Archives, Nov. 14, 1988, 3 pages.
Yoshiaki, Kurata; Syun no Video Kyoyu Site wo Tettei Koryaku Mezase! YourTube Expert (Thorough Analysis of Video Sharing Site in Trend), MacPeople, ASCII, Oct. 1, 2006, vol. 12, No. 10, pp. 201-207. Translation not available. (Concise Explanation included in IDS letter.).
Yoshida, "Interactive TV a Blur," Electronic Engineering Times, Jan. 30, 1995, 2 pages.
YouTube Website, "YouTube Homepage, Categories browsing", pp. 1-4, (Aug. 26, 2006) http://web.archive.org/web/20060826163534/youtube.com/index>.
Lienhart—"Automatic text recognition for video indexing"—Proc. Of the Fourth ACM International Conference on Multimedia, ACM 1996 (pp. 11-20).
U.S. Appl. No. 60/022,436, filed Aug. 6, 1996.
Smith et al., "An image and video search engine for the world-wide web"—Proceedings of SPIE, vol. 3022, Feb. 13, 1997 (pp. 84-95).
2720R Satellite Receiver User's Guide, General Instrument, 1991, pp. 58-61.
A Wonderworld of Services, The Sunday Times, Innovation section, p. 4, Jan. 7, 1996, 1 page.
Abarca et al., Telecommunications Information Networking Architecture Consortium, Service Architecture, Version 5.0, Jun. 16, 1997, 168 pages.
Acceptance thesis of Bo Zou profs Nahrstedt (1 page).
Bo Zou, "Mobile ID Protocol: A Badge-Activated Application Level Handoff of a Multimedia Streaming to Support User Mobility," 2000 (54 pages).
Brody, Information highway: The home front, Technology Review, vol. 96:6 (Aug./Sep. 1993), p. 30.
Buchholz et al., "Revolution auf dem Bildschirm—Die neuen Medien Videotext and Bildschirmtext," Wilhelm Goldmann Verlag, Munich, Germany, copyright 1979, pp. 24-33 and 36-39 (English language translation attached).
Cheng et al., "Extended Relational Database Technology for New Applications," IBM Systems Journal, vol. 33, No. 2 (1994), 16 pages.
Columbia House CD-ROM Direct: Detail Page, accessed from the internet at http://web.archive.org/web/19961221160255/http://www.columbiahouse.com/cd/cgis ..., copyright 1996, printed on Sep. 19, 2013, 1 page.
Columbia House CD-ROM Direct: Member Center, accessed from the internet at http://web.archive.org/web/19961221085905/http://www.columbiahouse.com/repl/cd/ ..., copyright 1996, printed on Sep. 19, 2013, 2 pages.
Columbia House CD-ROM Direct: Member Center, copyright 1996, 1 page.
Columbia House CD-ROM Direct: The Connection, accessed from the internet at http://web.archive.org/web/19961221100721/http://www.columbiahouse.com/repl/cd/ ..., copyright 1996, printed on Sep. 20, 2013, 1 page.
Columbia House CD-ROM Direct: Download Demos!, accessed from the internet at http://web.archive.org/web/19961221095819/http://www.columbiahouse.com/cd/cgis ..., copyright 1996, printed on Sep. 19, 2013, 3 pages.
Columbia House Laser Disc Club: FAQ Answers, accessed from the internet at http://web.archive.org/web/19961223165516/http://www.columbiahouse.com/repl1/lc/t ..., copyright 1996, printed on Sep. 20, 2013, 5 pages.
Columbia House Music Club: Search, accessed from the internet at http://web.archive.org/web/19961221114653/http://www.columbiahouse.com/repl/mc ..., copyright 1996, printed on Sep. 19, 2013, 1 page.
Columbia House Laser Disc Club: Join the Club, accessed from the internet at http://web.archive.org/web/19961221094037/http://www.columbiahouse.com/repl1/lc/t ..., copyright 1996, printed on Sep. 20, 2013, 2 pages.
Columbia House Music Club: Join The Club, accessed from the internet at http://web.archive.org/web/19961221091101/http://www.columbiahouse.com/repl/mc ..., copyright 1996, printed on Sep. 20, 2013, 2 pages.
Columbia House Music Club: Shopping Cart, accessed from the internet at http://web.archive.org/web/19961221120941/http://www.columbiahouse.com/mc/cgis ..., copyright 1996, printed on Sep. 19, 2013, 1 page.
Comdex—Mitsubishi Previews 40-Inch DiamondWeb TV, Newsbytes, Nov. 19, 1996, Abstract, 2 pages.
Computer Science: An Overview, 5th Edition, Addison Wesley, ISBN 0-8053-4632-5, pp. 25 to 28 (undated).
Costello, On-screen TV program guides, Stereo Review, 60:8 (Aug. 1995), p. 20.
Counterstatement of the Patentee for European Patent EP 1099341B dated Feb. 23, 2006, 16 pages.
Counterstatement of the Patentee for European Patent EP 1213919B dated Sep. 20, 2011, 17 pages.

(56) References Cited

OTHER PUBLICATIONS

DAVIC 1.0 Specifications, Part 1, Description of DAVIC Functionalities, Revision 3.2, Digital Audio-Visual Council, Jul. 10, 1995, 61 pages.
DAVIC 1.3.1 Specification Part 1, Published in 1998 by Digital Audio-Visual Counsel, 85 pages.
DAVIC 1.3.1. Description of Digital Audio-Visual Functionalities 1998 (86 pages).
Davidson, Ken, "CEBus: A New Standard in Home Automation" Circuit Cellar Ink, pp. 40-52 (1989).
Declaration of David King, executed Mar. 21, 2013 (11 pages).
Dial M for Movie, Periodical Funkschau, vol. Nov. 1994, pp. 78-79 (English language translation attached).
Does NBC Get It, Aug. 14, 1995, retrieved from the internet at http://www.open4success.org/db/bin19/019687.html, retrieved on Dec. 11, 2013, 1 page.
Don Imus: The Thinking Man's Shock Jock, Broadcasting Cable, Jun. 13, 1994, pp. 49-52.
DIRECTV Receiver with TiVo Digital Satellite Receiver/Recorder SAT-T60—Installation Guide, Sony Corporation, 43 pages (2000).
Draft Grounds of Invalidity for EP (UK) 0 880 856 (Trial B), No. HC11 C 04556, between Starsight Telecast and United Video Properties (Claimants) and Virgin Media, Virgin Media Payments, and TiVo (Defendants), 7 pgs., Oct. 2013.
Edwardson, S.M., & Gee, A., "CEEFAX: A Proposed New Broadcasting Service," Journal of the SMPTE, Jan. 1974, vol. 83 No. 1, pp. 14-19.
Eitz, Gerhard, "Zukünftige Informations—Und Datenangebote Beim Digitalen Fernsehen—EPG Und "Lesezeichen"," Rundfunktechnische Mitteilungen, vol. 41, pp. 67-72, Jun. 1997 (English language translation attached).
Electronic Program Guide via Internet, Research Disclosure, Kenneth Mason Publications, Hampshire, GB Nr. 385 (May 1996) p. 276, ISSN:0374-4353.
Electronic Program Guide via Internet, Research Disclosure, Kenneth Mason Publications, Hampshire, GB, vol. 385, No. 2, May 1, 1996, ISSN: 0374-4353, 1 page.
EP 99963412.4 Official Communication dated Oct. 21, 2010 (8 pages).
Examiner Interview Summary in U.S. Appl. No. 09/356,161 dated Aug. 10, 2005.
Extended European Search Report dated Oct. 27, 2010 in EP Application No. 10177836.3, 7 pages.
GameSpot: Allied General at a Glance, accessed from the internet at http://web.archive.org/web/19970205153530/http://www.gamespot.com/strategy/allie . . . , copyright 1996, printed on Sep. 19, 2013, 1 page.
GameSpot's Downloads for Allied General, accessed from the internet at http://web.archive.org/web/19970205060703/http://www.gamespot.com/strategy/allie . . . , copyright 1997, printed on Sep. 19, 2013, 1 page.
Gateway Destination: The PC for the Office and the Family Room, PC Magazine, First Looks section, pp. 39-41, Jun. 11, 1996.
Fry et al., "Delivering QoS Controlled Continuous Media on the World Wide Web," Proceedings of the 4th International IFIP Workshop on QoS, Paris, Mar. 6-8, 1996, 12 pages.
Furht et al., Design issues for interactive television systems, Computer, vol. 28:5 (May 1995), pp. 25-39.
GameSpot: Allied General—Download It Now!!!!, accessed from the internet at http://web.archive.org/web/19970206133452/http://www.gamespot.com/strategy/allie . . . , copyright 1997, printed on Sep. 19, 2013, 1 page.
Garneau, "Information Highway in Quebec," Editor & Publisher, vol. 127, No. 5, Jan. 29, 1994, 4 pages.
Gondow, S., et al., "The Architecture of Communication Migration and Media State Management for Distributed Applications on Wearable Networks," Information Processing Society of Japan (National Conference Lecture Collected Paper), Tokyo, Japan, Oct. 3, 2000, pp. 1-2.

Gemstar, Gemstar Buys VideoGuide Stake, Consumer Electronics, Feb. 26, 1996, p. 11.
Hobbes' Internet Timeline 10.2, by Robert H'obbes' Zakon, from the internet at http://www.zakon.org/robert/internet/timeline/, printed from the internet on Sep. 13, 2012, 29 pages.
Hartwig, Rautenberg, Bollmann, "Broadcasting and Processing of Program Guides for Digital TV," SMPTE Journal, pp. 727-732, Oct. 1997.
Hauptmann et al., "News on Demand," News-on-Demand: An Application Informedia® Technology D-Lib Magazine, (Sep. 13, 1995), XP002675162, Retrieved from the Internet: URL:http://www.dlib.org/dlib/september95/nod/page3/html[retrieved on May 2, 2012], 1 page.
Huyng "Implementations of User Mobility Support for UPC in JAVA/CORBA Environment," The University of British Columbia, Aug. 1999 (86 pages).
IBM Corporation "IBM VideoCharger for AIX Version 2.0" Streaming the power of video to your desktop, pp. 1-5 Visit the IBM VideoCharger Website at: www.software.ibm.com/data/videocharger/; (undated).
Interactive Computer Conference Server, IBM Technical Bulletin, vol. 34, No. 7A, Dec. 1991, pp. 375-377.
IBM Corporation, "IBM Video Charger Server", pp. 102, Jun. 1998.
IBM Corporation, "IBM Video Charger Server", pp. 1-2, Jun. 1998.
Internet User Forecast by Country, Computer Industry Almanac—Press Release, from the internet at http://www.c-i-a.com/internetusersexec.html, printed from the internet on Sep. 13, 2012, 3 pages.
Instruction Manual Using StarSight 2, StarSight Telecast, Inc., 1994, 27 pages.
Interactivity for the Passive, published in Dec. 6, 1993 issue of Forbes, 5 pages.
ITC Investigation of Certain Products Containing Interactive Program Guide and Parental Control Technology, Investigation No. 337-TA-845, "Commission Opinion" Dec. 11, 2013 (27 pages).
ITC Investigation of Certain Products Containing Interactive Program Guide and Parental Control Technology, Investigation No. 337-TA-845, Complainants' Initial Submission in Response to Commission's Determination to Review the Final Initial Determination Aug. 23, 2013 (55 pages).
ITC Investigation of Certain Products Containing Interactive Program Guide and Parental Control Technology, Investigation No. 337-TA-845, "Complainants' Reply Submission in Response to Commission's Determination to Review the Final Initial Determination" Aug. 30, 2013 (32 pages).
ITC Investigation of Certain Products Containing Interactive Program Guide and Parental Control Technology, Investigation No. 337-TA-845, "Notice of Commission Determination to Review in Its Entirety a Final Initial Determination Finding No Violation of Section 337" Aug. 9, 2013 (6 pages).
ITC Investigation of Certain Products Containing Interactive Program Guide and Parental Control Technology, Investigation No. 337-TA-845, "Notice of the Commission's Final Determination Finding No Violation of Section 337; Termination of the Investigation" Nov. 1, 2013 (4 pages).
ITC Investigation of Certain Products Containing Interactive Program Guide and Parental Control Technology, Investigation No. 337-TA-845, "Respondent Netflix Response to Complaintants' Petition for Review" Jul. 12, 2013 (64 pages).
ITC Investigation of Certain Products Containing Interactive Program Guide and Parental Control Technology, Investigation No. 337-TA-845, "Respondent Netflix, Inc.'s Summary of Issues for Its Repsonse to Complainants Petition for Review" Jul. 12, 2013 (6 pages).
ITC Investigation of Certain Products Containing Interactive Program Guide and Parental Control Technology, Investigation No. 337-TA-845, "Respondents Netflix, Inc.'s and Roku, Inc.'s Response to Complainants' Initial Submission in Response to Commission's Determination to Review the Final Initial Determination" Aug. 30, 2013 (43 pages).
ITC Investigation of Certain Products Containing Interactive Program Guide and Parental Control Technology, Investigation No. 337-

(56) References Cited

OTHER PUBLICATIONS

TA-845, "Respondents' Response to the Commission's Determination to Review the Final Initial Determination" Aug. 26, 2013 (62 pages).
ITC Inv. No. 337-TA-845: Netflix and Roku's MSD of Invalidity of '776, '762, and '709 filed Jan. 3, 2013, 205 pages.
ITC Inv. No. 337-TA-845: Netflix's Memorandum of Points and Authorities in Support of Motion for Summary Determination of Invalidity Under Section 102(e) of the Asserted Claims of the '776 Patent filed Jan. 14, 2013, 31 pages.
Jaidev, "XSLT—A Wired and Wireless Case Study," http://csharpcomputing.com/XMLTutorial/Lesson15.htm; Oct. 14, 2005.
Katkere et al., "Interactive Video on WWW: Beyond VCR-like Interfaces," Computer Networks and ISDN Systems, vol. 28, Issue 11, 1996, pp. 1559-1572.
Limongiello, A. et al., "An Experimental Open Architecture to Support Multimedia Services based on CORBA, Java and WWW Technologies", Intelligence in Services and Networks: Technology for Cooperative Competition, Fourth International Conference on Intelligence in Services and Networks, IS&N'97, May 27-29, 1997, pp. 69-75.
Large, "Viewdata, the invention that brings boundless advice and information to the home, also sets a test for the Post Office," Financial Guardian, Jun. 29, 1978, 3 pages.
Little et al., "Prospects for Interactive Video-on-Demand," IEEE Multimedia, Fall 1994, pp. 14-24.
Lowenstein, R.L. and Aller, H.E., "The Inevitable Mar. Of Videotex," Technology Review, vol. 88, Oct. 1985, p. 22.
M-A-COM, Inc., "Videocipher II Satellite Descrambler Owner's Manual," dated Prior Feb. 1986, pp. 1-17.
Mah et al., "Providing Network Video Service to Mobile Clients," 1993 IEEE, pp. 48-54.
Mannes, G., "Smart Screens: Development of Personal Navigation Systems for TV Viewers," Video Magazine, Dec. 1993, 6 pages.
Mar. 19, 1985 letter from G. Knapp of CableData to R. Hansen of Weststar Communications, Inc. (Plaintiffs Exhibit 325), 6 pages.
Markowitz, A. "Companies Jump on Interactive Bandwagon," Discount Store News, Dec. 6, 1993, pp. 4 and 131.
Model D9500 Switched Digital Video (SDV) Server, Scientific Atlanta, Apr. 2006. [http://www.cisco.com/en/US/prod/collateral/video/ps9159/ps9195/ps9258/product_data_sheet090 0aecd806cec4a.pdf], 2 pages.
*Netflix, Inc.* v. *Rovi Corporation et al.*, Netflix's Responsive Claim Construction Brief, dated Feb. 18, 2015, 30 pages.
Okimi, Katsuya et al., "Shinban ISDN," ("New ISDN Edition"), Japan, Ohmsha, Ltd., First Edition, Oct. 5, 1995, pp. 261-285. (Concise Explanation included in IDS letter.).
Open TV fur interaktives Fernsehen, Trend and Technik, 9-95 RFE, p. 100. (English language translation attached).
Open TV Launches OpenStreamerTM Technology for Broadcasters to Deliver First Ever Real-Time Digital Interactive Television, from the internet at http:--www.opentv.com-news-openstreamer_press_final.htm, printed on Jun. 28, 1999, the document bears a copyright date of 1999, 2 pages.
Owen, "Why the Post Office is so excited by its plans for a TV screen information service," The Times, Sep. 26, 1976, 4 pages.
Papers Delivered (Part 1), 61st National Conference, Information Processing Society of Japan, Oct. 3-5, 2000.
PCT Notification of Transmittal of International Search Report, International Application No. PCT/US00/05887, Aug. 2000, 2 pages.
Prevue Online Debuts Local Listings for 250 Systems; System-Specific Listings Include Multimedia Features—Free Build Acceleration, PR Newswire, Jun. 5, 1997, 2 pages.
Prevue Online, Dec. 28, 1996, extract from web.archive.org, printed on Nov. 18, 2014, http://www.prevue.com, 1 page.
Pfister, Larry T., "Teletext: Its Time Has Come," Prepared for the IGC Videotext—Teletext Conference, Andover, Massachusetts, Dec. 14, 1982, pp. 1-11.
Pogue, D., "State of the Art: For TiVo and Replay, New Reach," N.Y. Times, May 29, 2003.

Premium Channels Publishing Company Inc., Premium channels publishing will market a weekly program guide listing pay TV, cable and broadcast offerings by daypart, Cable Television Business, Nov. 15, 1982, p. 194.
Program and System Information Protocol for Terrestrial Broadcast and Cable, ATSC, Dec. 23, 1997, 95 pages.
Rewind, reply and unwind with new high-tech TV devices, by Lawrence J. Magid, LA Times (This document was printed from the internet on Jun. 6, 1999 and bears a date of May 19, 1999).
Reed "Room to room video", Popular Science, May 1991, pp. 96-98 (3 pages).
S. Draper et al., TV Anytime, Proceedings International Broadcasting Convention, 1999, pp. 103-108.
Rowe, L., et al., "A Continuous Media Player", Proc. 3rd Int. Workshop on Network and OS Support for Digital Audio and Video, San Diego, CA, 11 pages, Nov. 1992.
Step Up to the Superhighway, The Sunday Times, Innovation section, p. 6, Jan. 7, 1996.
Singru et al., "Framework for Interactive Video-On-Demand Service", Proc. Of the IEEE 14th Annual Intl. Phoenix Conf. on Computer and Communications, 1995, pp. 636-642.
SONICblue Incorporated: ReplayTV 4000 User Guide 12.17, Chapter Five: Networking, Sep. 10, 2001; retrieved from the internet: http://www.digitalnetworksna.com/support/replaytv/dowloads/ReplayTV4000UserGuide.12.17.pdf, 13 pages.
Sony SLV-760IIF et al. operating instructions (Sony 2"), published in 1995, 68 pages.
Sorce, J. et al., "Designing a Broadband Residential Entertainment Service: A Case Study," 13th International Symposium Human Factors in Telecommunications, Torino, Italy, Sep. 10-14, 1990 pp. 141-148.
Spangler, Todd, "How Time Warner Austin Did Switched Digital," Multichannel News, Jun. 21, 2007. [http://www.multichannel.com/article/CA6454447.html] (2 pages).
*StarSight Telecast* v. *Virgin Media*, day 2, Feb. 28, 2014, 66 pages.
Stokes, "The viewdata age: Power to the People," Computing Weekly, Jan. 1979.
Submission by Velocity in European patent No. 1099341 (Mar. 19, 2010), 6 pages.
Supplementary European Search Report for Application No. EP 98 93 5889, completed on Sep. 28, 2001, 3 pages.
Technical White Paper, "Open TV™ Operating Environment," (© 1998 OpenTV Inc.), pp. 1-12.
Technological Examination & Basic Investigative Research Report on Image Databases, Japan Mechanical Engineering Organization Int'l Society for the Advancement of Imaqe Software, Japan, Mar. 1988, 127 pages (Concise Explanation included in IDS letter.).
Technology: Turn on, tune in and print out—An experimental interactive television service is set to alter our viewing habits, Financial Times (London), Oct. 14, 1993, p. 11.
Tedesco, R., "WebTV Clicks on 'Tv Guide'," Broadcasting & Cable, vol. 127, No. 3, Jan. 20, 1997, p. 56.
Teraoka et al., "Host Migration Transparency in IP networks: The VIP Approach" ACM SIGCOMM—Computer Communication Review, ACM Press, New York, NY, USA, Jan. 1993, pp. 45-65.
The clickTV television program guide website of TVData of Queensbury, New York. This website is located at www.clicktv.com (as printed from the Internet on Aug. 13, 1997/Sep. 1, 1998 from 003597-0099-107), 5 pages.
The New Media and Broadcast Policy: An Investigation & Research Conference Report on Broadcasting Diversification, Radio Regulatory Bureau, Japan Ministry of Posts & Telecommunications, Mar. 1982, 114 pages. (Concise Explanation included in IDS letter.).
The New York Times Website Article, "2 Makers Plan Introductions of Digital VCR", by John Markoff, Mar. 29, 1999.
United Kingdom: BSKyB to launch integrated personal TV recorder, BBC Monitoring Media, Sep. 11, 2000.
United Media Enterprises, United Media Enterprises (New York, NY) affiliate ' TV Watch/DIP' now provides a monthly satellite print guide with schedules for all satellite and pay services, Satellite News, Dec. 24, 1980, p. 7.
Third Party Submission Under 37 CFR 1.290 filed Jul. 31, 2013, U.S. Appl. No. 13/181,915 Concise Description of Relevance, (30 pages).

(56) References Cited

OTHER PUBLICATIONS

Three men on a Viewdata bike, The Economist, Mar. 25, 1978, 2 pages.
TINA-C, Business Model and Reference Points, Version 4.0, May 22, 1997 (68 pages).
Uniden UST-4800 Integrated Receiver/Descrambler, Installation Guide, Installation Device, copyright 1990, Uniden America Corporation, 60 pages.
Welcome to Columbia House Online, accessed from the internet at http://web.archive.org/web/19961221085121/http://www.columbiahouse.com/, copyright 1996, printed on Sep. 19, 2013, 1 page.
What's New @ Prevue Online—Real™ Video, May 2, 1997, extract from web.archive.org, printed on Nov. 18, 2014, http://www.prevue.com/scripts/whatsnew.asp, 5 pages.
What's On Tonite!, Jan. 28, 1995, retrieved from the internet at http://www.library.georgetown.edu/newjour/publication/whats-tonite-tm, retrieved on Dec. 11, 2013, 9 pages.
User's Guide RCA Color TV with TV Plus + Guide, 1997, 88 pages.
Using Smart Cards With the Sun Ray Enterprize Appliance, Sun Microsystems, Sep. 1999, (19 pages).
Videocipher Stipulation, May 1996, 5 pages.
Yearling's Free Personalised TV Guide, from the internet at http://www.yearling.com/, Dec. 30, 1996, 15 pages.

\* cited by examiner

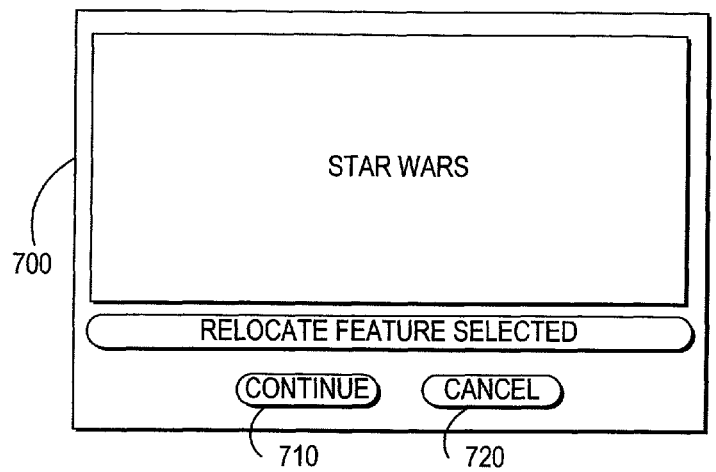
FIG. 7A
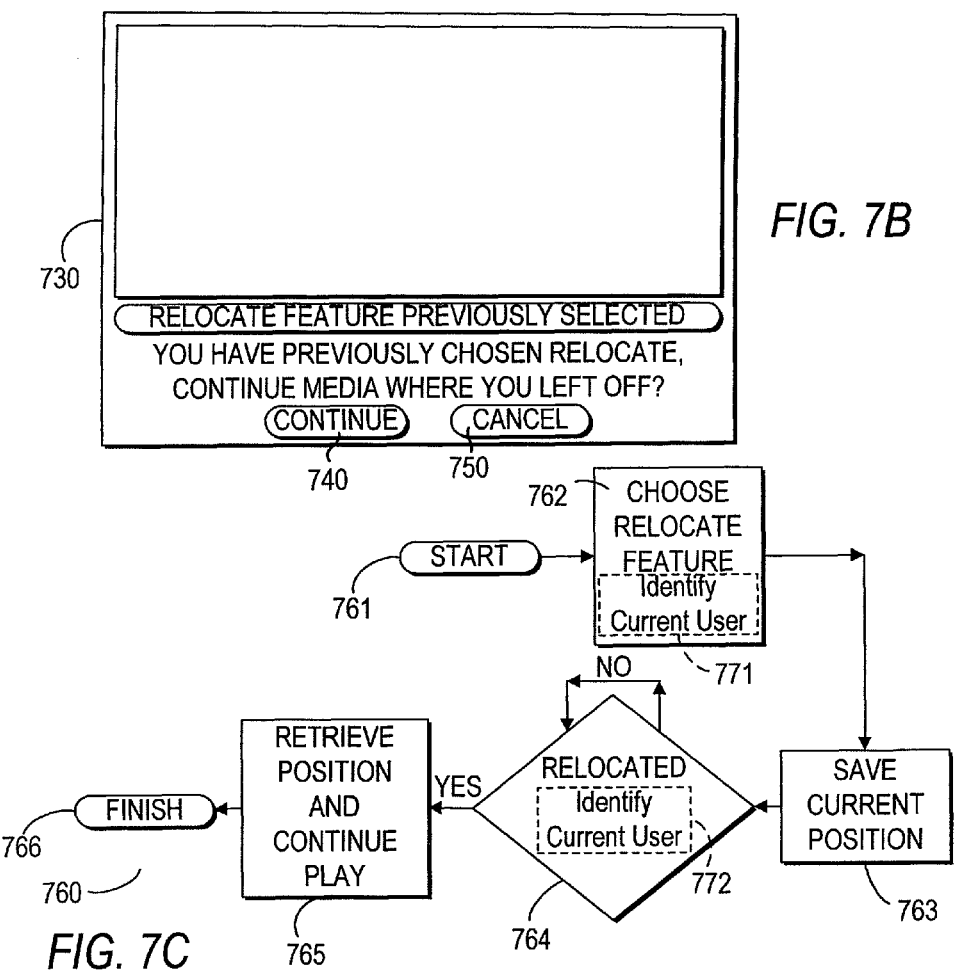
FIG. 7B
FIG. 7C

SYSTEMS AND METHODS FOR PROVIDING STORAGE OF DATA ON SERVERS IN AN ON-DEMAND MEDIA DELIVERY SYSTEM

CROSS REFERENCE TO RELATED APPLICATIONS

This application is a continuation of U.S. patent application Ser. No. 14/559,781, filed Dec. 3, 2014, which is a continuation of U.S. patent application Ser. No. 14/048,818, filed on Oct. 8, 2013 (now U.S. Pat. No. 8,973,069), which is a continuation of U.S. patent application Ser. No. 13/023,842, filed Feb. 9, 2011 (now U.S. Pat. No. 8,584,184), which is a continuation of U.S. patent application Ser. No. 12/200,593, filed Aug. 28, 2008 (now U.S. Pat. No. 7,917,933), which is a continuation of U.S. patent application Ser. No. 09/974,646, filed Oct. 9, 2001, (now U.S. Pat. No. 7,650,621), which claims the benefit of U.S. Provisional Patent Application No. 60/239,407 filed Oct. 11, 2000 (now expired), U.S. Provisional Patent Application No. 60/252,171 filed Nov. 20, 2000 (now expired), and U.S. Provisional Patent Application No. 60/270,351, filed Feb. 21, 2001 (now expired), which are hereby incorporated by reference herein in their entireties.

BACKGROUND OF THE INVENTION

The present invention relates to on-demand media delivery systems and more particularly, to on-demand media delivery systems that have user-related memory tor providing system enhancements.

In some known video on-demand systems, a set-top box may be used to receive on-demand video from cable system headends. Such set-top boxes may communicate or may deliver the video and/or other functionality to television sets, VCRs, or other local devices. These systems have been deficient in allowing users to relocate their video-on-demand service to different locations. These systems may have also been deficient in providing adequate relocation techniques, deficient in allowing users to upload and access their personal videos, graphics, images, or photographs and deficient in allowing users to share media.

Systems have been developed that use hard disk technology or other recording technology to store videos of programs locally. Examples of hard disk systems are described, in Hassell et al. U.S. patent application Ser. No. 09/157,256 filed Sep. 17, 1996, which is hereby incorporated by reference herein in its entirety. Hard-disk based products have also been developed by TiVo, Inc. of Sunnyvale, Calif., and Replay Networks, Inc. of Mountainview, Calif. These systems have been deficient in meeting user needs. For example, these systems do not allow the user to relocate to other households with continued access to the recorded materials.

Television platforms have also been developed that include a return path from a user's set-top box to a cable system headend. For example, client-server based program guides have been developed in which set-top boxes are in client-server arrangements with the cable system headends. These arrangements allow for two-way communication between the cable system headends and set-top boxes. These servers typically provide program listings information (e.g., program titles and broadcast times) to the set-top boxes in response to requests generated from the set-top boxes. Client-server television program guides have also been developed where programming and settings may be recorded on a remote server. These known systems have been deficient in various ways. For example, servers in such systems (servers at the cable system headends) have been deficient in providing sufficient mobility features.

SUMMARY OF THE INVENTION

In accordance with the principles of the present invention, on-demand media delivery systems and methods may be provided for remote storage of personal media of users, for sharing of stored media and for features for relocating media-on-demand services. Such features and functionality may be provided based on storing user related information on an on-demand media delivering server. Such features may be provided independent of the type of equipment (e.g., set-top box, personal computer, etc.) that is used to interact with the system.

The system may have a relocate feature that may allow a user to freeze on-demand media delivery on one user equipment and resume delivery and viewing from another user equipment (e.g., user equipment in a household that is different from the household where that user was previously watching the on-demand media delivery content when that user froze the delivery). On demand media content that is presented in a live feed may be remotely recorded for a user when a user selects to freeze the delivery of the media content.

User-specific data may sometimes be stored in a user profile. The system may allow a user profile to be remotely accessed and manipulated by a user when that user has been identified by the system. A user may also upload or download any type of data, file, or program between local user equipment and a server in the on-demand media system. Uploaded data, files, or programs may be assigned private access rights or assigned public or group access rights. Access rights may include the right to read, write, manipulate, upload, or download data, files or programs.

An auto-customization feature may be included in the on-demand media system. An on-demand media system may use stored user equipment preferences to configure and customize user equipment. The user equipment may be configured or customized when a user logs in from practically any user equipment in the system. User equipment preferences may, for example, include volume settings, preferred program settings, menu configurations, and channel block settings.

These and other features and functionalities that take advantage of the special capabilities of on-demand media servers and take advantage of storing user related information and/or personal media on an on-demand media server are also described below.

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which:

FIG. 7A is a diagram that is illustrative of a relocate confirmation display screen in accordance with the principles of the present invention;

FIG. 7B is a diagram that is illustrative of a continue after relocate display screen in accordance with the principles of the present invention;

FIG. 7C is a flow chart that is illustrative of a relocation process in accordance with the principles of the present invention;

DETAILED DESCRIPTION

Figure 1:
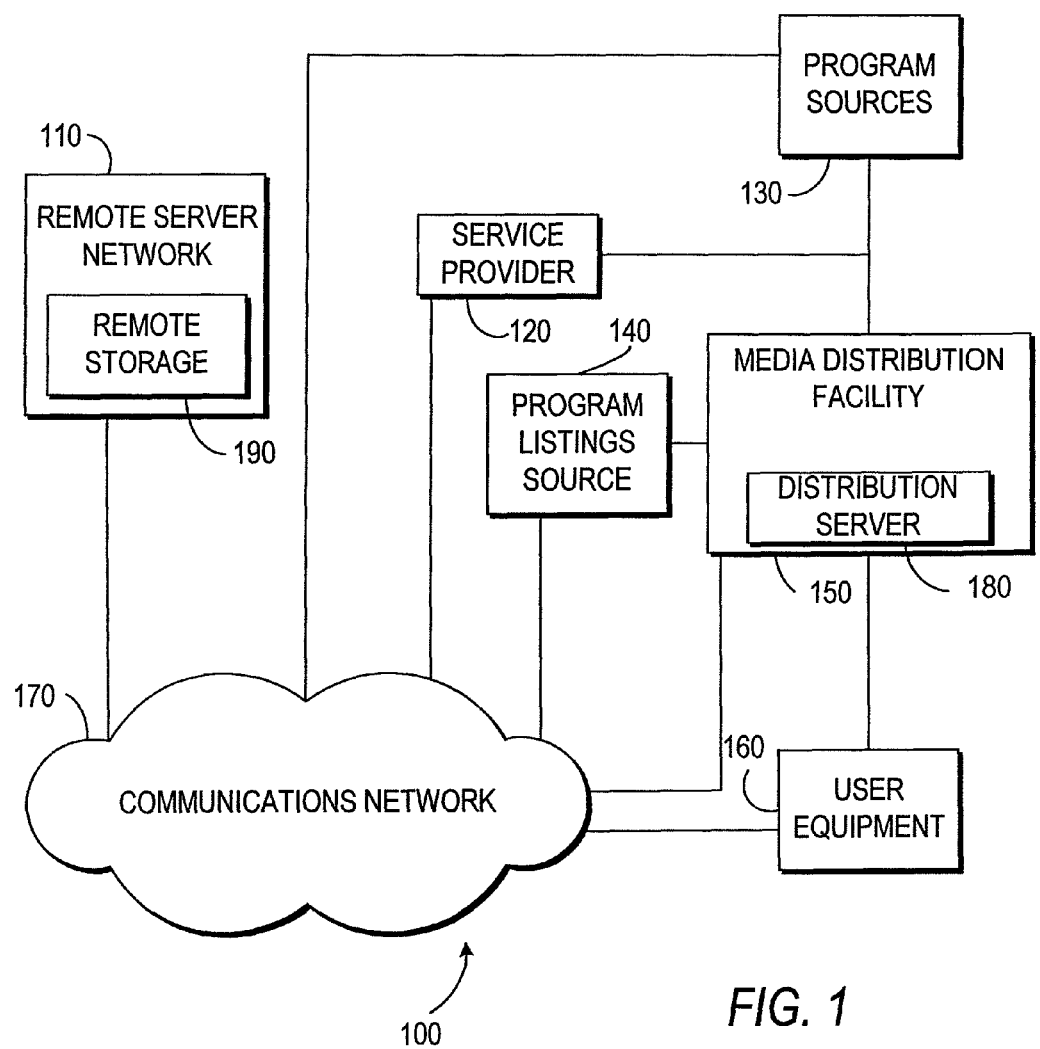
FIG. 1 is a diagram that is illustrative of a network topology of an on-demand media delivery system in accordance with the principles of the present invention.

Turning first to FIG. 1, network topology 100 shows one embodiment of a system architecture for an on-demand media delivery system in accordance with the principles of the present invention. Included in network topology 100 may be any number of remote server networks 110, service providers 120, program sources 130, program listings sources 140, media distribution facilities 150, user equipment 160, communications networks 170, distribution servers 180, and remote storage devices 190.

Media may be provided from programming sources 130 to media distribution facilities such as media distribution facility 150 either directly or through communications network 170. Programming sources 130 may be any suitable source of television or music programming, such as television and music production studios, etc. Additionally, programming sources 130 may provide programming that is to be broadcast according to a schedule (e.g., a schedule that is published in advance).

On-demand media programming may be provided using distribution server 180 or other suitable on-demand media equipment. On-demand media servers or VOD servers may be servers that are tailored towards storing, manipulating, and processing images and videos. Distribution server 180 may include a plurality of servers wherein some of which are specialized servers for supporting on-demand media services. If desired, distribution server 180 or other on-demand media equipment may be located at network nodes associated with media distribution facility 150 or other suitable locations in network topology 100.

Media distribution facility 150 may be a cable system headend, a satellite television distribution facility, a television broadcast facility, or any other suitable facility for distributing on-demand media content, television, and music programming to users.

Media distribution facility 150 may also be connected to various user equipment 160. Such user equipment 160 may, for example, be located in the homes of users. User equipment 160 may include, for example, user television equipment, user computer equipment, and user audio equipment.

User equipment 160 may receive television and music programming, on-demand media programs, and other information from media distribution facility 150 either directly or through communications network 170. User equipment 160 may also transmit and receive signals from media distribution facility 150, remote server network 110, and any other device in network topology 100 through communications network 170.

Program listings source 140 may be used to provide user equipment with television program listings information such as scheduled broadcast times, titles, channels, ratings information (e.g., parental ratings and critic's ratings), detailed title descriptions, genre or category information (e.g., sports, news, movies, etc.), information on actors and actresses, running times, etc. Program listings source 140 may provide program listings information to television distribution facility 150 either directly or indirectly through communications network 170.

User equipment 160 may use the program listings information to display program listings and program information for television programming, for on-demand media programming, and for PVR programming. An interactive television program guide application or other suitable application may be used to display such information on a display device that is part of user equipment 160.

Communications network 170 may provide a communications hub between the elements in network topology 100. Communications networks 170 may include a number of different networks such as a public switched telephone network, a packet-based network, a wireless network or the Internet.

An on-line program guide may be provided by a server located in remote server network 110, in distribution server 180, or by a server located in any element included in network topology 100. Remote server 110 may include remote storage 190. Remote storage 190 may be used to store software, media content, and data. In some embodiments, remote storage 190 may provide a user interfacing with user equipment 160 with the capability to store, manipulate, and retrieve media content, user-specific data, and any other type of data.

Remote server network 110 may include one or more VOD specialized servers. VOD servers are tailored towards storing, manipulating, and processing images and video. For example, VOD and VOD-related servers have been developed by Concurrent Computer Corporation of Atlanta, Ga., nCUBE of Foster City, Calif., DIVA Systems Corporation of Princeton, N.J., and SeaChange International of Maynard, Mass.

Interactive television applications other than program guide applications may use service providers such as service provider 120. For example, a home shopping service may be supported by a service provider such as service provider 120 that has sales representatives, order fulfillment facilities, account maintenance facilities, and other equipment for supporting interactive home shopping features. A home shopping application that is implemented using the user equipment may be used to access the service provider to provide these features to the user. The user equipment may access service provider 120 via media distribution facility 150 or via communications network 170.

If desired, applications such as interactive television program guide applications, home shopping applications, home banking applications, and other applications (e.g., applications related to e-mail and chat or other communications functions, etc.) may be provided as separate applications. These separate applications may be accessed through a navigation shell application (e.g., a menu application with menu options corresponding to the applications). Additionally, the features of such applications may be combined. For example, on-demand media, home shopping, and communications functions may be incorporated into the program guide or other application.

These applications or features may be implemented locally on the user equipment. The applications or features may also be implemented using a client-server architecture in which user equipment serves as a client processor, and a server, such as distribution server 180, at media distribution facility 150 or at some other suitable location acts as a server processor. Other distributed architectures may also be used if desired.

Examples of client-server program guides are shown in Ellis et al. U.S. application Ser. No. 09/332,244, filed Jun. 11, 1959, which is hereby incorporated herein in its entirety. Examples of interactive television program guide systems with integrated program listings and video-on-demand display screens are shown in Walker et al. U.S. application Ser. No. 09/829,856, filed Apr. 10, 2001, which is hereby incorporated herein in its entirety. For clarity and brevity, FIG. 1 is illustrated to include only one of each of the elements that are shown therein. However, in implementation, network topology 100 may include more than one of the elements that are shown therein. For example, network topology 100 may include multiple media distribution facilities 180, multiple user-equipment 160, multiple distributions servers 180, etc.

Figure 2:
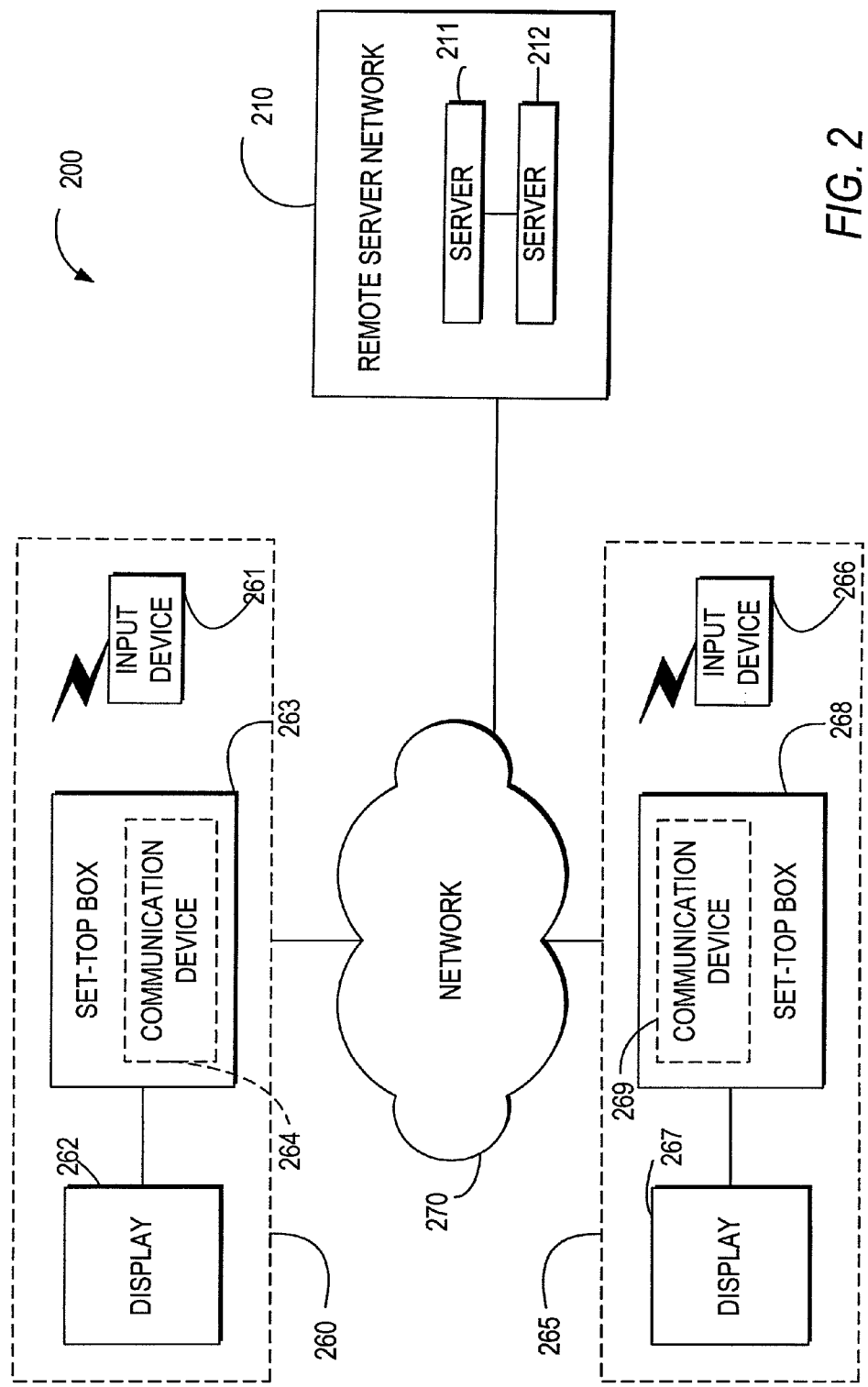
FIG. 2 is a diagram that is illustrative of a network topology of an on-demand media delivery system in accordance with the principles of the present invention.

Turning next to FIG. 2, network topology 200 includes select elements from network topology 100 of FIG. 1 and expands on possible arrangements for such elements.

Network topology 200 may include user equipment 260 and 265, server network 210, and communications network 270. User equipment 260 and 265 are both included in network topology 200 to better illustrate the level of equipment independency that may be obtained in on-demand media delivery systems.

User equipment 260 and 265 may provide a user with the capability to display, retrieve, record, and manipulate user-specific data, on-demand media content, and on-demand media data. User equipment 260 and 265 may be user equipment 160 of FIG. 1. Additionally, user equipment 260 and 265 may include input devices 261 and 266, display devices 262 and 267, set-top boxes 263 an 268, and communication devices 264 and 269 respectively.

Input devices 261 and 266 may allow a user to access, control, or communicate with devices in user equipment 260 and 265 respectively. When used in conjunction with communication devices 264 and 269, a user may communicate with, access, or program certain devices in network topology 200 via communications network 270. Examples of input devices 261 and 266 may include, for example, remote controls, keyboards, voice recognition devices, and control panels located on the devices in user equipment 260 and 265.

Display devices 262 and 267 may provide a medium on which on-demand media content and data may be presented or displayed to a user. Examples of display devices that may generally be used may include, for example, television sets, personal digital assistants (PDA's), computer monitors, and cell phones. Display devices 262 and 267 of FIG. 2 may be television sets, monitors, or other suitable display devices. Display devices 262 and 267 may not be limited to only visual forms of presentation. For example, if desired, on-demand audio content and data may be presented and displayed audibly to the user by display devices 262 and 267. Display devices may also include, for example, speakers, radios, sound-systems, and earphones.

Set-top boxes 263 and 268 may be capable of retrieving and sending on-demand media content and on-demand media data to devices located outside of user equipment 260 and 265 through communication devices 264 and 269. Examples of communication devices 264 and 269 may include, for example, local servers, telephone or cable modems, infrared ports, and wireless LAN access points. Set top boxes 263 and 268 may also contain processing and storage capabilities as well as software needed for an on-demand media delivery system. Examples of software implemented on set-top boxes 263 and 268 may include, for example, interactive television program guide applications.

For clarity and brevity, user equipment 260 and 265 are illustratively shown to include set-top boxes 263 and 268. However, in some embodiments, user equipment systems 260 and 265 may include a personal computer that has sufficient hardware and software capability to perform the functionality described herein or may include other devices with capabilities similar to set-top boxes. If desired, user equipment may include local storage devices such as a VCR, or a digital video recorder that may provide conventional data recording and storage capabilities.

Communications network 270 may provide a communications hub and communications medium for the devices of network topology 200. Persons skilled in the art will appreciate that communications network 270 has been provided in network topology 200 to illustrate the many different ways that the devices of network topology 200 may be connected together. Communications network 270 may represent connections such as direct connections network connections, or combinations of direct and network connections for devices in network topology 200. Communications network 270 may include, for example, routers, switches, wide area networks, the Internet, LANs, intranets, wireless LANs, repeaters, landline networks, PSTN, PABX, cable television systems, etc.

Remote server network 210 may provide a remote location in which on-demand media content and on-demand media data may be stored. Remote server network 210, which may be an on-demand media server, may be configured to store, access, and manipulate user-specific data in addition to the on-demand media content and the on-demand media data. If desired, remote server network 210 may provide a communications hub between user equipment 260 and 265 and other elements in network topology 200. Furthermore, remote server network 210 may be part of a media distribution facility or cable system headend.

Remote server network 210 may also include any number of remote servers 211 and 212. Examples of remote servers 211 and 212 may include virtual servers, routing servers, queuing servers, storage servers, media servers, or any other type of server. Remote server network 210 may include one or more servers.

User equipment platform independent on-demand features may be provided to users for accessing, manipulating, or storing on-demand media content and on-demand media data, and also for accessing, manipulating, or storing user-specific data.

Figure 3:
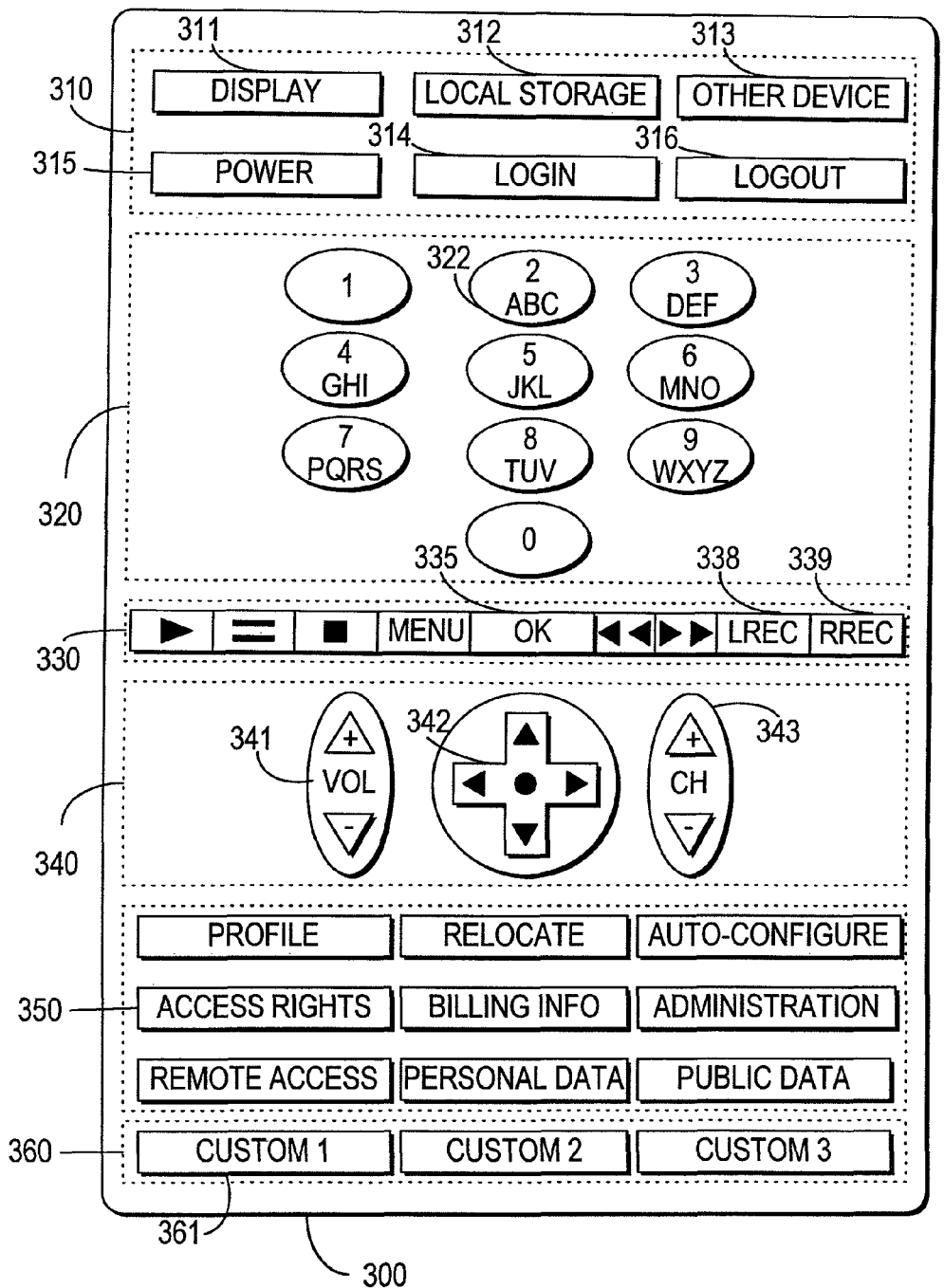
FIG. 3 is a diagram that is illustrative of a remote control for an on-demand media delivery system in accordance with the principles of the present invention.

FIG. 3 shows illustrative remote control 300, which may be used as an input device for user equipment. Remote control 300 may include, for example, primary option buttons 310, alpha-numeric buttons 320, task buttons 330, control buttons 340, secondary option buttons 350, and custom buttons 360. Other arrangements of some or all of the buttons may also be used.

Primary buttons 310 provide a user with access to frequently used actions in an on-demand media delivery system. Primary buttons 310 may include display button 211, local storage button 312, other device button 313, power button 314, login button 315, and logout button 316. Display button 311, local storage button 312, and other device button 313 may be used to identify the device with which the user seeks to interact. Login and logout buttons 315 and 316 may allow a user to communicate his or her identification to the on-demand media system. This identification may be communicated through alpha-numeric buttons 320.

Alpha-numeric buttons 320 may be used to enter, for example, numbers, letters, or an alpha-numeric string. Alpha-numeric buttons 320 may be used in conjunction with other buttons of remote control 300. For example, if login button 315 is pressed, alpha-numeric buttons 320 may be used for alpha-numeric entry of identification information.

Task buttons 330 may provide means for directing a task to be performed by a device in the on-demand media delivery system. For example, "LREC" button 338 may be used to have a local VCR record media content that is currently being displayed by the user equipment. If "RREC" button 339 is used, currently displayed media content may be recorded on a server in a remote server network. Task buttons 330 may include, for example, play, pause, record, stop, menu, confirm, rewind, fast-forward, local record, and remote record buttons or any other task button.

Control buttons 340 may include volume control buttons 341, navigation buttons 342, and channel control buttons 343. Navigation buttons 342 may be used to adjust or move a desired element (e.g., a cursor, a highlight window, etc.) either vertically, horizontally, or both. For example, if the desired element is a cursor on an interactive program guide display screen, navigation buttons 342 may be used to move the cursor in the display screen. The "OK" key in task buttons 330 may be used in combination with navigation buttons 342 to select on-screen options.

Secondary buttons grouping 350 may include, for example, profile access, relocate, auto-configure, access rights, billing information, administration, remote access, personal data, and public data buttons. Some of these features are further discussed below.

Custom buttons grouping 360 may include buttons associated with any actions or commands that are pre-defined by a user. If desired, other keys and options may be included on remote control 300. Functions shown on remote control 300 of FIG. 3 may alternatively be offered as on-screen options or using other input means (e.g., voice input).

Figure 4A:
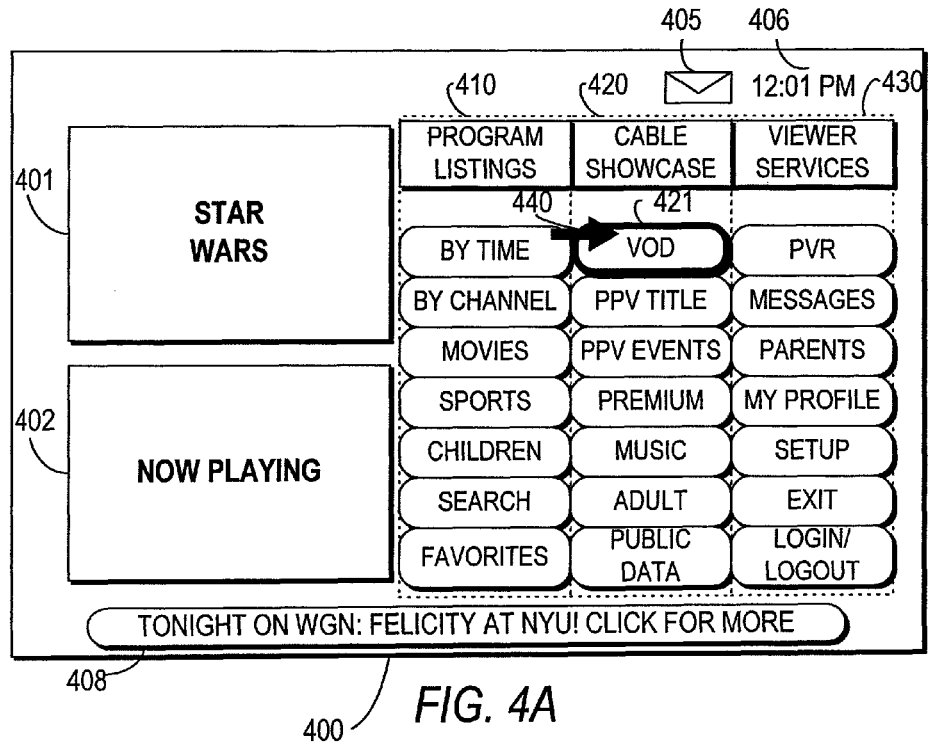
FIG. 4A is a diagram that is illustrative of a navigation display screen in accordance with the principles of the present invention.

FIG. 4A shows illustrative navigation display screen 400 that may be used as a top-level display screen for an on-demand media delivery system in accordance with the principles of the present invention. Navigation display screen 400 includes media windows 401 and 402, mail prompt 405, time label 406, quick fact button 408, program listing options 410, cable showcase options 420, and viewer services options 430.

Media windows 401 and 402 may be used to display user-selected media content, system-selected media content, interactive advertisements, or other content displayed through user equipment. Media windows 401 and 402 may be removed, relocated, or resized in display screen 400.

Mail prompt 405 may be displayed to indicate new messages or selected by a user to read electronic mail or to prepare and send electronic mail. Time label 406 may be used on display screen 400 to display the current time to a user. Time label 406 may be tailored by the user to also display other time critical information. Quick fact button 408 may display a fact of possible interest (e.g., an interactive advertisement) in display screen 400. Quick fact button 408 may be selected to take further action or to display a related display screen.

Program listing options 410 may include options for viewing program listings by time, by channel, or by genre (e.g., sports, children, etc.). Program listings options 410 may also include an option for searching for programs of interest (e.g., using keywords, based on a title search, based on an actor search, etc.). Program listings options 410 may include an option to view a user's favorite program listings.

Cable showcase options 420 may include options for accessing video-on-demand program listings, pay-per-view program listings, pay-per-view event listings, premium program listings, music program listings, or adult program listings.

A highlight window or cursor may be used to move within a display screen. For example, cursor 440 may be used to select options in display screen 400. Remote control 300 (FIG. 3), particularly navigation buttons 342 (FIG. 3), may be used for moving cursor 440 within display screen 400. The area upon which cursor 440 is positioned over may be selected by pressing a select, enter, or OK key, such as remote control button 335 of FIG. 3.

Screen 400 may also contain viewer services options 430. Suitable viewer services options 430 may include, for example, an option to access features and/or information from a personal video recorder, an option to access messages (either e-mail messages or messages provided from a television system service provider), an option to adjust parental control settings (e.g., blocked channels or ratings, etc.), an option to set or view profile data (e.g., favorite channels, etc.), an option to set up the program guide or user equipment, an option to exit display screen 400, and an option to login to the system.

For brevity and clarity, programming and other media that is available for viewing, but is without a scheduled air time is primarily discussed in the context of video-on-demand programming.

Figure 4B:
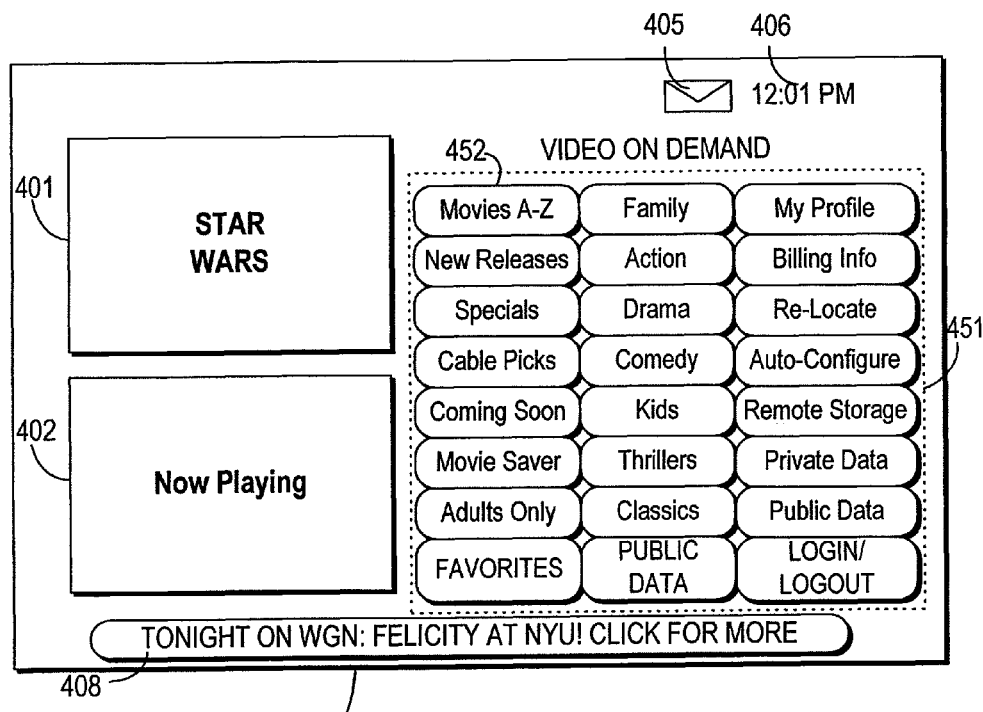
FIG. 4B is a diagram that is illustrative of a video on demand directory display screen in accordance with the principles of the present invention.

If the user selects video-on-demand (VOD) option 421, the program guide may present the user with a screen such as video-on-demand display screen 450 of FIG. 4B. Display screen 450 may contain various options that allow the user to view video-on-demand program listings organized by different criteria such as genres (e.g., family, action, drama, comedy, kids, thrillers, classics, etc.). If the user selects movies A-Z button 452 of display screen 400, the program guide may present display screen 500 of FIG. 5A in which video-on-demand program listings are listed alphabetically.

Active area 507 may be present in many different display screens. Active area 507 may be an interactive advertisement. Illustrative ordering display screen 550 of FIG. 5B may be displayed when a user selects a VOD listing such as a listing for Star Wars from display screen region 540 of FIG. 5A or from active area 507 of FIG. 5A. Video-on-demand ordering display screen 550 may be displayed through any other suitable technique.

Display screen 550 may contain information region 552 that includes information on the title, purchase price, running time, rating, and other information related to the user's selection. A detailed information region such as information region 551 may also be displayed. Region 551 may include a detailed description of the VOD listing, information on the actors in the movie, the running time, the year of release, etc.

Figure 5A:
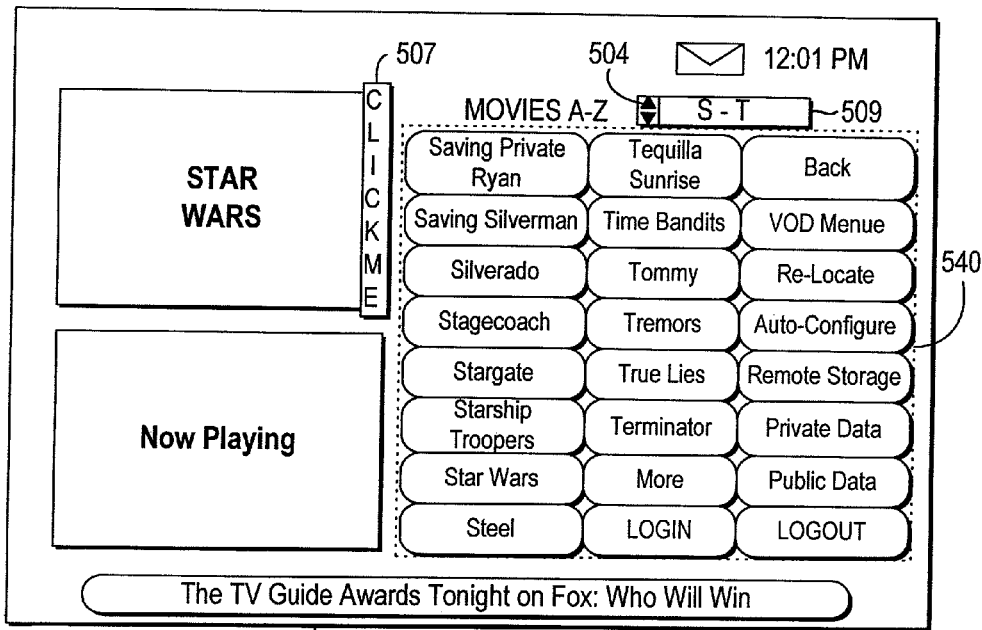
FIG. 5A is a diagram that is illustrative of a movie listings display screen in accordance with the principles of the present invention.
Figure 5B:
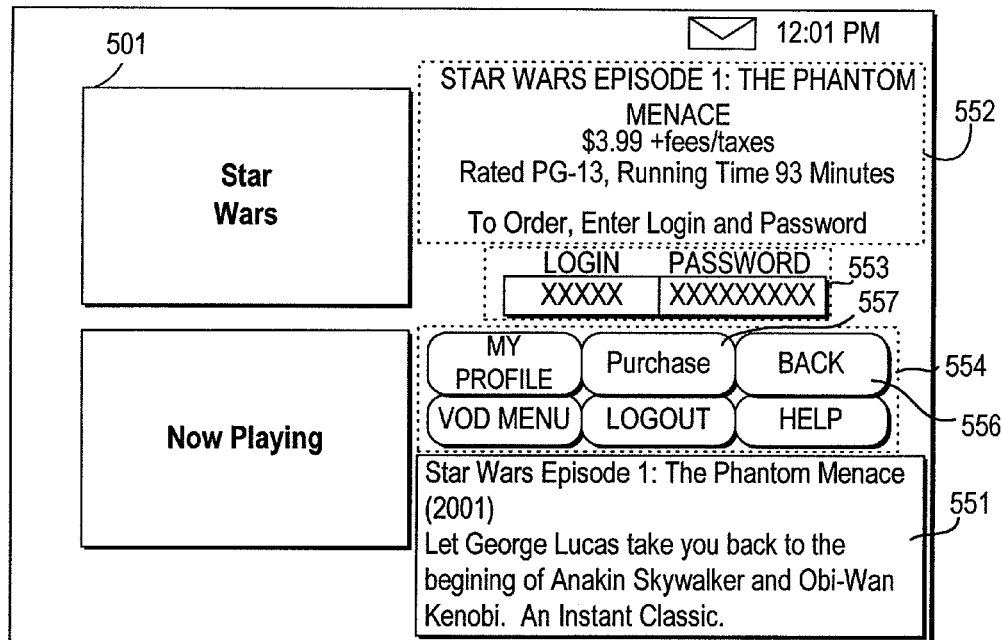
FIG. 5B is a diagram that is illustrative of a movie ordering display screen in accordance with the principles of the present invention.

If the user selects back option 556, the user may be taken back to display screen 500 of FIG. 5A. If the user desires to purchase the video-on-demand program, the user may use remote control 300 of FIG. 3 to enter the user's login identification and associated password information. Other user identification techniques may also be used. These identification structures may support the entry, for example, of a purchase code or personal identification number (PIN) in region 553.

Figure 6A:
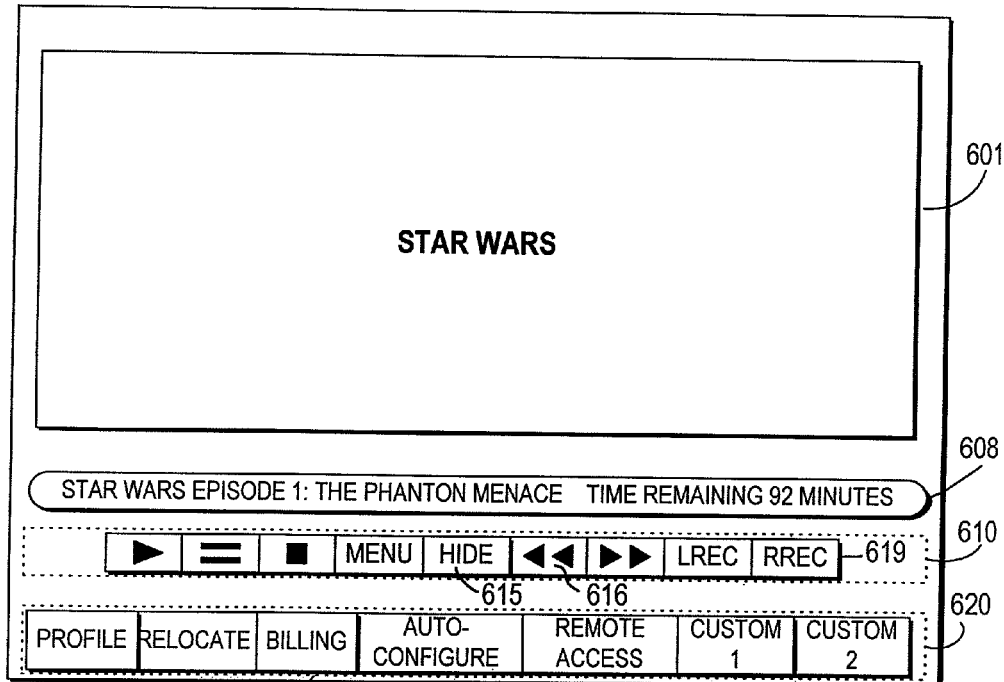
FIG. 6A is a diagram that is illustrative of a movie remote-control display screen in accordance with the principles of the present invention.

When valid login information is entered and a purchase button is selected (e.g., button 557), the distribution of the selected video-on-demand program may be authorized to the user from server 180 or remote server network 110 of FIG. 1 or other suitable distribution source to the user who is currently logged into the system. The requested video-on-demand program may be displayed in display screen 600 of FIG. 6A.

Region 608 may be displayed in display screen 600 and may contain information on the program title and the time remaining in the current video-on-demand program. Region 608 may also contain a selectable advertisement. Region 608 may be provided as an overlay over the video-on-demand program that is being presented, as an L-shaped frame region surrounding a reduced-size video window, or in any other suitable configuration or layout. Region 608 may be invoked whenever a user presses an appropriate key on remote control 300 of FIG. 3 and may be removed, for example, after a specified period of inactivity.

Primary on-screen control options 610 may be included in display screen 600 to give users one way of controlling the on-demand media content being displayed in window 601. Primary control options 610 may be selected by the user, for example, to play, pause, stop, rewind, record locally, record remotely, or fast-forward the video-on-demand program. Hide option 615 may also be included in control options 610. When selected, hide option 615 may remove all elements other than window 601 from display screen 600.

When the user selects a control command, the program guide may direct server 180 of FIG. 1, a server located in remote server 110, or other suitable equipment to perform the requested function. For example, when the user selects the remote record option 619, the program guide may direct the server in remote server network 110 to record the video-on-demand program on the relevant storage space 190. When the user selects record option 619, the server may record some or all of the video-on-demand program that is currently available to the user. These are merely illustrative examples and any suitable technique for handling video-on-demand recordings may be used if desired.

If the user selects rewind option 616, the program guide may direct the appropriate device, such as server 180 of FIG. 1, to skip to an earlier portion of the video-on-demand program. A real-time rewind process may be used in which the video-on-demand programming is displayed during the rewind operation. Commands for pausing, playing and fast-forwarding may be handled similarly.

Figure 6B:
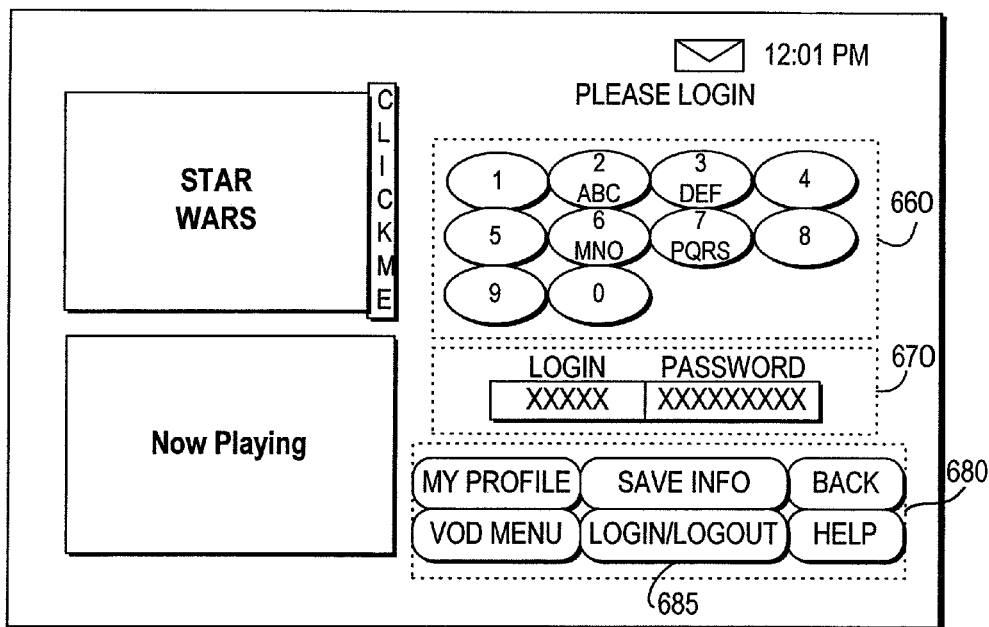
FIG. 6B is a diagram that is illustrative of a login display screen in accordance with the principles of the present invention.

FIG. 6B shows illustrative primary login display screen 650. Login display screen 650 may include an enter identification region 670 in which user identification may be entered by a user (e.g., using alpha-numeric keypad 660). Additionally, options region 680 may be included in display screen 650. Options region 680 may include options that are be used to access, for example, a user's profile, a prior display screen, help information, a VOD menu, and/or login/logout options. Once an appropriate identification information is entered into identification region 670, a user may use login/logout button 685 to send the user's identification information to remote server network 110 or any other suitable device in network topology 100 of FIG. 1. Other techniques for login may also be used. For example, if a user has already been identified by the user, the system may not be required to submit further information.

A relocate feature may be included in the on-demand media system. This relocate feature may allow a user to freeze media-on demand content being presented on one user equipment and switch to some other user equipment to resume the presentation of the media on-demand content (i.e., resume from the point at which the user had frozen the content). The user equipment may be equipment such as user equipment 260 and 265 of FIG. 2. If the user wants to continue watching the on-demand media content at a friends house (e.g., user equipment system 265 of FIG. 2), the user may only have to use the relocate feature to freeze the on-demand media content and relocate to the friend's house to resume the on-demand media content.

FIG. 7A shows an illustrative relocate feature confirmation display screen 700. Display screen 700 may be displayed when a command from remote control 300 of FIG. 3 is selected or when an appropriate option on an on-demand media display screen is selected to indicate a user's interest to freeze the program. If a user wants to confirm a freeze request, option 710 may be selected. If a user does not want to confirm the freeze request, option 720 may be selected. If desired, a user may freeze a VOD program by simply selecting the relocate feature from a remote control or from an earlier on-screen menu. If the user has not previously logged in or otherwise been identified, the user may be asked to log in or to provide identification information when making a freeze request.

FIG. 7B shows illustrative relocation display screen 750 that may be displayed when a command from remote control 300 of FIG. 3 is selected or when an appropriate option on an on-demand media display screen is selected to resume on-demand media that was frozen earlier by the user. Option 740 may be selected if a user wants to start to view the media from the frozen point on user equipment that is different (e.g., different household, different subscriber site, different room, different equipment platform, etc.) than that which was used to freeze the media.

When a user selects continue option 740, the media may be presented on the current user equipment starting from the frozen point. If desired, media may be queued to the frozen point for presentation to a user when a user who had previously selected a freeze (or relocated) option logs into the system. Also, if desired, the media may be queued selectively upon user request (e.g., user selects a resume from frozen point option). If the user has not previously logged in or otherwise been identified, the user may be asked to log in or asked to provide identification information when making a resume request. The system may also allow the user to select from multiple programs which may have been previously frozen by the user.

When the relocate feature is first selected by a user, remote server network 110 of FIG. 1 may, for example, pause the on-demand media content being viewed by the user and store a content location reference to an appropriate user-specific account. After the user switches to a different location and requests that the paused content be appropriately delivered, remote server network 110 may retrieve the appropriate content location reference and continue delivering the media content from the point at which the user paused the content. Before the media content may be delivered, the remote server network may require that the user be identified so that the appropriate user-specific data and/or a user-specific account information, may be located and accessed.

User-specific data or account information may be stored in a section of remote server network 110 (FIG. 1) dedicated to the user. Remote server network 110 (FIG. 1) may be a VOD server that is configured to store such information and data. An account on remote server network 110 (FIG. 1) may also be used to store that user's personal images or video. Remote server network (FIG. 1) may allow users to access their personal images or videos from their own home or from user equipment at other locations.

FIG. 7C is a flow chart of illustrative relocation process 760 that shows how data is stored and accessed when a relocate feature is selected. Process 760 begins with start step 761 that may include almost any interaction with the media-delivery system that results in the relocation feature being presented to the user. Start step 761 may, for example, be a user interaction that brings up relocate display screen 700 of FIG. 7A. At step 762, a user may be given an opportunity to choose or confirm the relocate feature.

If desired, step 762 may include step 771 for identifying a current user (e.g., identifying a current user on a first user equipment). User identification step 771 may provide the user with the ability to log into the on-demand media system, which may include prompting the user for an identification and/or password. Step 771 may be performed, for example, in response to a user selecting the relocate feature.

If desired, step 771 may be part of start step 761 to allow the system to identify the current user before the relocate feature is selected by the user.

The on-demand media system may then save the user's current position (step 763) when the user selects the relocate feature. Saving the current position may involve, for example, saving a pointer that identifies where the media content was 'frozen' or paused by the relocate feature. If the user was identified in step 771, process 760 may store any data relevant to the operation of the relocate feature in storage space associated with the user. If desired, saving the current position may involve recording the media content from the point at which the relocate feature was chosen. At step 764, process 760 may enter an idle mode until a user selects to resume reception. Step 764 may include step 772 for identifying the current user (e.g., identifying a current user on a second user equipment). Step 772 may be performed when a user selects to resume media using the relocate feature. At step 772, the system may provide a current user with the ability to log into the on-demand media system, which may include prompting the user for an identification and/or password. If desired, step 772 may be performed before the current user selects to resume media using the relocate feature.

At step 765, the location of the media content that was being viewed when the relocate feature was initially selected may be retrieved. If the user was identified in step 772, data associated with the operation of the relocate feature may be retrieved from storage space associated with the current user.

If a pointer was stored, the system may find the correct location of content in the on-demand media delivery system using the pointer and continue playing the media from that point (Step 765). If desired, the media may have been remotely recorded from the point at which the relocate future was selected. In such embodiments, the system will simply begin playing content from the point at which the content was recorded. After the content has been successfully retrieved and resumed, finish step 766 may occur which may denote the end of process 760.

Figure 8:
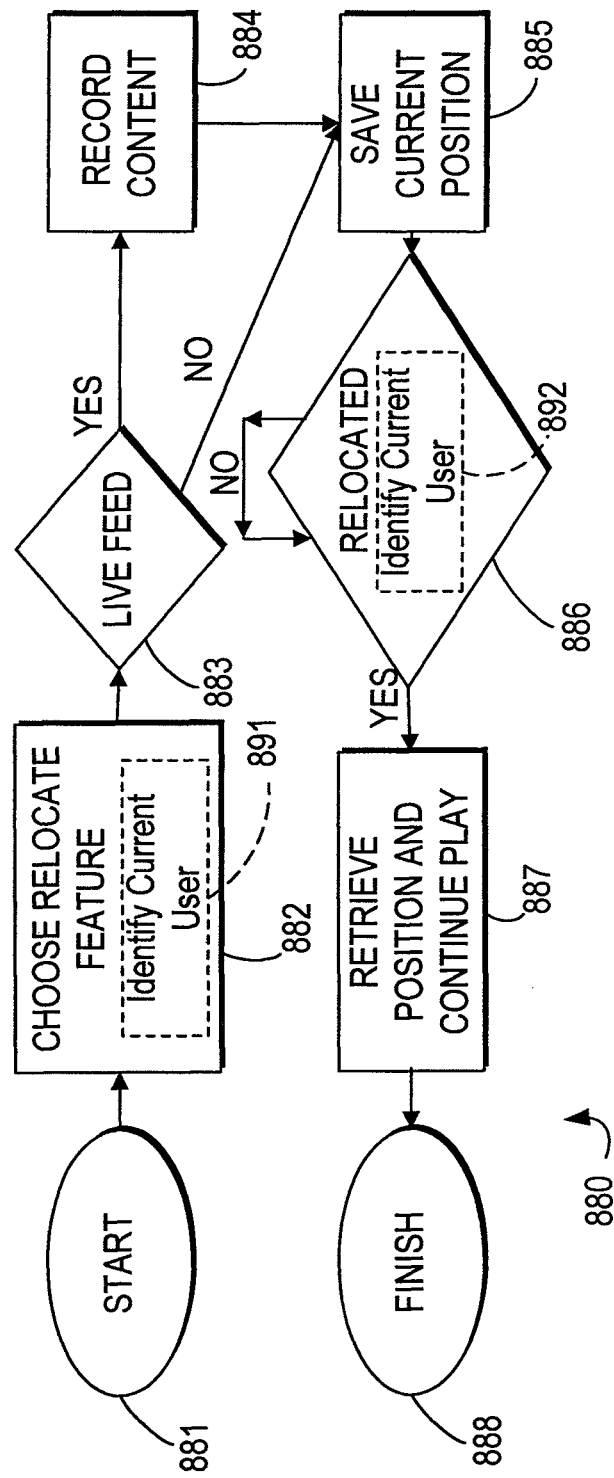
FIG. 8 is a flow chart illustrative of a relocation process that includes a live content feed option in accordance with the principles of the present invention.

FIG. 8 illustrates relocation process 880 and is similar to process 760, but includes the possibility of relocating while watching live content. Steps 881, 882, 891, 886, 892, and 888 are essentially the same as steps 761, 762, 771, 764, 772, and 766 of FIG. 7C, respectively. At live feed check step 883, the system may determine if the current media is a live feed. If the media is not a live feed, step 885 is performed, which involves storing the current position of the media. If the media is a live feed, the media may be remotely recorded at step 884. After step 884 occurs, the position of the media may be stored at step 885. If desired, the position of the media may be stored in the form of a pointer. During step 886, the system may be in an idle state, waiting for the user to indicate that the user has relocated to new user equipment. If desired, process 880 may include steps 891 and 892 at particular points in process 882 as shown and/or discussed above in connection with steps 771 and 772 of FIG. 7C for identifying a current user at a first user equipment and at a second user equipment when a user has relocated to the second user equipment. After a user has relocated, the system may, in step 887, determine the stored media position, retrieve the stored media position, and then continue playing the media from the stored media position. Once play commences, finish step 888 is reached and the user is successfully relocated.

A remote on-demand media server may be configured to store and deliver user-specific media (e.g., pictures, videocam recordings, etc.), or user uploaded data or media. Access to such data and media may be controlled in a variety of ways.

Figure 9:
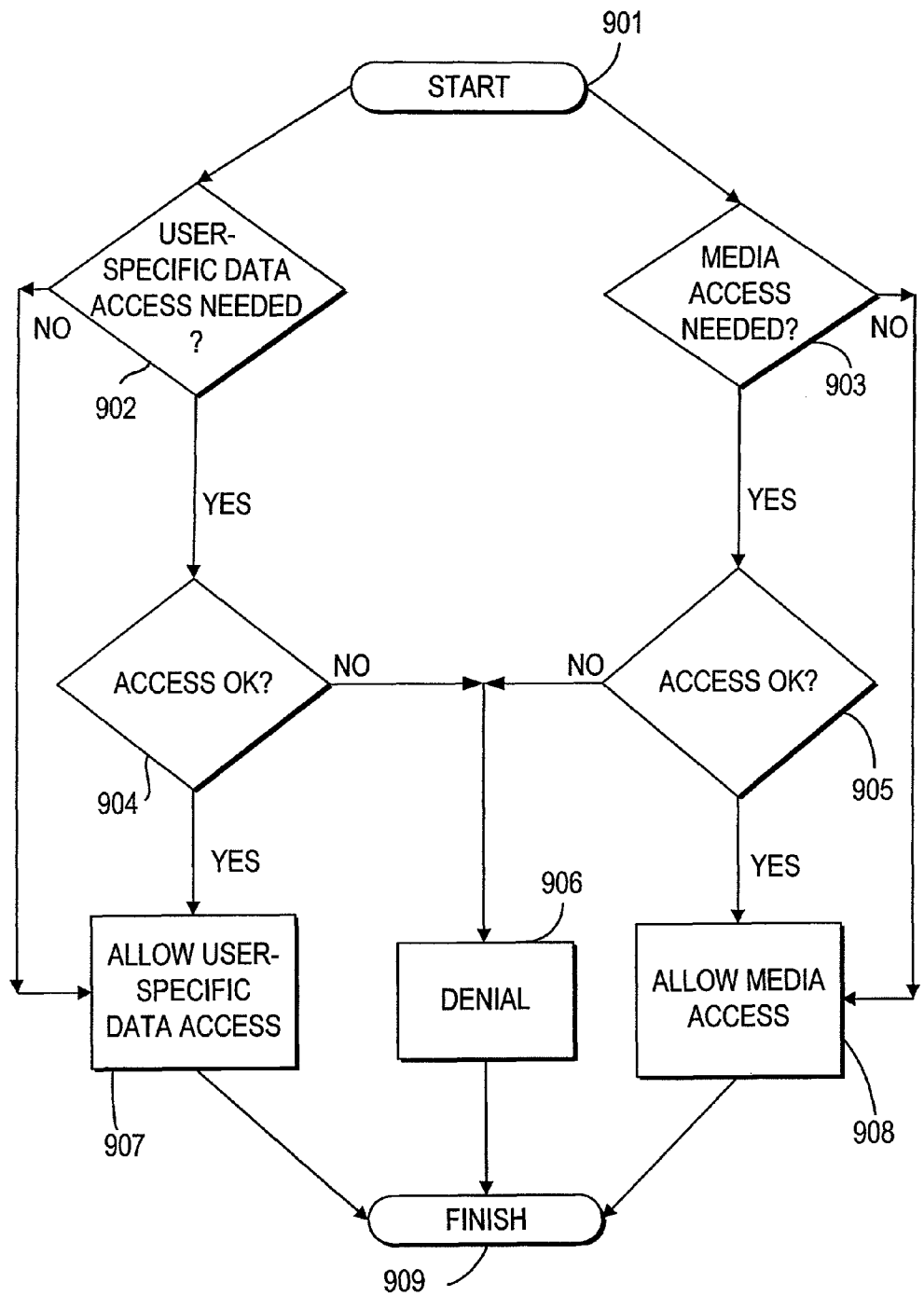
FIG. 9 is a flow chart that is illustrative of a data and media access process in accordance with the principles of the present invention.

FIG. 9 shows illustrative data and media access process 900 for remote servers. At step 901, a static request from the on-demand media system or a manual request from a user interfacing with user equipment may be received. The request may be associated with the retrieval of media content or user-specific data.

To retrieve media content, server 180 of FIG. 1 may be accessed. At step 902, in response to a request for user-specific data, the appropriate device in network topology 100 of FIG. 1 may be checked to determine if any type of authorization is needed to access the requested data. At step 903, in response to a request for media content, the system may check appropriate devices in network topology 100 of FIG. 1 to determine if any type of authorization to access the requested media content is needed.

If access to the data or media does not need any type of authorization, the data or media may be retrieved and the user may be provided with an opportunity to access the data or the media at steps 907 and 908. Data or media that may not require access privileges may include, for example, data or media defined by a user as public.

If authorization is needed, then at step 904 or at step 905, a request may be sent to determine if the user has permission to access the desired data or media. Steps 904 and 905 may include asking the user for an account identity and/or password. At step 906, users may be denied access when the users have not been given access rights for the desired data or media. If a user does have permission to access the desired data or media, the user may be given access to the data at step 907 or access to the media at step 908.

If desired, steps 902 and 903 may be combined. If desired, steps 904 and 905 may be combined. Also if desired, 907 and 908 may be combined.

As mentioned above, the on-demand media system realizes many unique features in utilizing the capabilities of remote storage and remote access. Some of such unique features may be realized in connection with remotely stored user profiles or remotely stored user accounts.

An on-demand media delivery system may have an account for a user or a group of users (e.g., a household) that may be used to store user profiles for users associated with the account. A user profile may act as a governing data structure through which user-specific data and on-demand media content and data may be accessed, stored, and retrieved.

Remote server network 110 of FIG. 1 may be partitioned and formatted to include a user account for any user or group of users in which account-specific data and on-demand media content may be stored, manipulated, and accessed.

Figure 10:
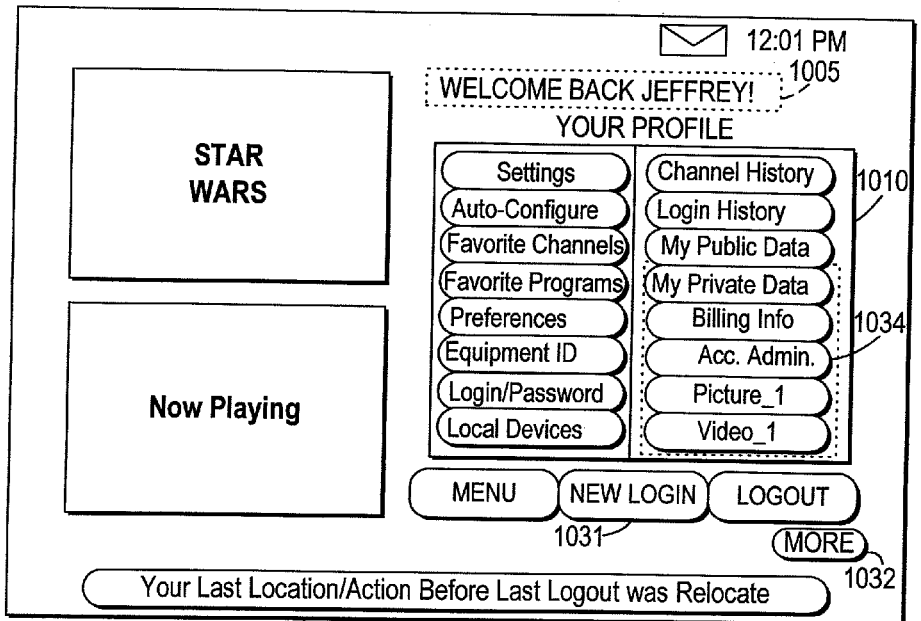
FIG. 10 is a diagram that is illustrative of a profile display screen in accordance with the principles of the present invention.

FIG. 10 shows illustrative profile display screen 1000 that may include user identification information 1005 to show who is currently recognized by the system. If a new user wishes to login, new login option 1031 may be selected and a login display screen such as display screen 650 of FIG. 6B may be initiated. If the user desires an option that is not present on display screen 1100, more options button 1032 may be selected.

Region 1010 includes a number of different user-selectable options such as a preferences option as shown. These options may allow the user to access or use locally or remotely stored data or media when the user is logged into the system.

Figure 11:
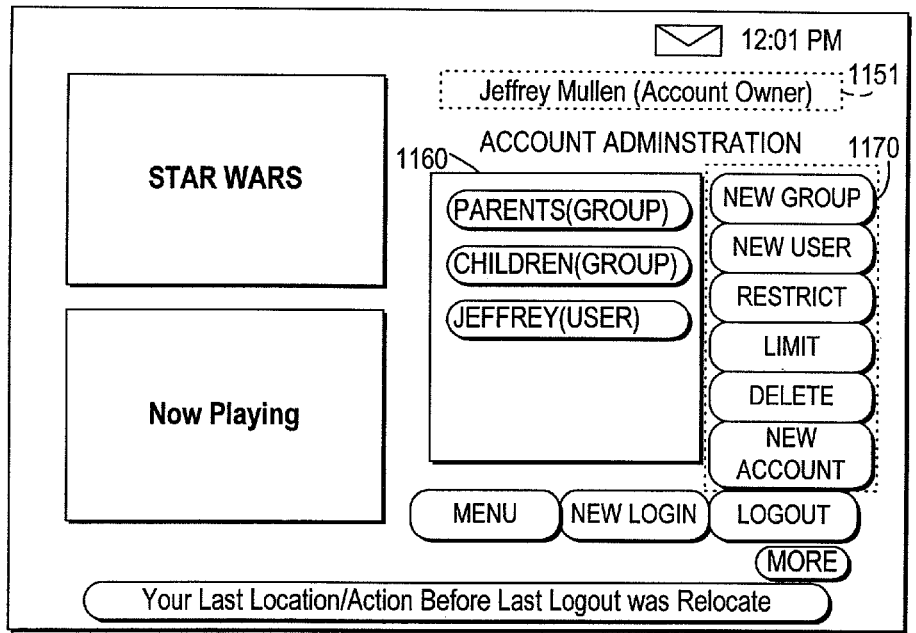
FIG. 11 is a diagram that is illustrative of an account administration display screen in accordance with the principles of the present invention.

FIG. 11 shows illustrative account administration display screen 1150 that may be displayed when account administration option 1034 of FIG. 10 is selected. Account information 1151 may be displayed on display screen 1150 to show which user is currently recognized and to identify the administrative position of that user. Account administration window 1160 may be located on display screen 1150 and may contain a list of users or groups that are under the recognized user's account. The recognized user may change the properties of the users or groups in window 1160 through administrative controls 1170. A user may change properties of a user or a group by first selecting a user or group from window 1160 (e.g., pressing a data entry key when a highlighted window is positioned over a user or group) and next positioning a cursor or highlight window on one of the options in controls 1170 to take desired action. Examples of controls that may be included in administrative controls 1170 may include, for example, add now group, add new user, restrict group, restrict user, limit group, limit user, delete group, delete user, create a new account for a user, and create a new account for a group.

Storing user-specific data such as the user's preferences (e.g., preferences in general, preferences for on-demand media, etc.) in a remote server such as a VOD server may allow for a personal auto-configure feature that would follow a user to move from equipment to equipment. This feature may allow preferences to be retrieved and executed by user equipment after the user has been identified by the system (e.g., identified by a remote server network). Some categories of preferences and user-specific information that may be used in an auto-configure feature may include, for example, volume settings, favorite channels, reminders, information about user-recorded on-demand media content, the user's last activity, auto-record times, as well as any other preference or activity. For example, after a user is verified by a remote server network, the user equipment may selectively or automatically be configured to match or use some or all of the user's remotely stored preferences.

Figure 12:
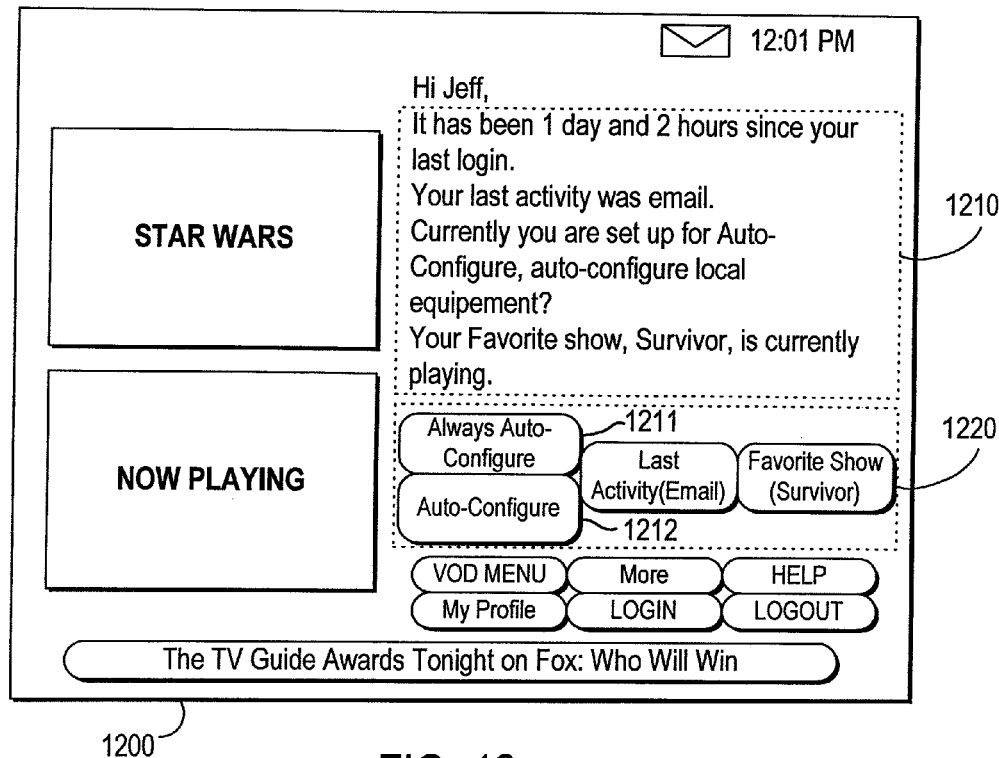
FIG. 12 is a diagram that is illustrative of an auto-configure display screen in accordance with the principles of the present invention.

FIG. 12 shows illustrative auto-configure display screen 1200, which may be initiated after a user has logged in via a login display screen (e.g., display screen 650 of FIG. 6B). Display screen 1200 may allow a user to select have user equipment auto configured. The user equipment may be user equipment that is currently being used that user. The user equipment may be auto-configured by downloading user-related data and information and processing the data and information on the user equipment to suit the current user.

Information region 1210 may be present on display screen 1200 and may include data from a user's profile or data related to a user's login. Configure options 1220 may be included on display screen 1200. Information stored in a user's profile may be accessed to perform a number of activities when one of options 1220 are selected. The options displayed among in configure options 1220 may vary depending on types of the information that are stored in a particular user's profile. Examples of configuration options 1220 may include, for example, auto-configuration options, last activity options, favorite show option, last show option, and favorite activity option.

Always auto-configure option 1211 may be selected by a user to automatically configured user equipment with the user's personal information whenever the user logs into the system. Auto-configure option 1212 may be displayed when always auto configure option 1211 was not previously selected by the user. Auto-configure option 1212 may be selected to auto-configure the currently used user equipment. User equipment settings may be deleted or reset by the user equipment settings by after a user has logged off and is no longer recognized to be the user equipment.

Figure 13:
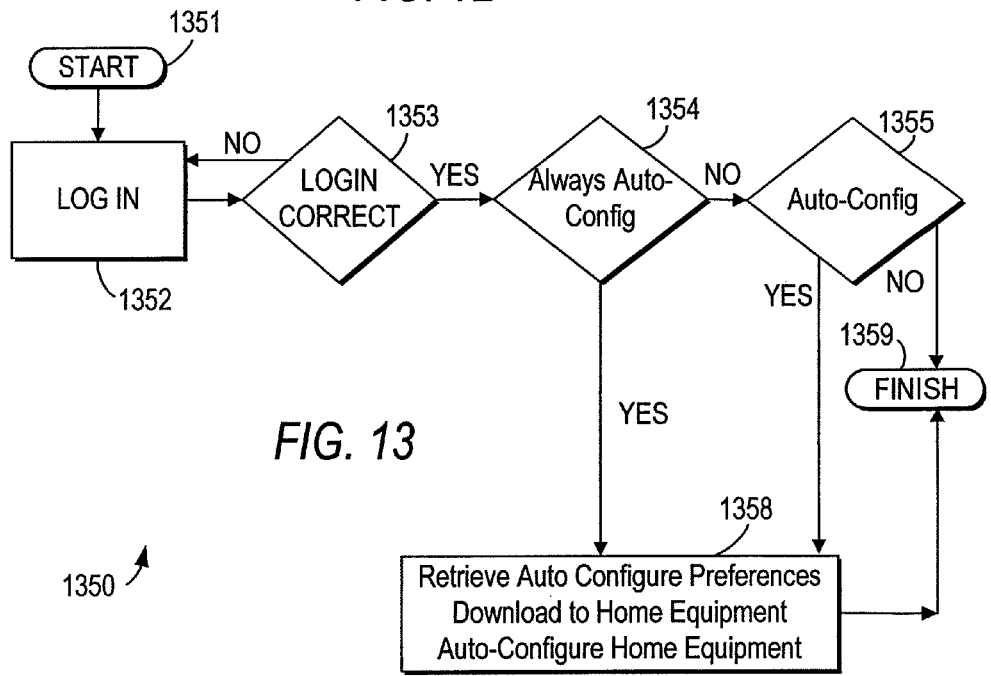
FIG. 13 is a flow chart illustrative of an auto-configure process in accordance with the principles of the present invention.

FIG. 13 shows illustrative process 1350 that may be involved in automatically configuring user equipment. The process may begin at start step 1351, when, for example, an on-demand media delivery system is activated. A user may be allowed to log into the system at step 1352. At step 1353, the user's login information may be verified. At step 1354, if the login information that is entered is valid, the system may check to see if the account of the logged in user indicates that the always auto-configure feature is selected. If the account shows the always auto-configure feature to be selected, the user equipment that was used for logging into the system may be automatically configured with that user's preference information at step 1358.

At step 1358, auto-configuration preferences and information may be retrieved and downloaded to the currently-used user equipment and the user equipment may be configured based on the preferences and information.

If the option to always auto-configure was not selected, a user may be provided with an opportunity to have the currently-used user equipment automatically configured for the current login at step 1355. Step 1358 may be performed when the user selects the auto-configure option during the current login. At finish step 1359, a user may be allowed to resume other activity. In this technique, some or all of a user's profile or preferences may be stored at a remote server.

Figure 14A:
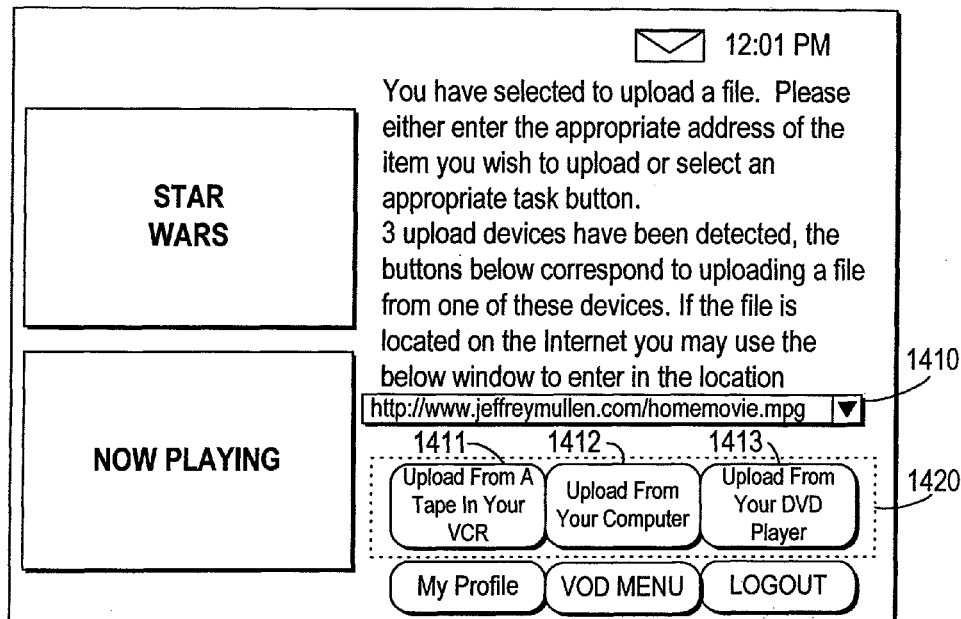
FIG. 14A is a diagram that is illustrative of an upload file display screen in accordance with the principles of the present invention.

The on-demand media delivery system may also contain an upload feature. FIG. 14A depicts an illustrative upload file display screen 1400 which may be initiated in order to upload a file. If desired, the upload feature may include a process that automatically scans user equipment for upload devices. Upload device buttons 1420 may be displayed on display screen 1400 when different file sources are available. For example, display screen 1400 may include VCR upload button 1411, computer upload button 1412, and DVD player upload button 1413. A user may be allowed to select a button from buttons 1420 to upload data from the device associated with that button.

The upload feature may also include an Internet address entry box 1410. A user may type or select a file address in box 1410. The on-demand media system may search the Internet for a file based on the file address and may upload the file. A user may select practically any file to upload when the file is found and have the file stored on a remote server of the on-demand media system.

Files uploaded to the remote server (e.g., VOD server) may also be downloaded to user equipment to be presented to a user. Files may be transferred from one user equipment to a different user equipment system through a media-on-demand remote server. Files may include almost any type of data, program, or content. Examples of files that may be uploaded include, for example, pictures, movies, songs, video games, documents, e-mails, and Internet Web pages. Files such as pictures, movies, songs, video, or other audio-visuals materials may be of particular interest because on-demand media servers are particularly suited for the delivery and presentation of audio-visuals to users.

Figure 14B:
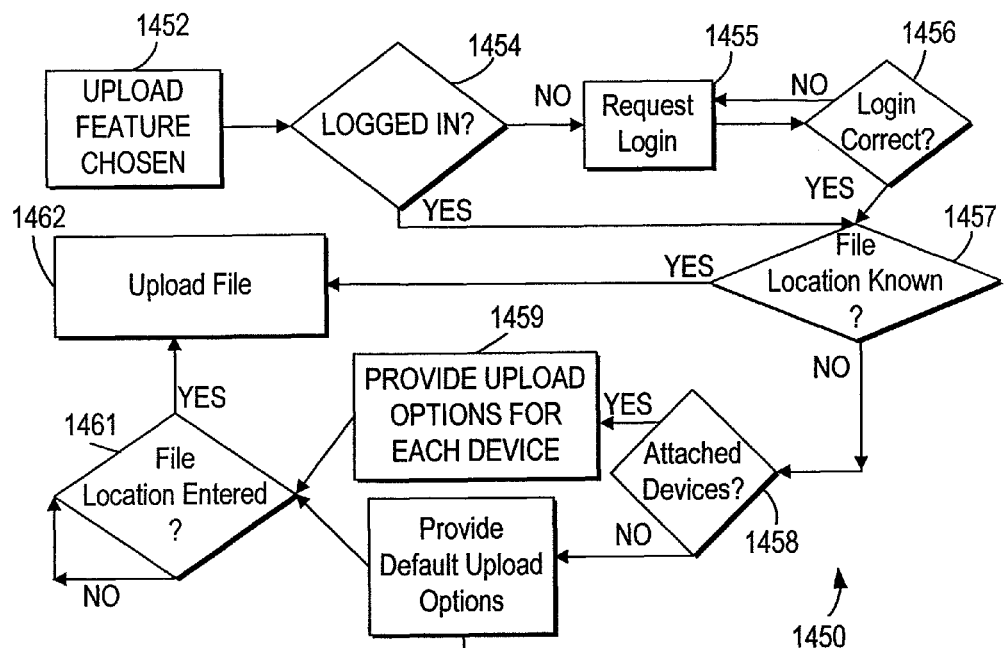
FIG. 14B is a flow chart illustrative of an upload file process in accordance with the principles of the present invention.

Process 1450 is illustrated in FIG. 14B to show illustrative steps that may be involved in uploading a file to a device such as a VOD server. At step 1452, a user may be provided with an opportunity to select an upload feature. At step 1454, the on-demand media system may check to see if a user is currently logged into the system. If a user is not currently logged in, user login may be requested at step 1455. At step 1456 the system may check to see whether the login was valid. The upload process may commence at step 1457 when the current user is logged into the system.

At step 1457, the system will determine if file location information has been given by the user. If desired, the system may search the user equipment for file source devices. If file source devices are found, appropriate upload options may be presented at step 1459. These options may be presented to a user in the form of device buttons 1410 of FIG. 14A. If no devices were found at step 1458, default options may be presented to the user at step 1460. Default options may include, for example, an Internet upload box or a list of possible storage devices that the user equipment may include. At step 1461, a user may be provided with an opportunity to select a file location for upload using the presented options. At step 1462, the selected file may be uploaded. If desired, at step 1472, the system may convert file formats for files that are being uploaded (e.g., convert JPG files to MPEG files) and/or may convert analog signals to digital file format.

Figure 15A:
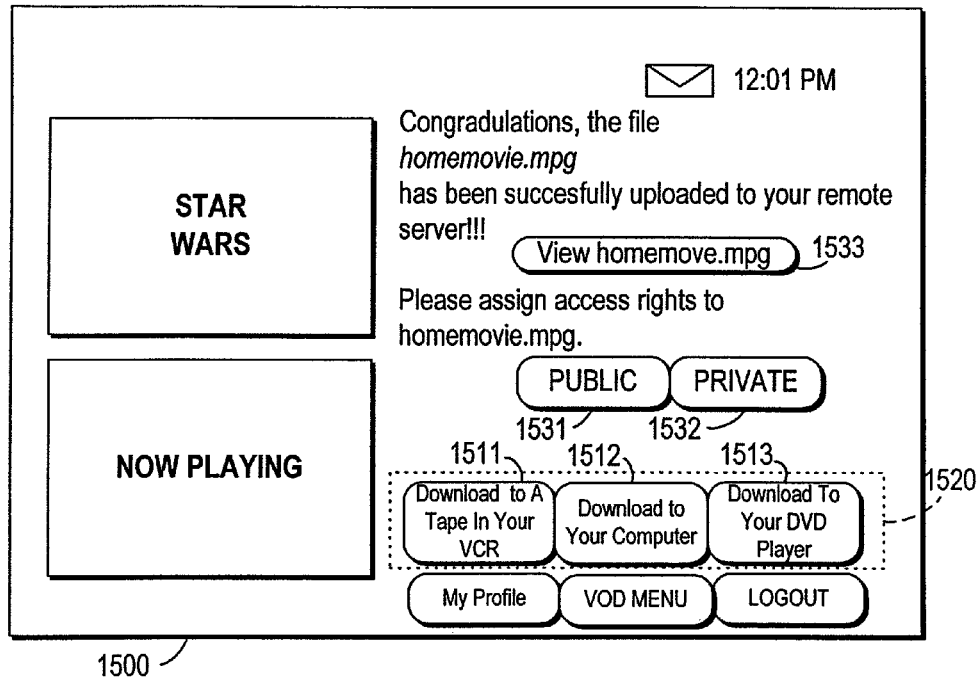
FIG. 15A is a diagram that is illustrative of a display screen for designating a file as public or private in accordance with the principles of the present invention.

After a file has been uploaded in step 1462, a user may want to assign access rights to that file. A user may also want to download the file to a different device in the on-demand media system. FIG. 15A is an illustration of display screen 1500 which may allow a user to download a recently uploaded file or to assign access rights to that file.

If a user desires to designate an uploaded file as a public file, public button 1531 may be selected. If a user desires to designate an uploaded file as a private file, private button 1532 may be selected. Download buttons 1520 may also be included in display screen 1500. If desired, the system may convert file formats for files that are downloaded (e.g., convert JPG files to MPEG files) and/or may provide digital to analog format conversions. Examples of such buttons may include for example, download to VCR button 1511, download to computer button 1512, and download to DVD player button 1513. If desired, however, the user may be presented with an option to have the file, which may be an audiovisual file, displayed or played back for the user. For example, the system may present the user with "view on your TV" option 1533, which may allow the user to view the file on the user's television set.

Files that are designated as private may be files that are associated with a particular user or with particular groups of users that have access rights to the file to the exclusion of others. Access may be limited to certain activities, which may include, for example, downloading, viewing, deleting, writing, and manipulating a file.

Figure 15B:
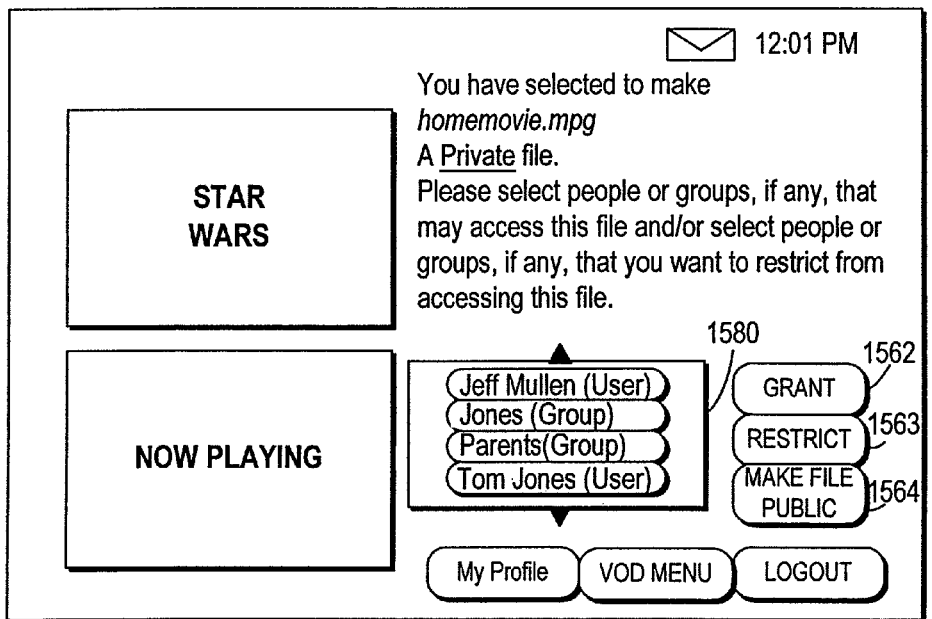
FIG. 15B is a diagram that is illustrative of a designate access data display screen in accordance with the principles of the present invention.

FIG. 15B illustrates display screen 1550, in which a user may grant and restrict access to particular users or groups of users in the on-demand media system. Display screen 1550 may include identity listings 1580 that contains a list of users and groups in the on-demand media system. After selecting a user or group from listings 1580 (e.g., by navigating on a listing and pressing a select key), a user may use grant button 1562 to grant access to a selected user or group. A user may select restrict button 1563 to restrict access to selected user or groups. If the user decides to make the file a public file, the user may select public button 1564.

Figure 16A:
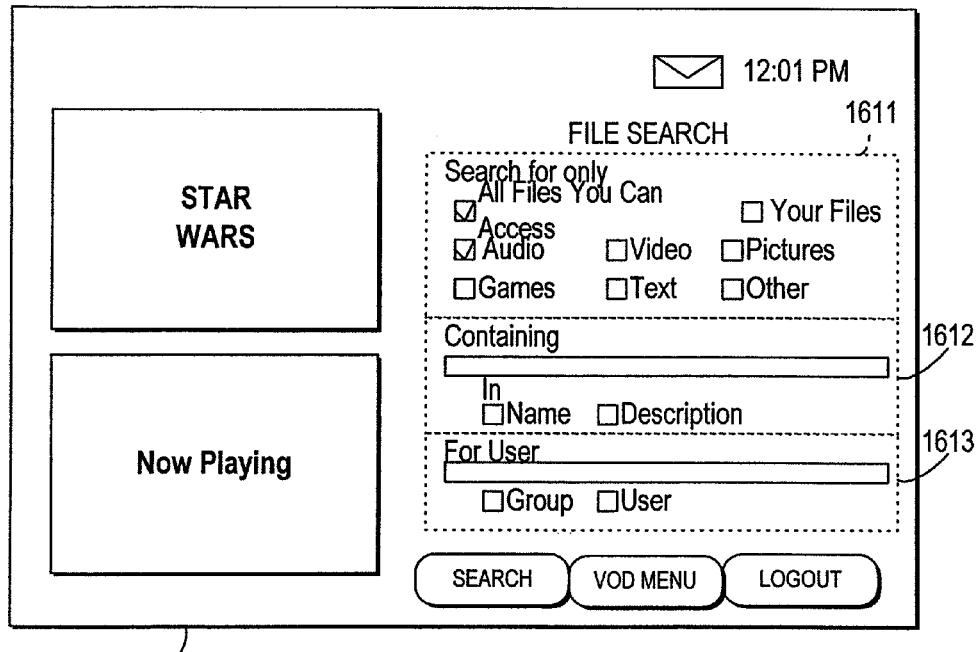
FIG. 16A is a diagram that is illustrative of a file search display screen in accordance with the principles of the present invention.

The on-demand media system may include a file search feature to aid users in locating files. FIG. 16A illustrates display screen 1600 from which a user may search for files on the on-demand media system. Display screen 1600 may contain search-type listings 1611. Listings 1611 may include options that allow a user to designate which types of files are to be located in a search. Examples of file types in listings 1611 may include, files to which the user has access rights, files associated with the current user, files for the presentation of audiovisuals such as pictures, games, or videos, or files for any other type of data.

Search listings 1612 may be included in display screen 1600 to give a user capabilities to narrow a search. A user may use listings 1612 to enter searchable text that may be associated with either a file's title or description. Identity search listings box 1613 may also be included in display screen 1600 to narrow a search even further. Box 1613 gives a user the capabilities to search for files associated with specific identities. After one or more files have been found by the on-demand media system, the user may download the file either to the remote server or to a device in the user equipment system.

Figure 16B:
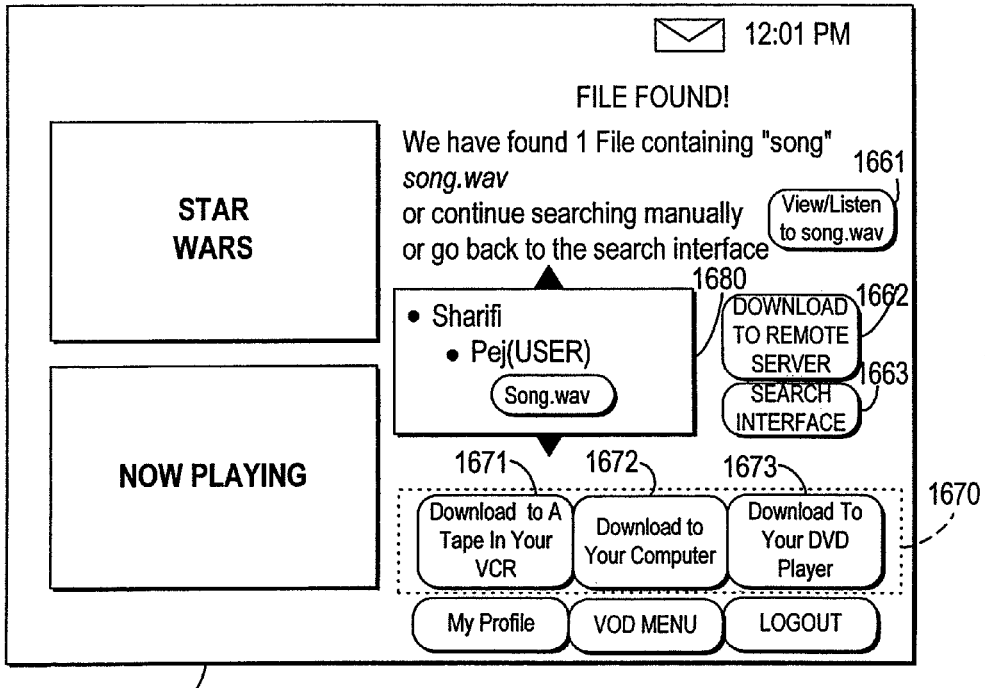
FIG. 16B is a diagram that is illustrative of a file found display screen in accordance with the principles of the present invention.

FIG. 16B is an illustration of display screen 1650 that allows a user to download files which were located in a file search. Display screen 1650 may contain found files listings box 1680, in which the found files may be listed. Box 1680 may list found files in any manner, such as alphabetically, and if desired may include a data or ownership hierarchy showing where the file was found in the system. Files from box 1680 may be downloaded to a remote server with the selection of a download button, such as download button 1662. For example, a user may select a file in box 1680 and then move a cursor to button 1662 to select that button. Device download buttons 1670 may also be included in display screen 1650 based on what devices are included in the currently-used user equipment. Download buttons may include for example, download to VCR button 1671, download to computer button 1672, download to DVD player button 1673, or any other suitable button for downloading files to a local device. If desired, the system may convert file formats for files that are downloaded (e.g., convert JPG files to MPEG files) and/or may provide digital to analog format conversions. Additionally, the user may be presented with view file option 1661, which may allow the user to view files located in the file search on the user equipment. See also "view on your TV" option 1533 of FIG. 15A, which essentially provides the same functionality.

For clarity and brevity, the features of the systems that are described herein are primarily discussed in the context of video-on-demand services. The features may also be implemented with other types of media on-demand services. Media on-demand services may be used to mass distribute movies, programs, music albums, etc. to users. User equipment and remote network servers may be configured for users to store personal media such as photographs, home videos, old recordings, or other media on a remote server for on-demand access by the user at a later time. The user as described above may associate desired access rights with the media that the user stores on the remote server.

Some or all of the features that are described herein may be implemented as part of an interactive television program guide, as part of a media on-demand application, as part of a dedicated application for those features; or implemented using a combination of such applications.

If desired, in connection with the relocate feature, the system may prompt a user to select whether to freeze on-demand-media of the user when the user is logging out of the system. Also, if desired, in connection with the relocate feature, the system may allow the user to resume the presentation of on-demand-media from a different point than the point at which the on-demand media may have been frozen. For example, the system may provide the user with an option to resume the presentation of on-demand media from the beginning of the media when the user relocates and exercise the relocate feature. The system may further allow the user to rewind the media past the point at which the media frozen.

The foregoing is merely illustrative of the principles of this invention and various modifications may be made by those skilled in the art without departing from the scope and spirit of the invention.

What is claimed is:

1. A first user equipment configured to:
   receive, using control circuitry, a selection of a media asset identifier corresponding to media content, wherein the media content was previously accessed by second user equipment, wherein a request to pause access to the media content was received by the second user equipment when the media content was previously accessed by the second user equipment, and wherein a position, in the media content, that corresponds to a pause point, was stored in a data structure of a profile of a user in a storage device remote from the first user equipment when the request to pause access to the media content was received by the second user equipment;
   access the data structure of the profile of the user;
   access, from the data structure, the position that corresponds to the pause point;
   retrieve the position that corresponds to the pause point from the data structure;
   determine, based on information in the data structure, that the media content was previously accessed by the second user equipment;
   based on the receiving:
      cause to be simultaneously displayed a first option and a second option;
      determine whether the first option or the second option is selected by the user; and
      when it is determined that the first option is selected by the user:
         generate a request including a position identifier that identifies the retrieved position that corresponds to the pause point,
         transmit the request, and
         receive, from the position that corresponds to the pause point, based on the position identifier included in the request, the media content; and
      when it is determined that the second option is selected by the user:
         access the media content starting from a second point in the media content which is prior to the position.

2. The first user equipment of claim 1, wherein the first user equipment is further configured to generate an instruction to display the media content from the first point in the media content when it is determined that the first option was selected.

3. The first user equipment of claim 1, wherein the first user equipment is further configured to generate an instruction to display the media content from the second point in the media content when it is determined that the second option was selected.

4. The first user equipment of claim 1, wherein the second point is selected by the user using the first user equipment.

5. The first user equipment of claim 1, wherein the first user equipment is further configured, when accessing the data structure of the profile of the user, to:
   generate a login option to be displayed to the user using the first user equipment;
   receive a communication including login identification and associated password information from the user;
   generate a request for authorization;
   transmit the request for authorization; and
   receive, based on a determination that the login identification and associated password information are valid, authorization to access the data structure of the profile of the user.

6. The first user equipment of claim 1, wherein the first user equipment is further configured to generate for display a third option that causes, responsive to user selection, the first user equipment to display the media content from a point in the media content that is after the position.

7. The first user equipment of claim 1, wherein the first user equipment is further configured to receive, either (1) an indication of program type, or (2) a text string; and in response to the receiving of either the indication of program type or the text string, receive search results including the previously accessed media content.

8. The first user equipment of claim 1, wherein receiving the selection of the media asset identifier corresponding to media content comprises:

receiving user input that identifies the user; and in response to receiving the user input, automatically configuring the first user equipment to generate for display the first option and the second option.

9. The first user equipment of claim 1, wherein the position is associated with an account associated with the user of the second user equipment, the second user equipment, or user-specific data.

10. A system comprising:

a first user equipment configured to:

receive a request to pause access to a media content;

cause to be stored, in a data structure of a profile of a user in a storage device remote from the first user equipment, when the request to pause access to the media content is received, a position, in the media content, that corresponds to a pause point; and a second user equipment configured to:

access the data structure of the profile of the user;

access, from the data structure, the position that corresponds to the pause point;

retrieve the position that corresponds to the pause point from the data structure;

receive a selection of a media asset identifier corresponding to the media content;

determine, based on information in the data structure, that the media content was previously accessed by the first user equipment;

based on the receiving of the selection of the media asset identifier corresponding to the media content:

cause to be simultaneously displayed at the second user equipment a first option and a second option;

determine whether the first option or the second option is selected by the user; and when it is determined that the first option is selected by the user:

generate a request including a position identifier that identifies the position that corresponds to the pause point, transmit the request, and receive, from the position that corresponds to the pause point, based on the position identifier included in the request, the media content; and when it is determined that the second option is selected by the user:

access the media content starting from a second point in the media content which is prior to the position.

11. The system of claim 10, wherein the second user equipment is further configured to generate an instruction to display the media content at the second user equipment from the first point in the media content when it is determined that the first option was selected.

12. The system of claim 10, wherein the second user equipment is further configured to generate an instruction to display the media content at the second user equipment from the second point in the media content when it is determined that the second option was selected.

13. The system of claim 10, wherein the second point is selected by the user using the second equipment.

14. The system of claim 10, wherein the second user equipment is further configured, when accessing the data structure of the profile of the user, to:

generate a login option to be displayed to the user at the second user equipment;

receive a communication including login identification and associated password information from the user;

generate a request for authorization;

transmit the request for authorization; and receive, based on a determination that the login identification and associated password information are valid, authorization to access the data structure of the profile of the user.

15. The system of claim 10, wherein the second user equipment is further configured to display a third option that causes, responsive to user selection, the second user equipment to display the media content from a point in the media content that is after the position.

16. The system of claim 10, wherein the second user equipment is further configured to:

receive either (1) an indication of program type, or (2) a text string; and in response to the receiving of either the indication of program type or the text string, receive search results including the previously accessed media content.

17. The system of claim 10, wherein receiving the selection of the media asset identifier corresponding to media content comprises:

receiving user input that identifies the user; and in response to receiving the user input, automatically configuring the second user equipment to generate for display the first option and the second option.

18. The system of claim 10, wherein the position is associated with an account associated with the user of the first user equipment, the first user equipment, or user-specific data.

19. A system comprising a server configured to:

receive, with circuitry, a first communication from first user equipment requesting that delivery of media content to the first user equipment be paused;

based on receiving the first communication, cause a position, in the media content, that corresponds to a pause point, to be stored in a data structure of a profile of a user in a storage device remote from the first user equipment;

determine, based on information in the data structure, that the media content was previously accessed by the first user equipment;

cause to be simultaneously displayed on second user equipment a first option and a second option;

cause the second user equipment to:

access the data structure of the profile of the user;

access, from the data structure stored on the storage device remote from the first user equipment, the position that corresponds to the pause point;

retrieve the position that corresponds to the pause point from the data structure;

determine whether the first option or the second option is selected by the user; and when it is determined that the first option is selected by the user:

generate a request including a position identifier that identifies the position that corresponds to the pause point;

transmit the request; and cause delivery of the media content to the second user equipment starting from the position that corresponds to the pause point, based on the position identifier included in the request; and when it is determined that the second option is selected by the user:

cause delivery of the media content to the second user equipment starting from a second point in the media content which is prior to the position.

20. The system of claim 19, wherein the server is further configured to generate an instruction to display the media content at the second user equipment from the first point in the media content when it is determined that the first option was selected at the second user equipment.

21. The system of claim 19, wherein the server is further configured to generate an instruction to display the media content at the second user equipment from the second point in the media content when it is determined that the second option was selected at the second user equipment.

22. The system of claim 19, wherein the second point is selected by the user using the second equipment.

23. The system of claim 19, wherein the server is further configured, when accessing the data structure of the profile of the user, to:
   generate a login option to be displayed to the user using the second user equipment;
   receive a communication including login identification and associated password information from the user;
   generate a request for authorization;
   transmit the request for authorization; and
   receive, based on a determination that the login identification and associated password information are valid, authorization to access the data structure of the profile of the user.

24. The system of claim 19, wherein the server is further configured to generate for display, on the second user equipment, a third option that causes, responsive to user selection, the second user equipment to display the media content from a point in the media content that is after the position.

25. The system of claim 19, wherein the server is further configured to:
   receive, at the second user equipment, either (1) an indication of program type, or (2) a text string; and
   in response to the receiving of either the indication of program type or the text string, receive at the second user equipment, search results including the previously accessed media content.

26. The system of claim 19, wherein receiving the first communication from the first user equipment comprises:
   receiving user input that identifies the user; and
   in response to receiving the user input, automatically configuring the second user equipment to generate for display the first option and the second option.

27. The system of claim 19, wherein the position is associated with an account associated with the user of the first user equipment, the first user equipment, or user-specific data.

28. A method comprising:
   receiving, at a first user equipment, a request to pause access to media content;
   causing to be stored, in a data structure of a profile of a user in a storage device remote from the first user equipment, when the request to pause access to the media content is received, a position, in the media content, that corresponds to a pause point;
   accessing the data structure of the profile of the user;
   accessing, from the data structure, the position that corresponds to the pause point;
   retrieving the position that corresponds to the pause point from the data structure;
   determining, based on information in the data structure, that the media content was previously accessed by the first user equipment;
   receiving at a second user equipment a selection of a media asset identifier corresponding to the media content;
   causing to be simultaneously displayed at the second user equipment, based on the receiving, a first option and a second option;
   determining whether the first option or the second option is selected by the user; and
   when it is determined that the first option is selected by the user:
      generating a request including a position identifier that identifies the position that corresponds to the pause point,
      transmitting the request, and
      receiving, from the position that corresponds to the pause point, based on the position identifier included in the request, the media content; and
   when it is determined that the second option is selected by the user:
      accessing the media content starting from a second point in the media content which is prior to the position.

* * * * *